United States Patent
Takahashi

(10) Patent No.: US 11,936,312 B2
(45) Date of Patent: Mar. 19, 2024

(54) MAGNETIC GENERATOR FOR MOTOR, SOFT MAGNETIC CORE, AND METHOD OF MANUFACTURING MAGNET

(71) Applicant: DENSO CORPORATION, Kariya (JP)

(72) Inventor: Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 931 days.

(21) Appl. No.: 16/779,829

(22) Filed: Feb. 3, 2020

(65) Prior Publication Data

US 2020/0244121 A1  Jul. 30, 2020

Related U.S. Application Data

(63) Continuation of application No. PCT/JP2018/028762, filed on Jul. 31, 2018.

(30) Foreign Application Priority Data

Aug. 1, 2017 (JP) .................................. 2017-149184
Feb. 16, 2018 (JP) .................................. 2018-026511
(Continued)

(51) Int. Cl.
*H02K 1/27* (2022.01)
*H01F 1/22* (2006.01)
(Continued)

(52) U.S. Cl.
CPC .............. *H02P 21/10* (2013.01); *H01F 1/22* (2013.01); *H02K 1/16* (2013.01); *H02K 1/18* (2013.01);
(Continued)

(58) Field of Classification Search
CPC .... H02K 1/278; H02K 1/276; H02K 2213/03; H02K 15/03; H02K 3/28; H02K 1/18;
(Continued)

(56) References Cited

U.S. PATENT DOCUMENTS 6,087,751 A * 7/2000 Sakai ..................... H02K 1/246
                                                        310/191
7,405,504 B2 * 7/2008 Arimitsu .............. H02K 1/2766
                                                        310/156.56
(Continued)

FOREIGN PATENT DOCUMENTS

CN    106712425 A    5/2017
JP    H11-206046 A   7/1999
(Continued)

OTHER PUBLICATIONS

U.S. Appl. No. 17/691,363, filed Mar. 10, 2022 in the name of Yuki Takahashi.
(Continued)

*Primary Examiner* — Alex W Mok
(74) *Attorney, Agent, or Firm* — Oliff PLC

(57) ABSTRACT

A rotor of a rotary electric machine includes magnets arranged to face a winding. The magnets are movable relative to the winding upon the winding being energized. The magnets are arranged in a relative movement direction while magnetic polarities based on the magnets are alternately changed. Each magnet includes a first magnet member configured to generate magnet flux in accordance with a corresponding one of the polarities. The first magnet member has first magnetic orientations defined therein. Each magnet includes a second magnet member provided at a q-axis side end of the corresponding magnet located closer to a pole boundary. The second magnet member has second magnetic orientations defined therein. The second magnetic orientations intersect with the first magnetic orientations.

18 Claims, 28 Drawing Sheets

(30) Foreign Application Priority Data

| Feb. 16, 2018 | (JP) | 2018-026512 |
|---|---|---|
| Feb. 16, 2018 | (JP) | 2018-026513 |
| Feb. 16, 2018 | (JP) | 2018-026514 |
| Jul. 31, 2018 | (JP) | 2018-143375 |

(51) Int. Cl.
| | |
|---|---|
| *H02K 1/16* | (2006.01) |
| *H02K 1/18* | (2006.01) |
| *H02K 1/276* | (2022.01) |
| *H02K 1/278* | (2022.01) |
| *H02K 1/30* | (2006.01) |
| *H02K 3/12* | (2006.01) |
| *H02K 3/28* | (2006.01) |
| *H02K 15/03* | (2006.01) |
| *H02K 15/12* | (2006.01) |
| *H02K 21/14* | (2006.01) |
| *H02P 21/10* | (2016.01) |
| *H02P 21/22* | (2016.01) |
| *H02P 27/12* | (2006.01) |

(52) U.S. Cl.
CPC .......... *H02K 1/276* (2013.01); *H02K 1/2766* (2013.01); *H02K 1/278* (2013.01); *H02K 1/30* (2013.01); *H02K 3/12* (2013.01); *H02K 3/28* (2013.01); *H02K 15/03* (2013.01); *H02K 15/12* (2013.01); *H02K 21/14* (2013.01); *H02P 21/22* (2016.02); *H02P 27/12* (2013.01); *H02K 2213/03* (2013.01)

(58) Field of Classification Search
CPC ........ H02K 21/14; H02K 1/16; H02K 1/2766; H02K 1/30; H02K 3/12; H02K 15/12; H02P 21/22; H02P 21/10; H02P 27/12; H01F 1/22
USPC .................................................. 310/156.53
See application file for complete search history.

(56) References Cited

U.S. PATENT DOCUMENTS

| 8,030,817 | B2 * | 10/2011 | Sakai | H02K 1/2766 |
| | | | | 310/156.43 |
| 8,044,548 | B2 * | 10/2011 | Sakai | H02K 21/16 |
| | | | | 310/156.43 |
| 8,269,390 | B2 * | 9/2012 | Sakai | H02K 1/2766 |
| | | | | 310/156.43 |
| 8,330,404 | B2 * | 12/2012 | Sakai | H02P 21/22 |
| | | | | 318/400.3 |
| RE44,037 | E * | 3/2013 | Tajima | B60L 50/66 |
| | | | | 310/156.56 |
| 8,397,369 | B2 * | 3/2013 | Smith | H02K 21/24 |
| | | | | 29/598 |
| 8,400,038 | B2 * | 3/2013 | Smith | H02K 21/145 |
| | | | | 310/156.43 |
| 8,653,710 | B2 * | 2/2014 | Takahashi | H02K 1/276 |
| | | | | 310/182 |
| 8,796,898 | B2 * | 8/2014 | Hashiba | H02K 1/223 |
| | | | | 310/182 |
| 9,269,483 | B2 * | 2/2016 | Smith | H02K 21/12 |
| 9,373,992 | B2 * | 6/2016 | Hashiba | H02K 1/2766 |
| 9,490,684 | B2 * | 11/2016 | Hashiba | H02K 1/223 |
| 9,496,774 | B2 * | 11/2016 | Hashiba | H02K 21/028 |
| 9,502,929 | B2 * | 11/2016 | Yamada | H02K 21/044 |
| 9,564,780 | B2 * | 2/2017 | Tsutsui | H02K 1/2766 |
| 2002/0180294 | A1 * | 12/2002 | Kaneda | H02K 1/278 |
| | | | | 310/156.43 |
| 2005/0040721 | A1 * | 2/2005 | Kusase | H02K 1/278 |
| | | | | 310/156.43 |
| 2005/0231057 | A1 | 10/2005 | Kloepzig et al. | |
| 2006/0113858 | A1 * | 6/2006 | Hino | B60L 15/2009 |
| | | | | 310/156.53 |
| 2012/0262019 | A1 * | 10/2012 | Smith | H02K 1/278 |
| | | | | 335/302 |
| 2013/0214631 | A1 * | 8/2013 | Smith | H02K 1/2793 |
| | | | | 335/306 |
| 2014/0070742 | A1 | 3/2014 | Schulz | |
| 2014/0125182 | A1 | 5/2014 | Takahashi | |
| 2015/0001977 | A1 * | 1/2015 | Zhang | H02K 21/16 |
| | | | | 310/154.26 |
| 2015/0091407 | A1 * | 4/2015 | Kayano | H02K 1/2766 |
| | | | | 310/156.38 |
| 2015/0115758 | A1 * | 4/2015 | Koka | H02K 21/14 |
| | | | | 318/139 |
| 2015/0137632 | A1 | 5/2015 | Takahashi | |
| 2015/0372547 | A1 * | 12/2015 | Kifuji | H02K 1/2766 |
| | | | | 310/156.01 |
| 2016/0172947 | A1 * | 6/2016 | Kusakabe | H02K 21/14 |
| | | | | 310/156.53 |
| 2016/0247616 | A1 * | 8/2016 | Smith | H01F 7/0278 |
| 2017/0133958 | A1 | 5/2017 | Hoshino et al. | |
| 2017/0187258 | A1 | 6/2017 | Fujikawa et al. | |
| 2018/0115205 | A1 | 4/2018 | Fujihara et al. | |
| 2020/0228038 | A1 | 7/2020 | Takahashi | |

FOREIGN PATENT DOCUMENTS

| JP | 2008-245384 A | 10/2008 |
| JP | 2009-254143 A | 10/2009 |
| JP | 2010-154744 A | 7/2010 |
| JP | 2012-228016 A | 11/2012 |
| JP | 2012-239327 A | 12/2012 |
| JP | 2013-251977 A | 12/2013 |
| JP | 2016-32027 A | 3/2016 |
| JP | 2017-034917 A | 2/2017 |
| JP | 2019-030206 A | 2/2019 |
| JP | 2019-030207 A | 2/2019 |
| JP | 2019-030208 A | 2/2019 |
| JP | 2019-140368 A | 8/2019 |
| JP | 2019-140369 A | 8/2019 |
| JP | 2019-140370 A | 8/2019 |
| JP | 2019-140891 A | 8/2019 |
| JP | 2019-140892 A | 8/2019 |
| JP | 2019-140893 A | 8/2019 |
| JP | 2019-140894 A | 8/2019 |
| JP | 2019-140895 A | 8/2019 |
| JP | 2021-184700 A | 12/2021 |

OTHER PUBLICATIONS

Nov. 6, 2018 Search Report issued in International Patent Application No. PCT/JP2018/028762.

Nov. 6, 2018 International Search Report issued in International Patent Application No. PCT/JP2018/028935.

U.S. Appl. No. 16/779,831, filed Feb. 3, 2020 in the name of Takahashi.

* cited by examiner

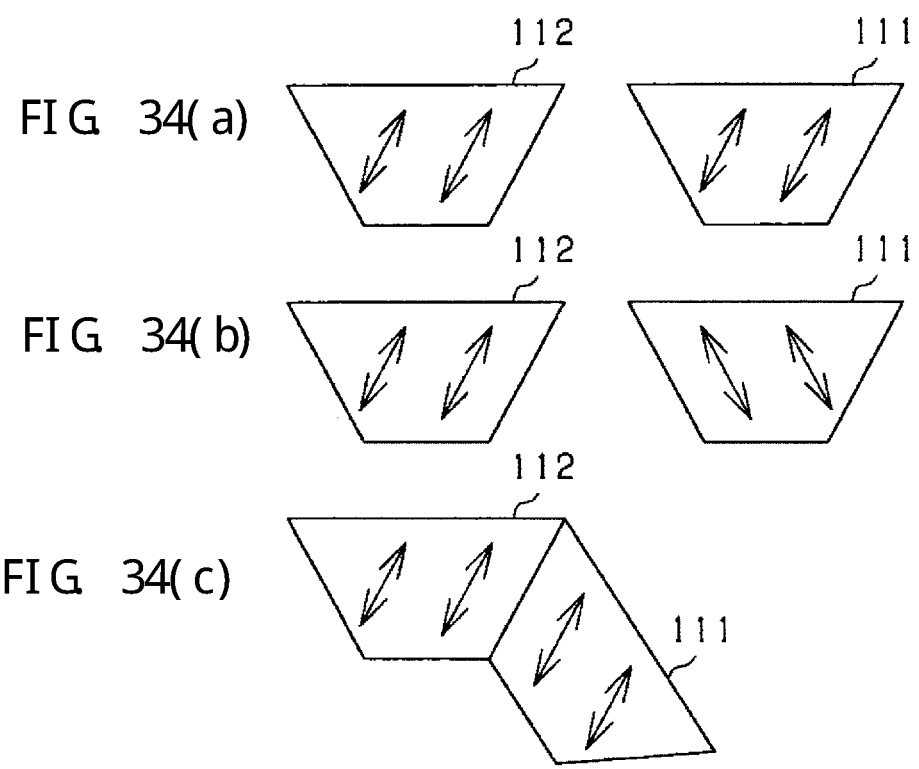
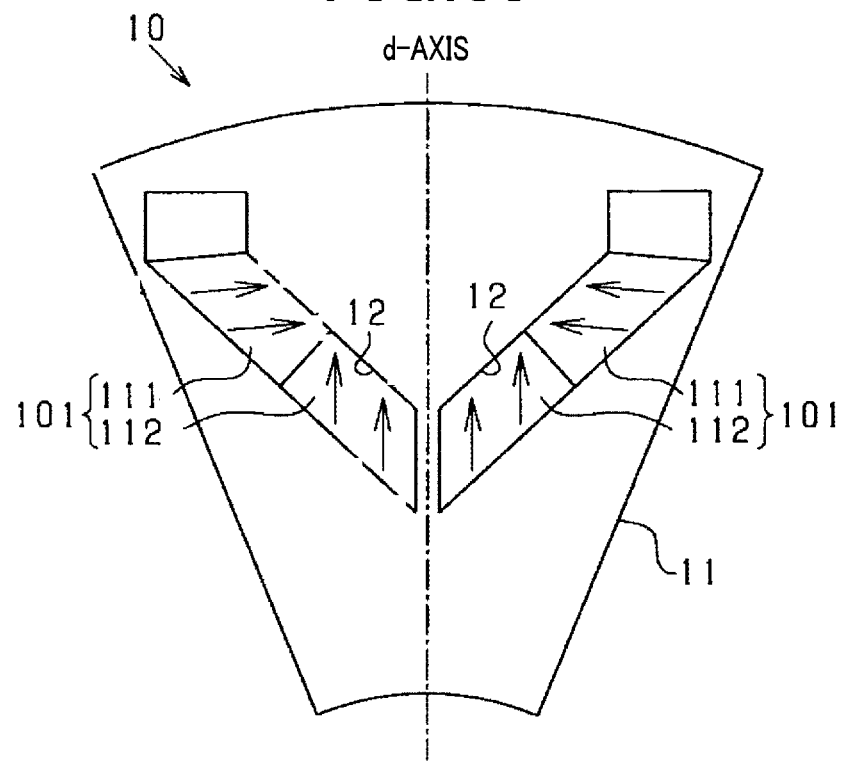

MAGNETIC GENERATOR FOR MOTOR, SOFT MAGNETIC CORE, AND METHOD OF MANUFACTURING MAGNET

CROSS-REFERENCE TO RELATED APPLICATIONS

This application is a bypass continuation application of currently pending international application No. PCT/JP2018/028762 filed on Jul. 31, 2018 designating the United States of America, the entire disclosure of which is incorporated herein by reference.

This application is based on and claims the benefit of priority from
1. Japanese Patent Application No. 2017-149184 filed on Aug. 1, 2017
2. Japanese Patent Application No. 2018-026511 filed on Feb. 16, 2018
3. Japanese Patent Application No. 2018-026512 filed on Feb. 16, 2018
4. Japanese Patent Application No. 2018-026513 filed on Feb. 16, 2018
5. Japanese Patent Application No. 2018-026514 filed on Feb. 16, 2018
6. Japanese Patent Application No. 2018-143375 filed on Jul. 31, 2018

The entire disclosure of each of these Japanese Patent Applications is incorporated herein by reference.

TECHNICAL FIELD

The present disclosure relates to magnetic generators for a motor, soft magnetic cores, and methods of manufacturing a magnet.

BACKGROUND

Interior permanent magnet (IPM) rotors for, for example, rotary electric machines have been widespread. Such an IPM rotor includes a rotor core comprised of the stack of electromagnetic steel sheets. The rotor core has defined therein magnet installation holes, and magnets are installed in the respective magnet installation holes.

For example, Japanese Patent Application Publication No. 2014-93859 discloses a technology that devises the shape of each magnet installation hole to thereby reduce a magnetic field in a direction opposite to a direction of magnetic flux from a rotor to a stator, thus increasing magnetic flux interlinking to the stator. Such a rotary electric machine is designed to optimize the shape of each permanent magnet, the rotor, and the stator to thereby aim to balance improvement of performance of the rotary electric machine and improvement of resistance of the permanent magnet against a demagnetization field.

SUMMARY

In recent years, many vehicles have been designed to have a slant-nose profile with a smaller travel resistance and/or have a smaller engine compartment. For each vehicle having a slant-nose profile and/or a smaller engine compartment, it is necessary for an installation space of a vehicular power generator and/or a stator to have been minimized.

For each vehicle having a minimized installation space of a vehicular power generator and/or a stator, it is required to use a compact rotary electric machine having a capability of both starting the corresponding vehicle and causing the corresponding vehicle to travel on a slope. For achieving this requirement, we have considered designing rotary electric machines each with higher torque density.

When designing such a rotary electric machine with higher torque density, we are concerned that, if an excitation current generated in a stator becomes a large current within a very short time, a rotating magnetic field based on the excitation current from the stator may become a demagnetization field for the permanent magnets of a rotor, so that the permanent magnets may be demagnetized due to the demagnetization field.

Typical rotors usable for IPM motors disclosed in the patent literature 1 have a d-axis and a q-axis for each magnetic pole; the d-axis represents a center axis of magnetic flux generated from a corresponding magnet for providing the corresponding magnetic pole, and the q-axis represents a neutral axis for the magnetic flux of the magnet. In recent years, space vector control has been stepped up; the space vector control is configured to individually control a d-axis current flowing in the d-axis and a q-axis current flowing in the q-axis.

A typical IPM motor is configured such that a convex core part is arranged on the q-axis, so that the inductance in the q-axis is larger than the inductance in the d-axis. This inductance difference generates reluctance torque Tr. That is, such a typical IPM motor is designed to generate resultant torque of magnet torque Tm based on flux of the magnet located on the d-axis, and the reluctance torque Tr.

Note that field-weakening control is known as a technology for increasing the rotational speed of a motor under a predetermined battery-voltage condition. Executing the field-weakening control may cause a magnetic field, i.e. a demagnetization field, to weak magnetic force of the magnets of the motor. In an IPM motor, the field-weakening control uses a reluctance torque component in the q-axis when reducing magnet torque based on weakened magnetic flux of the magnets. For this reason, the resultant torque of the reluctance torque and magnet torque for operating an IPM motor using the field-weakening control is likely to be higher than only magnet torque for operating the same IPM motor without using the field-weakening control. IPM motors therefore tend to be positively adjusted based on the field-weakening control. This means that permanent magnets installed in the IPM motor are frequently subjected to a demagnetization field, so that irreversible demagnetization of the permanent magnets is frequently prompted.

For addressing such an irreversible demagnetization of the permanent magnets of an IPM motor, we have considered the following first to third measures:
(i) The first measure of using expensive heavy rare earth elements, which include a terbium (Tb) element and a dysprosium (Dy) element, as the materials of each permanent magnet
(ii) The second measure of increasing the thickness of each permanent magnet
(iii) The third measure of increasing the volume of each permanent magnet Each of these first to third measures however may result in an increase in the manufacturing cost of the rotor.

The rotor of an IPM motor has a known structure that permanent magnets of each pair are provided at both sides of a corresponding d-axis to have a V-shape. In the rotor with the above structure, each of the permanent magnets provided at both sides of each d-axis generates magnetic flux that is obliquely oriented with respect to the corresponding d-axis, so that mutual interference between the magnetic flux generated by one of the permanent magnets of each pair and the magnetic flux generated by the other thereof may result in demagnetization of the permanent magnets of the corresponding pair.

For addressing the above problems, the present disclosure aims to provide magnetic generators for a motor, soft magnetic cores, and methods of manufacturing a magnet, each of which is capable of properly reducing demagnetization of a magnet.

The following describes measures for addressing the problems, how the measures work, and effects obtained by the measures.

A magnetic generator for a motor of a first measure includes a plurality of magnets that are arranged to face a winding and that are movable relative to the winding upon the winding being energized. The magnets are arranged in a relative movement direction while magnetic polarities based on the magnets are alternately changed. Each of the magnets includes a first magnet member configured to generate magnet flux in accordance with a corresponding one of the polarities. The first magnet member has first magnetic orientations defined therein. Each of the magnets includes a second magnet member provided at a q-axis side end of the corresponding magnet located closer to a pole boundary. The second magnet member has second magnetic orientations defined therein, and the second magnetic orientations intersect with the first magnetic orientations.

In a motor in which magnets are arranged to face a winding and are movable relative to the winding upon the winding being energized, an energization magnetic field from the winding may act on each magnet as a demagnetization field. For addressing such a point, the first measure includes, as each magnet, includes the second magnet member provided at a q-axis side end, i.e. a pole-boundary side end, of the corresponding magnet; the second magnetic orientations defined in the second magnet member intersect with the first magnetic orientations defined in the first magnet member.

This configuration of the first measure strengthens magnetic flux at the q-axis side end of the first magnet member to thereby increase a demagnetization resistance performance against a demagnetization field from the winding. This properly reduces demagnetization of the first magnet member serving as a magnetic-pole magnet.

Note that the second magnetic orientations defined in the second magnet member are preferably closer to a direction perpendicular to the q-axis than the first magnetic orientations defined in the first magnet member are. This enables the second magnetic orientations to reinforce the magnet flux at the q-axis side end of the first magnet member.

In the magnetic generator of a second measure, the motor is designed as a rotary electric machine that is comprised of a winding member in which the winding is wound, and a magnet hold member including the magnets and radially arranged to face the winding member. The magnetic generator is used as the magnet member. The first magnet member includes a plurality of first magnet members arranged in the magnet member in a circumferential direction of the magnet member with predetermined pitches, and the second magnet member includes a plurality of second magnet members. Each of the second magnet members is provided at the q-axis side end of the corresponding one of the first magnet members.

In a rotary electric machine comprised of the winding member, such as a stator, in which the winding is wound, and the magnet hold member, such as a rotor, including the magnets and radially arranged to face the winding member, an energization magnetic field from the winding member may act on each magnet as a demagnetization field. This may cause a concern about demagnetization of the q-axis side end of the corresponding magnet.

For addressing such a point, the above configuration of the second measure, which arranges each of the second magnet members at the q-axis side end of the corresponding one of the first magnet members, enhances a demagnetization resistance performance at the q-axis side end of each first magnet member against the demagnetization field from the winding member.

In the magnetic generator of a third measure, the magnet hold member includes a soft magnetic core having magnet installation holes located across a d-axis for each pole at both sides of the d-axis. The first and second magnet members are installed in each of the magnet installation holes.

In the magnet hold member, such as a rotor, in which the first and second magnet members are installed in each of the magnet installation holes, each of the second magnet members strengthens the magnet flux at the q-axis side end of the corresponding one of the first magnet members. This enhances the demagnetization resistance performance at the q-axis side end of each first magnet member.

In the magnetic generator of a fourth measure, the q-axis side end of each of the first magnet members has a first flux reinforcement point that is the closest to the winding member, and each of the second magnet members is configured to strength magnetic flux at the first flux reinforcement point of the q-axis side end of the corresponding one of the first magnet members.

Because a point of the q-axis side end of each first magnet member, which is the closest to the winding member, may be subjected to a maximum influence from the demagnetization field from the winding member, resulting in demagnetization being likely to occur at the closest point of the q-axis side end of each first magnet member.

From this viewpoint, the fourth measure sets the closet point as the first flux reinforcement point, and properly strengthens magnet flux at the first flux reinforcement point.

In the magnetic generator of a fifth measure, each of the first and second magnet members has a substantially rectangular shape in a lateral cross section thereof, and a pair of opposing flux effective surfaces. The first magnetic orientations and the second magnetic orientations of the respective first and second magnet members are perpendicular to the opposing flux effective surfaces of the corresponding one of the first and second magnet members. The first and second magnet members are arranged in the soft magnetic core such that a first angle of at least one of the first magnetic orientations of each of the first magnet members with respect to the d-axis or q-axis is different from a second angle of at least one of the second magnetic orientations of the corresponding one of the second magnet members with respect to the d-axis or q-axis.

Magnets, each of which has a rectangular shape in its lateral cross section and has magnetic orientations directed to be perpendicular to a pair of opposing flux effective surfaces thereof, are most versatile and superior in terms of manufacturing and cost. The fifth measure uses such magnets as the respective first and second magnet members, and is configured such that the first angle of at least one of the first magnetic orientations of each of the first magnet members with respect to the d-axis or q-axis is different from the second angle of at least one of the second magnetic orientations of the corresponding one of the second magnet members with respect to the d-axis or q-axis. This configuration efficiently reinforces the q-axis side end of the first magnet member while the magnet hold member has a simpler structure.

Note that, in the above configuration of the fifth measure, magnets, which have the same dimensions and the same performances, such as the same product-number magnets, can be used as the respective first and second magnet members. This enables a desired demagnetization-resistance performance to be obtained.

In the magnetic generator of a sixth measure, an angle formed between at least one of the first magnetic orientations of each of the first magnet members and at least one of the second magnetic orientations of the corresponding one of the second magnet members is set to be an acute angle.

This provides an efficient structure for reinforcing each of the first magnet members. In particular, it is possible to further properly perform reinforcement of the magnet flux at the first flux reinforcement point upon the closet point in the q-axis side end of each first magnet member, which is the closest to the winding member, being set as the first flux reinforcement point.

In the magnetic generator of a seventh measure, the first magnet members are located across the d-axis for each pole to be separated from each other as a pair of main magnets. The first magnetic orientations of each first magnet member are inclined with respect to the d-axis and intersects with the d-axis at a portion of the core. The portion of the core is located to be closer to the armature winding than to an anti-armature winding side. The magnetic generator further includes a plurality of third magnet members each having third magnetic orientations. Each of the third magnet members is provided at a d-axis side end of the corresponding one of the first magnet members such that the third magnetic orientations intersect with the first magnetic orientations of the corresponding one of the first magnet members.

In the structure of the seventh measure, the first magnet members are located across the d-axis for each pole to be separated from each other as a pair of main magnets. The first magnetic orientations of each first magnet member are inclined with respect to the d-axis and intersects with the d-axis at a portion of the core. The portion of the core is located to be closer to the armature winding than to an anti-armature winding side.

This structure may however cause a concern about magnet flux components from the pair of main magnets, i.e. the first magnet members, mutually interfere with each other at their d-axis side ends, i.e. a pole-center side ends, resulting in demagnetization, i.e. self-demagnetization, of each first magnet member.

From this viewpoint, the seventh measure provides each of the third magnet members at the d-axis side end of the corresponding one of the first magnet members such that the third magnetic orientations intersect with the first magnetic orientations of the corresponding one of the first magnet members. This enables magnet flux at the d-axis side end of each first magnet member to be reinforced. That is, strengthening a demagnetization resistance performance at the d-axis side end of each first magnet member or thereabout, making it possible to properly reduce demagnetization of each first magnetic member.

Note that the third magnetic orientations are preferably closer to a direction parallel to the d-axis than the first magnetic orientations are, and reinforce the d-axis side end of each first magnet member.

In the magnetic generator of an eighth measure, the d-axis side end of each of the main magnets of the pair located across the d-axis for each pole has a second flux reinforcement point that is closest to the d-axis side end of the other of the main magnets of the pair. Each of the third magnet members is configured to strength the second flux reinforcement point of each of the main magnets of the pair.

The second flux reinforcement point at the d-axis side end of each first magnet member of the pair, which is the closest to the d-axis side end of the other thereof, may be most demagnetized. From this viewpoint, each of the third magnet members is configured to properly strength the second magnet reinforcement point of each of the main magnets, i.e. first magnet members, of the pair.

In the magnetic generator of a ninth measure, an angle formed between at least one of the first magnetic orientations of each of the first magnet members and at least one of the third magnetic orientations of the corresponding one of the third magnet members is set to be an acute angle.

This provides an efficient structure for reinforcing each of the first magnet members. In particular, it is possible to further properly perform reinforcement of the magnet flux at a point of each main magnet of the pair, which is the closest to the d-axis side end of the other thereof, being set as the second flux reinforcement point.

In the magnetic generator of a tenth measure, each of the magnet installation holes includes a d-axis side extending portion that is located between the corresponding pair of the magnets and that extends portion that extends toward the d-axis. Each of the third magnet members is arranged in the d-axis side extending portion of the corresponding one of the magnet installation holes. Each of the magnet installation holes includes a flux barrier located to be closer to the d-axis than the corresponding one of the third magnet members.

Because each of the third magnet members and the corresponding flux barrier are arranged in the d-axis side extending portion of the corresponding one of the magnet installation holes, it is possible to minimize the amount of magnet materials in each of the third magnet members located at the d-axis side end of the corresponding one of the first magnet members, thus reducing the manufacturing cost of the magnetic generator.

In the magnetic generator of an eleventh measure, the magnet installation holes are located across the d-axis for each pole at both sides of the d-axis to be symmetrical about the d-axis, and the magnets are arranged across the d-axis for each pole to be symmetrical about the d-axis.

Because the magnet installation holes are arranged across the d-axis for each pole to be symmetrical about the d-axis, and the magnets are arranged across the d-axis for each pole to be symmetrical about the d-axis, it is possible to efficiently reduce demagnetization of each magnet independently of the rotational direction of the rotary electric machine.

In the magnetic generator of a twelfth measure, each of the first and second magnet members has a value of coercive force. The value of the coercive force of the second magnet member is smaller than the value of the coercive force of the first magnet member.

This configuration that the value of the coercive force (iHc) of the second magnet member is smaller than the value of the coercive force of the first magnet member enables desired reinforcement of the first magnet members to be obtained while enabling an inexpensive magnet to be used as each second magnet member.

In the magnetic generator of a thirteenth measure, each of the first and second magnet members has a value of coercive force. The value of the coercive force of the first magnet member is smaller than the value of the coercive force of the second magnet member.

This configuration that the value of the coercive force (iHc) of the first magnet member is smaller than the value of the coercive force of the second magnet member enables an inexpensive magnet to be used as each first magnet member, making it possible to reduce the manufacturing cost of the rotary electric machine. This configuration of the thirteenth measure is most preferable in cost of the magnetic generator, because the surface area of each first magnet member determines the great part of magnetic flux generated from each magnet.

In addition, because the coercive force (iHc) of the second magnet member is larger than that of the first magnet member, it is possible to further increase a demagnetization resistance performance of the magnetic generator. This therefore provides the thirteenth measure as a measure suitable for a case where the magnetic generator is subjected to a strong demagnetization field from the winding side.

In the magnetic generator of a fourteenth measure, each of the second and third magnet members has a value of coercive force. The value of the coercive force of the second magnet member is different from the value of the coercive force of the third magnet member.

There may be
1. A first concern about demagnetization of the q-axis side end of each first magnet member from a demagnetization field from the winding member
2. A second concern about demagnetization at the d-axis side end of each first magnet member from a magnet interference from the corresponding adjacent first magnet member In this situation, the degree of demagnetization possibility at the q-axis side end and the degree of demagnetization possibility at the d-axis side end of each first magnet member may be different from each other.

From this viewpoint, the fourteenth measure is configured such that the value of the coercive force of the second magnet member is different from the value of the coercive force of the third magnet member. This configuration enables the value of the coercive force of the second magnet member and the value of the coercive force of the third magnet member to be determined in accordance with
1. The degree of demagnetization possibility at the q-axis side end of each first magnet member
2. The degree of demagnetization possibility at the d-axis side end of the corresponding first magnet member In the magnetic generator of a fifteenth measure, each of the first magnet members comprises divided magnet segments in a direction from the q-axis to the d-axis. Each of the magnet segments has at least one of the first magnetic orientations. The at least one of the first magnetic orientations of one of the magnet segments is different from the at least one of the first magnetic orientations of another of the magnet segments. The magnet segments include at least a q-axis side segment and a d-axis segment. The q-axis side segment is located to be closer to the q-axis than the d-axis segment is. The d-axis side segment is located to be closer to the d-axis than the q-axis segment is. The at least one of the first magnetic orientations of the q-axis side segment is closer to a direction parallel to the q-axis than the at least one of the first magnetic orientations of the d-axis side segment is.

In the fifteenth measure, the at least one of the first magnetic orientations of one of the magnet segments is different from the at least one of the first magnetic orientations of another of the magnet segments. The at least one of the first magnetic orientations of the q-axis side segment is closer to the direction parallel to the q-axis than the at least one of the first magnetic orientations of the d-axis side segment is. This makes it possible to further strengthen the demagnetization resistance performance at the d-axis side end of each first magnet member against the demagnetization field from the winding side.

In the magnetic generator of a sixteenth measure, the magnet segments of each first magnet member have respective ends facing each other. The magnet segments of each first magnet member are arranged such that the ends of the respective magnet segments have a convex shape toward the winding.

The convex arrangement of the ends of the respective magnet segments of each first magnet member toward the winding enables the corresponding first magnet member to be closer to the winding member than another arrangement thereof. This results in each first magnet member being closer to the winding member, making it possible to obtain larger torque of the rotary electric machine. Although the demagnetization field may increase due to the closer of each first magnet member to the winding member, the second magnetic members address the increase in the demagnetization field.

The convex arrangement of the ends of the respective magnet segments of each first magnet member toward the winding makes it possible to reduce the percentage of a region of the soft magnetic core, which is located to be closer to the winding member than each magnet is, to be smaller; the region is subjected to the sum of the magnetic flux of the winding member and the magnetic flux of the corresponding magnet. This reduces, in the soft magnetic core, a saturation region in which magnetic saturation may occur based on the magnetic flux of the winding member and the magnetic flux of each magnet, thus more efficiently obtain the performance from the corresponding magnet.

In the magnetic generator of a seventeenth measure, the soft magnetic core has an outer surface facing the winding member, and includes a groove formed in the outer surface to extend along an axial direction of the soft magnetic core.

There may be concern about the outer surface of the soft magnetic core, which faces the winding member, being likely to be magnetically saturated based on both energization magnetic flux from the winding and magnetic flux of each magnet. From this viewpoint, the groove formed in the outer surface to extend along the axial direction of the soft magnetic core adjusts the orientation and magnitude of magnetic flux around an outer peripheral region of the soft magnetic core close to the winging member. This more efficiently obtains the performance from each magnet.

In the magnetic generator of an eighteenth measure, the soft magnetic core is a rotor core that has
1. A through hole formed through a center portion thereof, a rotary shaft being rotatably disposed in the through hole, the through hole having an inner circumferential surface thereof
2. A projection formed on the inner circumferential surface of the through hole and located on the d-axis for each pole, the projection extending to abut on an outer circumferential surface of the rotary shaft.

While the soft magnetic core, i.e. the rotor core, is assembled to the rotary shaft in the eighteenth measure, it is possible for each magnet to receive stress transferred from the inner circumferential surface of the through hole of the rotor core to radially outward directions. This reduces misalignment of the magnets, preventing unintentional change of the characteristics of the magnets.

A magnetic generator for a motor of a nineteenth measure includes a plurality of magnets that are arranged to face a winding and that are movable relative to the winding upon the winding being energized. The magnets are arranged in a relative movement direction while magnetic polarities based on the magnets are alternately changed. Each of the magnets includes a plurality of first magnet members located across a d-axis for each pole at both sides of the d-axis to be separated from each other. Each of the first magnet members has first magnetic orientations defined therein. The first magnetic orientations of each of the first magnet members are inclined with respect to the d-axis and intersect with the d-axis at a predetermined position. The predetermined position is located to be closer to the armature winding than to an anti-armature winding side. Each of the magnets includes a plurality of second magnet members each provided at a d-axis side end of a corresponding one of the first magnet members. Each of the second magnet members has second magnetic orientations defined therein, the second magnetic orientations of each of the second magnet members intersecting with the first magnetic orientations of the corresponding one of the first magnet members.

Let us assume that, in the motor, the first magnet members are located across the d-axis for each pole to be separated from each other as a pair of main magnets, and the first magnetic orientations of each first magnet member are inclined with respect to the d-axis and intersects with the d-axis at a portion of the core. The portion of the core is located to be closer to the armature winding than to an anti-armature winding side.

In this assumption, the motor may cause a concern about magnet flux components from the pair of main magnets, i.e. the first magnet members, mutually interfere with each other at their d-axis side ends, i.e. a pole-center side ends, resulting in demagnetization, i.e. self-demagnetization, of each first magnet member.

From this viewpoint, the nineteenth measure provides each of the second magnet members at the d-axis side end, i.e. the pole-center end, of the corresponding one of the first magnet members such that the second magnetic orientations intersect with the first magnetic orientations of the corresponding one of the first magnet members. This enables magnet flux at the d-axis side end of each first magnet member to be reinforced. That is, strengthening a demagnetization resistance performance at the d-axis side end of each first magnet member or thereabout, making it possible to properly reduce demagnetization of each first magnetic member.

Note that the third magnetic orientations defined in a third magnet member are preferably closer to a direction perpendicular to the d-axis than the first magnetic orientations defined in the first magnet member are. This enables the third magnetic orientations to reinforce the magnet flux at the d-axis side end of the first magnet member.

In the magnetic generator of a twentieth measure, the motor is designed as a rotary electric machine that is comprised of a winding member in which the winding is wound, and a magnet hold member including the magnets and radially arranged to face the winding member. The magnetic generator is used as the magnet member. The magnet hold member includes a soft magnetic core having magnet installation holes located across a d-axis for each pole at both sides of the d-axis. The first and second magnet members are installed in each of the magnet installation holes.

A rotary electric machine comprised of the winding member, such as a stator, in which the winding is wound, and the magnet hold member, such as a rotor, including the magnets and radially arranged to face the winding member includes a soft magnetic core having magnet installation holes located across a d-axis for each pole at both sides of the d-axis. In the above rotary electric machine, i.e. the interior magnet rotary electric machine, the first and second magnet members are installed in each of the magnet installation holes. In the above interior magnet rotary electric machine, it is possible to enhance the demagnetization resistance performance at the d-axis side end of each first magnet member, i.e. each of the main magnets, against the flux interference from the corresponding adjacent first magnet member.

In the magnetic generator of a twenty-first measure, the magnet installation holes are located across the d-axis for each pole at both sides of the d-axis to be symmetrical about the d-axis. The magnets are arranged across the d-axis for each pole to be symmetrical about the d-axis.

Because the magnet installation holes are arranged across the d-axis for each pole to be symmetrical about the d-axis, and the magnets are arranged across the d-axis for each pole to be symmetrical about the d-axis, it is possible to efficiently reduce demagnetization of each magnet independently of the rotational direction of the rotary electric machine.

In the magnetic generator of a twenty-second measure, each of the magnet installation holes includes a d-axis side extending portion that is located between the corresponding pair of the magnets and that extends portion that extends toward the d-axis. Each of the second magnet members is arranged in the d-axis side extending portion of the corresponding one of the magnet installation holes. Each of the magnet installation holes includes a flux barrier located to be closer to the d-axis than the corresponding one of the second magnet members.

Because each of the second magnet members and the corresponding flux barrier are arranged in the d-axis side extending portion of the corresponding one of the magnet installation holes, it is possible to minimize the amount of magnet materials in each of the second magnet members located at the d-axis side end of the corresponding one of the first magnet members, thus reducing the manufacturing cost of the magnetic generator.

In the magnetic generator of a twenty-third measure, each of the first magnet members of the pair located across the d-axis for each pole has a flux reinforcement point that is closest to the other of the first magnet members. Each of the second magnet members is configured to strength the flux reinforcement point of the corresponding one of the first magnet members.

Because a point of the d-axis side end of each first magnet member, which is the closest to the corresponding adjacent first magnet member, may be subjected to a maximum influence from the flux interruption, resulting in demagnetization being likely to occur at the closest point of the d-axis side end of each first magnet member.

From this viewpoint, the twenty-third measure sets the closet point as the flux reinforcement point, and properly strengthens magnet flux at the flux reinforcement point.

In the magnetic generator of a twenty-fourth measure, an angle formed between at least one of the first magnetic orientations of each of the first magnet members and at least one of the second magnetic orientations of the corresponding one of the second magnet members is set to be an acute angle.

This provides an efficient structure for reinforcing each of the first magnet members. In particular, it is possible to further properly perform reinforcement of the magnet flux at a point of each first magnet member of the pair, which is the closest to the d-axis side end of the other thereof, being set as the flux reinforcement point.

A soft magnetic core of a twenty-fifth measure is to be arranged to face a winding of an interior magnet rotary electric machine for holding a plurality of magnets. The soft magnetic core includes a plurality of magnet installation holes defined therein in which a corresponding one of the magnets is to be installed. The magnet installation holes include a pair of magnet installation holes located across the d-axis for each pole at both sides of the d-axis. The magnet installation holes of the pair have a substantially V shape such that a facing distance between the magnet installation holes becomes longer toward the winding side. Each of the magnet installation holes of the pair has a q-axis side end, a d-axis side end, and an intermediate portion between the q-axis side end and d-axis side end. The intermediate portion is arranged to be convex toward the winding side.

In the twenty-fifth measure, the magnet installation holes include a pair of magnet installation holes located across the d-axis for each pole at both sides of the d-axis. The magnet installation holes of the pair have a substantially V shape. Each of the magnet installation holes of the pair has a q-axis side end, a d-axis side end, and an intermediate portion between the q-axis side end and d-axis side end. The intermediate portion is arranged to be convex toward the winding side.

This configuration of the twenty-fifth measure enables, while magnets are installed in the respective magnet installation holes, each first magnet member being closer to the winding member, making it possible to obtain larger torque of the rotary electric machine. Although the demagnetization field may increase due to the closer of each first magnet member to the winding member, the second magnetic members address the increase in the demagnetization field.

This reduces the percentage of a region of the soft magnetic core, which is located to be closer to the winding member than each magnet is, to be smaller; the region is subjected to the sum of the magnetic flux of the winding member and the magnetic flux of the corresponding magnet. This reduces, in the soft magnetic core, a saturation region in which magnetic saturation may occur based on the magnetic flux of the winding member and the magnetic flux of each magnet, thus more efficiently obtain the performance from the corresponding magnet.

In the soft magnetic core of a twenty-sixth measure, the rotary electric machine includes an annular stator in which the winding is wound, and a rotor arranged at a radially inside of the stator to face the stator, the rotor including the magnets. The soft magnetic core is to be used as a rotor core constituting the rotor. The intermediate portion is arranged to be convex toward the stator side.

The convex configuration of the magnet in the radially outward direction in the inner rotor rotary electric machine enables the percentage of the radially outward portion of the rotor core relative to the magnet installation holes to be smaller. This reduces the stress concentration factor of the rotor core against centrifugal force, making it possible to strengthen the mechanical intensity of the rotor core.

In the soft magnetic core of a twenty-seventh measure, the magnet installation holes are located across the d-axis for each pole at both sides of the d-axis to be symmetrical about the d-axis.

Because the magnet installation holes are located across the d-axis for each pole at both sides of the d-axis to be symmetrical about the d-axis, it is possible to reliably hold the magnets installed in the respective magnet installation holes independently of the rotational direction of the rotary electric machine.

A magnetic generator of a twenty-eighth measure for a motor includes a plurality of magnets that are arranged to face a winding and that are movable relative to the winding upon the winding being energized. The magnets are arranged in a relative movement direction while magnetic polarities based on the magnets are alternately changed. Each of the magnets has flux effective surfaces located at respective winding and anti-winding sides for generation of magnetic flux. Each of the magnets has magnetic orientations defined therein intersecting with at least one of the flux effective surfaces at a non-orthogonal angle.

In a motor in which magnets are arranged to face a winding and are movable relative to the winding upon the winding being energized, an energization magnetic field from the winding may act on each magnet as a demagnetization field. This may cause a concern about demagnetization of the q-axis side end of each magnet.

For addressing such a point, each of the magnets, which has flux effective surfaces located at respective winding and anti-winding sides for generation of magnetic flux, has the magnetic orientations defined therein intersecting with at least one of the flux effective surfaces at a non-orthogonal angle. This configuration enables the length of each magnetic path, i.e. the length of each inner magnetic line, in each magnet to be longer, thus strengthening the magnetic flux of each magnet. That is, this configuration of each magnet enables the length of each magnetic path to be longer than a magnet having magnetic orientations defined to be perpendicular to the flux effective surfaces. This increases a demagnetization resistance performance against a demagnetization field from the winding. This properly reduces demagnetization of each magnet.

Note that all the magnetic orientations defined in each magnet can be different from each other. The magnetic orientations defined in each magnet can include at least one magnetic orientation perpendicular to the flux effective surfaces in addition to one or more magnetic orientations non-orthogonal to the flux effective surfaces.

In the magnetic generator of a twenty-ninth measure, the motor is designed as a rotary electric machine that is comprised of a winding member in which the winding is wound, and a magnet hold member including the magnets and radially arranged to face the winding member. The magnetic generator is used as the magnet member. The magnet hold member includes a soft magnetic core having magnet installation holes located across a d-axis for each pole at both sides of the d-axis. The magnets are installed in the respective magnet installation holes.

In the motor is designed as an interior magnet motor (IPM motor), the magnetic orientations defined in each magnet installed in a corresponding one of the magnet installation holes intersect with at least one of the flux effective surfaces at a non-orthogonal angle. This increases a demagnetization resistance performance of the interior magnet motor against a demagnetization field.

In the magnetic generator of a thirtieth measure, the magnet installation holes are located across the d-axis for each pole at both sides of the d-axis to be symmetrical about the d-axis, and the magnets are arranged across the d-axis for each pole to be symmetrical about the d-axis.

Because the magnet installation holes are arranged across the d-axis for each pole to be symmetrical about the d-axis, and the magnets are arranged across the d-axis for each pole to be symmetrical about the d-axis, it is possible to efficiently reduce demagnetization of each magnet independently of the rotational direction of the rotary electric machine.

In the magnetic generator of a thirty-first measure, the magnetic orientations of each of the magnets are changed such that the magnetic orientations have a first orientation at the winding-side flux surface, and a second orientation at the anti-winding side flux surface, the first orientation being different from the second orientation.

Because the first orientation at the winding-side flux surface and the second orientation at the anti-winding side flux surface are different from each other, it is possible to increase the length of each magnetic path, i.e. the length of each inner magnetic line, in each magnet to be longer. This efficiently generates magnetic flux that is resistant against a demagnetization field from the winding side, thus properly reducing demagnetization of each magnet.

In the magnetic generator of a thirty-second measure, the magnetic orientations of each of the magnets are changed from the q-axis to the d-axis such that the magnetic orientations include an orthogonal orientation in the magnetic orientations closer to a direction orthogonal to the q-axis, and a parallel orientation in the magnetic orientations closer to a direction parallel to the d-axis so as to have a non-linearly convex shape toward the anti-winding side.

The magnetic orientations of each of the magnets are changed from the q-axis to the d-axis such that the magnetic orientations include an orthogonal orientation in the magnetic orientations closer to the direction orthogonal to the q-axis, and a parallel orientation in the magnetic orientations closer to a direction parallel to the d-axis so as to have a non-linearly convex shape toward the anti-winding side. This efficiently generates magnetic flux that is resistant against a demagnetization field from the winding side, thus properly reducing demagnetization of each magnet.

Additionally, the parallel orientation in the magnetic orientations defined in each magnet, which is closer to the direction parallel to the d-axis, properly reduces demagnetization of the d-axis side end or therearound of each magnet due to flux interference from magnetic flux of the other magnet.

In the magnetic generator of a thirty-third measure, the magnetic orientations of each of the magnets are changed from the d-axis to the q-axis such that the magnetic orientations include an orthogonal orientation closer to a direction orthogonal to the d-axis, and a parallel orientation closer to a direction parallel to the q-axis so as to have a non-linearly convex shape toward the anti-winding side.

The magnetic orientations of each of the magnets are changed from the d-axis to the q-axis such that the magnetic orientations include an orthogonal orientation closer to a direction orthogonal to the d-axis, and a parallel orientation closer to a direction parallel to the q-axis so as to have a non-linearly convex shape toward the anti-winding side. This increases the length of each magnetic path, i.e. the length of each inner magnetic line, defined in each magnet to thereby reinforce magnetic flux of the corresponding magnet. This therefore efficiently generates the magnetic flux that is resistant against a demagnetization field from the winding side, thus properly reducing demagnetization of each magnet.

In the magnetic generator of a thirty-fourth measure, each of the magnets has a q-axis side end, a d-axis side end, and an intermediate portion between the q-axis side end and d-axis side end in the soft magnetic core. The q-axis side end is located in the soft magnetic core to be radially closer to the winding than the d-axis side end is. The intermediate portion is arranged to be convex toward the winding side.

This results in each magnet being closer to an outer surface of the soft magnetic core, which faces the winding. This makes it possible to obtain larger torque of the rotary electric machine. Although the demagnetization field may increase due to the closer of each magnet to the winding, the non-linear magnetic orientations of each magnet address the increase in the demagnetization field.

This reduces the percentage of a region of the soft magnetic core, which is located to be closer to the winding than each magnet, i.e. each magnet installation hole, is, to be smaller; the region is subjected to the sum of the magnetic flux of the winding and the magnetic flux of the corresponding magnet. This reduces, in the soft magnetic core, a saturation region in which magnetic saturation may occur based on the magnetic flux of the winding and the magnetic flux of each magnet, thus more efficiently obtain the performance from the corresponding magnet.

If the magnetic generator is used as a rotor of an inner rotor rotary electric machine, each of the magnets is configured to be convex to the radially outward direction. This enables the percentage of the radially outward portion of the rotor core relative to the magnet installation holes to be smaller. This reduces the stress concentration factor of the rotor core against centrifugal force, making it possible to strengthen the mechanical intensity of the rotor core.

In the magnetic generator of a thirty-fifth measure, each of the magnetic orientations of each of the magnets intersect with each of the flux effective surfaces at the non-orthogonal angle. Each of the magnets has end surfaces that are parallel to the magnetic orientations and that intersect with the flux effective surfaces. Each of the magnet installation holes includes a flux barrier located at an outer side of at least one of a d-axis side end and a q-axis side end of the corresponding magnet.

Each magnet is configured such that the magnetic orientations are non-linearly changed between the q-axis side end and the d-axis side end, making longer the length of each magnetic patch defined in the corresponding magnet. However, relatively shorter magnetic paths may be locally located at each end of the magnet.

From this viewpoint, each of the end surfaces of the magnet, which intersects with the flux effective surfaces, is directed to be parallel to the magnetic orientations of the magnet. This reduces shorter magnetic paths locally present in each end of the magnet. In addition, the flux barrier, which is located at the outer side of at least one of the d-axis side end and the q-axis side end of the magnet, prevents self-shorting of magnet flux in the rotor core while reducing demagnetization at the corresponding at least one of the d- and q-axis side ends of the magnet.

In the magnetic generator of a thirty-sixth measure, each of the magnetic orientations of each of the magnets is inclined with respect to the d-axis, and intersect with each of the flux effective surfaces at the non-orthogonal angle.

Each of the magnetic orientations of each of the magnets is inclined with respect to the d-axis, and intersect with each of the flux effective surfaces at the non-orthogonal angle. This configuration enables the length of each magnetic path, i.e. the length of each inner magnetic line, in each magnet to be longer than a magnet having magnetic orientations defined to be perpendicular to the flux effective surfaces. This increases a demagnetization resistance performance against a demagnetization field from the winding. This properly reduces demagnetization of each magnet.

In the magnetic generator of a thirty-seventh measure, the magnets are arranged across the d-axis for each pole to be located at both sides of the d-axis. The magnetic orientations of the respective magnets arranged across the d-axis are inclined with respect to the d-axis and intersect with each other at a portion of the soft magnetic core, the portion being located to be closer to the winding than the magnet installation hole is.

The magnets are arranged across the d-axis for each pole to be located at both sides of the d-axis. This strengthens magnetic flux at the d-axis side end of each magnet while increasing a demagnetization resistance performance against a demagnetization field from the winding.

In the magnetic generator of a thirty-eighth measure, each of the magnetic orientations of each of the magnets intersects with each of the flux effective surfaces at the non-orthogonal angle. Each of the magnets has end surfaces, and at least one of the end surfaces is parallel to the magnetic orientations, and intersect with the flux effective surfaces.

Each magnet is configured such that the magnetic orientations non-orthogonally intersect with the flux effective surfaces, making longer the length of each magnetic patch defined in the corresponding magnet as compared with a magnet whose magnetic orientations intersect to be perpendicular to the flux effective surfaces. However, relatively shorter magnetic paths may be locally located at each end of the magnet.

From this viewpoint, at least one of the end surfaces of the magnet, which intersects with the flux effective surfaces, is directed to be parallel to the magnetic orientations of the magnet. This reduces shorter magnetic paths locally present in each end of the magnet.

Note that at least one of the d-axis and q-axis side end surfaces of the magnet, which intersects with the flux effective surfaces, can be directed to be parallel to the magnetic orientations of the magnet.

In the magnetic generator of a thirty-ninth measure, each of the magnets has a first length of at least one end-orientation of the magnetic orientations defined in one of end surfaces intersecting with the flux effective surface, and a second length of at least one middle-orientation of the magnetic orientations defined in a middle portion between the end surfaces. The first length of the at least one end-orientation is longer than the second length of the at least one middle-orientation.

In each magnet whose magnetic orientations each intersect with the flux effective surfaces at a non-orthogonal angle to make longer the magnetic orientations defined therein, it is possible to further extend the length of each magnetic path at one of the end surfaces of the corresponding magnet. This further increases a demagnetization resistance performance of each magnet.

In the magnetic generator of a fortieth measure, each of the magnets has a d-axis closer portion and a q-axis closer portion. The d-axis closer portion is closer to the d-axis than the q-axis closer portion is. The q-axis closer portion is closer to the q-axis than the d-axis closer portion is. At least one d-axis closer orientation of the magnetic orientations defined in the d-axis closer portion is different from at least one q-axis closer orientation of the magnetic orientations defined in the q-axis closer portion.

This makes it possible to collect magnetic flux components to a region of the core located closer to the winding than to the magnets, such as a predetermined region of the core on the d-axis, thus further enhancing the magnetic flux of each magnet.

In the magnetic generator of a forty-first measure, the at least one d-axis closer orientation defined in the d-axis closer portion of each magnet is closer to a direction parallel to the d-axis than the at least one q-axis closer orientation defined in the q-axis closer portion of the corresponding magnet is.

This configuration enables the length of the at least one q-axis closer orientation to be longer than the d-axis closer orientation. This strengthens magnetic flux at the q-axis closer portion of each magnet to thereby address demagnetization of the q-axis side end of each magnet due to a demagnetization field.

In addition, the d-axis closer orientation defined in the d-axis closer portion of each magnet is parallel to or close to the direction parallel to the d-axis. For this reason, if the d-axis closer orientations of the magnets located across the d-axis are inclined to face each other, it is possible to reduce mutual interference between the magnetic flux components from the respective magnets located across the d-axis.

In the magnetic generator of a forty-second measure, an inclination of the at least one q-axis closer orientation defined in the q-axis closer portion of each magnet with respect to a direction perpendicular to the flux effective surfaces is larger than an inclination of the at least one d-axis closer orientation defined in the d-axis closer portion of the corresponding magnet with respect to the direction perpendicular to the flux effective surfaces.

This configuration enables the at least one q-axis closer orientation defined in the q-axis closer portion of each magnet to be the longest, thus strengthening a demagnetization resistance performance of the q-axis side end of the corresponding magnet against a demagnetization field. This achieves both reduction in demagnetization of the q-axis side end of each magnet and an increase in torque based on each magnet.

For example, as illustrated in FIG. 27, the forty-second measure can use the configuration that each magnet installation hole 12 linearly extends in a direction perpendicular to the corresponding d-axis. In addition, one or more magnetic orientations in the magnet 101 closer to the d-axis side end is directed to more nearly parallel to the d-axis than one or more magnetic orientations in the magnet 101 closer to the q-axis side end. This configuration enables the inclination of at least one magnetic orientation closer to the q-axis side end with respect to the orthogonal direction orthogonal to the flux effective surfaces to be larger than the inclination of at least one magnetic orientation closer to the d-axis with respect to the orthogonal direction orthogonal to the flux effective surfaces.

In the magnetic generator of a forty-third measure, the at least one q-axis closer orientation defined in the q-axis closer portion of each magnet is closer to a direction parallel to the q-axis than the at least one d-axis closer orientation defined in the d-axis closer portion of the corresponding magnet is.

Because the at least one q-axis closer orientation defined in the q-axis closer portion of each magnet is closer to the direction parallel to the q-axis, it is possible to strengthen magnetic flux components that are oriented to be perpendicular to the outer surface of the soft magnetic core, which faces the winding. That is, it is possible to strengthen magnetic flux components that are oriented to be resist against a demagnetization field. This properly addresses demagnetization at the d-axis side end of each magnet against a demagnetization field.

In the magnetic generator of a forty-fourth measure, the magnet installation holes include a pair of magnet installation holes located across the d-axis for each pole at both sides of the d-axis. The magnet installation holes of the pair have a substantially V shape such that a facing distance between the magnet installation holes becomes longer toward the winding side. Each of the magnets includes a first magnet portion and a second magnet portion across the d-axis. The first magnet portion includes a d-axis side end, and the second magnet portion includes a q-axis side end. At least one of the magnetic orientations defied in the second magnet portion is closer to a direction perpendicular to the q-axis than at least one of the magnetic orientations defined in the first magnet portion is.

This still further strengthens a demagnetization resistance performance of each magnet against a demagnetization field from the winding.

In the magnetic generator of a forty-fifth measure, at least one of the magnetic orientations defined in the first magnet portion is parallel to the d-axis.

Because the at least one of the magnetic orientations defined in the first magnet portion is parallel to the d-axis, so that the at least one of the magnetic orientations defied in the second magnet portion is closer to the direction perpendicular to the q-axis than at least one of the magnetic orientations defined in the first magnet portion is. This configuration results in an increase in a demagnetization resistance performance of each magnet while reducing demagnetization at the d-axis side end due to mutual flux interference, i.e. self-demagnetization, of the corresponding magnet.

In the magnetic generator of a forty-sixth measure, each of the magnets has a q-axis side end, a d-axis side end, and an intermediate portion between the q-axis side end and d-axis side end in the soft magnetic core. The q-axis side end is located in the soft magnetic core to be radially closer to the winding than the d-axis side end is. The intermediate portion is arranged to be convex toward the winding side.

This forty-sixth measure enables each magnet to be closer to an outer surface of the soft magnetic core, which faces the winding, resulting in the magnetic resistance on the d-axis of the core. This increases torque of the rotary electric machine. Although the demagnetization field may increase due to the closer of each magnet to the winding, the longer magnetic orientations of each magnet address the increase in the demagnetization field.

This reduces the percentage of a region of the soft magnetic core, which is located to be closer to the winding than each magnet is, to be smaller; the region is subjected to the sum of the magnetic flux of the winding and the magnetic flux of the corresponding magnet. This reduces, in the soft magnetic core, a saturation region in which magnetic saturation may occur based on the magnetic flux of the winding and the magnetic flux of each magnet, thus more efficiently obtain the performance from the corresponding magnet.

In the magnetic generator of a forty-seventh measure, each of the magnets has a q-axis side end, a d-axis side end, and an intermediate portion between the q-axis side end and d-axis side end in the soft magnetic core. The q-axis side end is located in the soft magnetic core to be radially closer to the winding than the d-axis side end is. The intermediate portion is arranged to be convex toward the anti-winding side.

The wider the region of the soft magnetic core, which is located to be closer to the winding than each magnet is, results in an increase in magnetic flux through the wider region based on the magnets.

In the magnetic generator of a forty-eighth measure, each of the magnets has a d-axis closer portion and a q-axis closer portion. The d-axis closer portion is closer to the d-axis than the q-axis closer portion is. The q-axis closer portion is closer to the q-axis than the d-axis closer portion is. At least one of the magnetic orientations defined in the d-axis closer portion is different from at least one of the magnetic orientations defined in the q-axis closer portion.

This makes it possible to collect magnetic flux components to a region of the core located closer to the winding than to the magnets, such as a predetermined region of the core on the d-axis, thus further enhancing the magnetic flux of each magnet.

In the magnetic generator of a forty-ninth measure, the magnetic orientations of each of the magnets each have a circular-arc shape.

This makes further longer the length of each magnetic path defined in each magnet, thus further enhancing magnetic flux of each magnet.

In the magnetic generator of a fiftieth measure, the magnets include a pair of first-side magnet and a second-side magnet located across a d-axis core portion of the soft magnetic core. Each of the first- and second-side magnets has opposing winding-side end and an anti-winding side end. The soft magnetic core includes a non-magnetic member for each of the first- and second-side magnets. The non-magnetic member extends from the winding-side end of the corresponding one of the first- and second-side magnets toward the anti-winding side across the d-axis core portion.

The non-magnetic member causes the magnetic resistance of the d-axis core portion located between the pair of first-side magnet and second-side magnet. This reduces shorting between the first-side magnet and second-side magnet, making it possible to more efficiently use magnetic force of each magnet.

In the magnetic generator of a fifty-first measure, the non-magnetic member for each of the first- and second-side magnets is comprised of a non-magnetic material installed in a part of the corresponding one of the magnet installation holes.

In the fifty-first measure, each of the magnet installation holes partition a corresponding region of the soft magnetic core between a d-axis side region and a q-axis side region, and the non-magnetic member extends toward the anti-winding side. This makes it possible to design magnetic flux of each of the first- and second-side magnets while mutual interference between magnetic flux of the first-side magnet and magnetic flux of the second-side magnet.

In the magnetic generator of a fifty-second measure, the soft magnetic core is a rotor core that has a through hole formed through a center portion thereof, a rotary shaft is rotatably disposed in the through hole. The through hole has an inner circumferential surface thereof. The non-magnetic member for each of the first- and second-side magnets projects toward the q-axis side over a virtual line. The virtual line is defined to connect between a radially innermost point of the corresponding one of the first- and second-side magnets and a center of the rotor core.

This configuration of the fifty-second measure reduces the moment of the inertial of the rotor as small as possible. Note that the length of non-magnetic member in the circumferential direction of the rotor can be preferably determined in accordance with the quantity of q-axis magnetic flux and the circumferential width of a q-axis core portion located between each pair of magnets in the circumferential direction. That is, the non-magnetic member can project up to a virtual line connecting between a q-axis side end of the magnet installation hole and the rotational center of the rotor core, or can project beyond the virtual line to be closer to the q-axis by a predetermined length.

A method of a fifty-third measure for manufacturing a magnet to be used for a rotary electric machine includes
1. Filling a magnetic powdery member into a mold to be arranged in a magnetic field generated by a magnetic field coil
2. Applying a predetermined magnetic orientation to the magnetic powdery member filled in the mold based on the magnetic field while the magnetic field generated by the magnetic field coil is bent based on an orientation core
3. Sintering the magnetic powdery member filled in the mold This method makes it possible to easily provide
1. The first configuration of a magnet to be installed in a rotary electric machine, which changes the magnetic orientations of the magnet from orientations close to a q-axis side orientation perpendicular to the q-axis to orientations close to a d-axis side orientation parallel to the d-axis from the q-axis side end to the d-axis side end; each magnetic orientation is convexly curved toward the anti-stator direction opposite to the winding
2. The second configuration of a magnet to be installed in a rotary electric machine, which changes the magnetic orientations of the magnet from orientations close to a d-axis side orientation perpendicular to the d-axis to orientations close to a q-axis side orientation parallel to the q-axis from the d-axis side end to the q-axis side end; each magnetic orientation is convexly curved toward the anti-stator direction opposite to the winding

BRIEF DESCRIPTION OF THE DRAWINGS

Other aspects of the present disclosure will become apparent from the following description of embodiments with reference to the accompanying drawings in which:

FIGS. 34(a), 34(b) and 34(c) are views illustrating various configurations of magnets.

FIG. 35 is a partial plan view of a rotor according to a tenth modification of the fourth embodiment;

DESCRIPTION OF EMBODIMENTS

Figure 1:
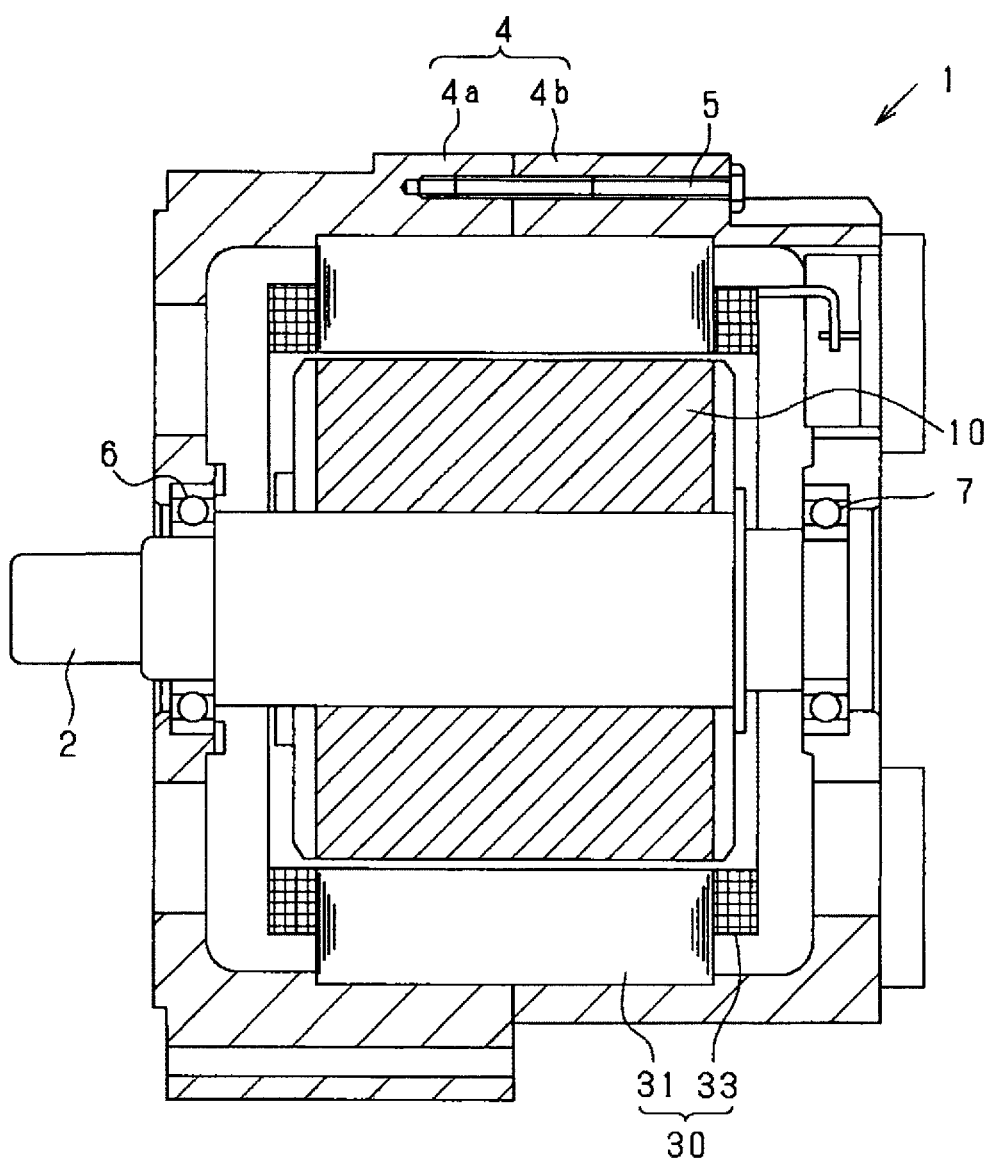
FIG. 1 is a longitudinal cross-sectional view of a rotary electric machine.

The following describes embodiments of the present disclosure with reference to the accompanying drawings.

The present disclosure embodies rotary electric machines each serving as a motor; these rotary electric machines are each for example used as a power source for vehicles. As the other applications, each of the rotary electric machines according to the present disclosure can be widely used for industrial use, traffic, home appliances, office automation equipment, and game machines.

Descriptions of elements of each embodiment can be applied to the corresponding elements, to which like reference characters are assigned, of the other embodiments.

First Embodiment

Figure 2:
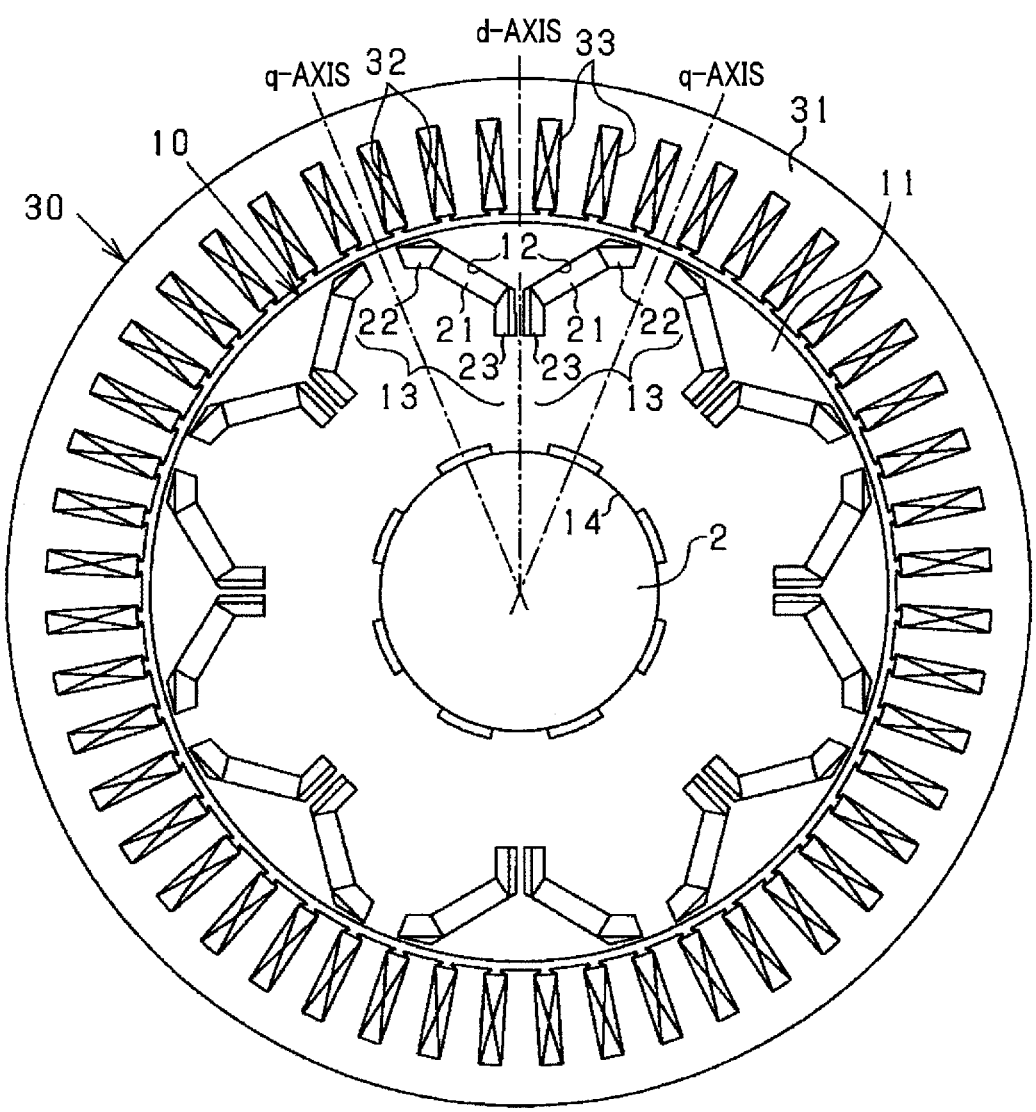
FIG. 2 is a lateral cross-sectional view of a rotor and a stator of the rotary electric machine.

The following describes a schematic structure of a rotary electric machine 1 according to the first embodiment, which is designed as an inner-rotor interior permanent magnet (IPM) motor with reference to FIGS. 1 and 2. FIG. 1 is a longitudinal cross-sectional view of a rotary electric machine taken along the direction of a rotary shaft 2 of the rotary electric machine 1, and FIG. 2 is a lateral cross-sectional view of a rotor 10 and a stator 30 taken along a direction perpendicular to the rotary shaft 2. The following defines an extending direction of the rotary shaft 2 as an axial direction, and directions extending radially around the rotary shaft 2 as radial directions. The following also defines a direction extending circumferentially around the rotary shaft 2 as a circumferential direction.

The rotary electric machine 1 includes the rotor 10, the stator 30, and a housing 4. The rotor 10 is mounted to the rotary shaft 2, and the stator 30 has an annular shape, and is located to surround the rotor 10. The housing 4 houses the rotor 10 and stator 30. The rotor 10 and stator 30 are arranged to be coaxial with each other. The rotor 10 is located at an inner side of the stator 30 in a radial direction of the stator 30 to face the stator 30. An air gap is provided between the outer circumferential surface of the rotor 10 and the inner circumferential surface of the stator 30.

The housing 4 includes a pair of tubular housing members 4a and 4b each having an opening and a bottom. The housing members 4a and 4b are integrated with each other with bolts 5 while the opening of the housing member 4a is joined to the opening of the housing member 4b. Bearings 6 and 7 are mounted to the housing 4, and the rotary shaft 2 and the rotor 10 are rotatably supported by the bearings 6 and 7.

Referring to FIG. 2, the rotor 10 includes a rotor core 11 having a hollow cylindrical shape and an inner circumferential surface to which the rotary shaft 2 is mounted. The rotor core 11 has formed magnet installation holes 12 arranged in the circumferential direction. Magnets 13, such as permanent magnets 13, are installed in the respective installation holes 12. Detailed descriptions of the magnet installation holes 12 will be described later.

The stator 30 includes a stator core 31 having a substantially cylindrical shape, and is comprised of the stack of many electromagnetic steel sheets. The stator core 31 has slots 32 each formed therethrough in its axial direction, and the slots 32 are circumferentially arranged with regular intervals therebetween. For example, three-phase stator windings 33 are wound in the slots 32. The stator core 31 of the first embodiment has 48 slots 32 arranged circumferentially with regular intervals; the 48 slots 32 allows the three-phase stator windings 33 wound therein to conform with a predetermined number of magnetic poles, i.e. poles, of the rotor 10.

Figure 3:
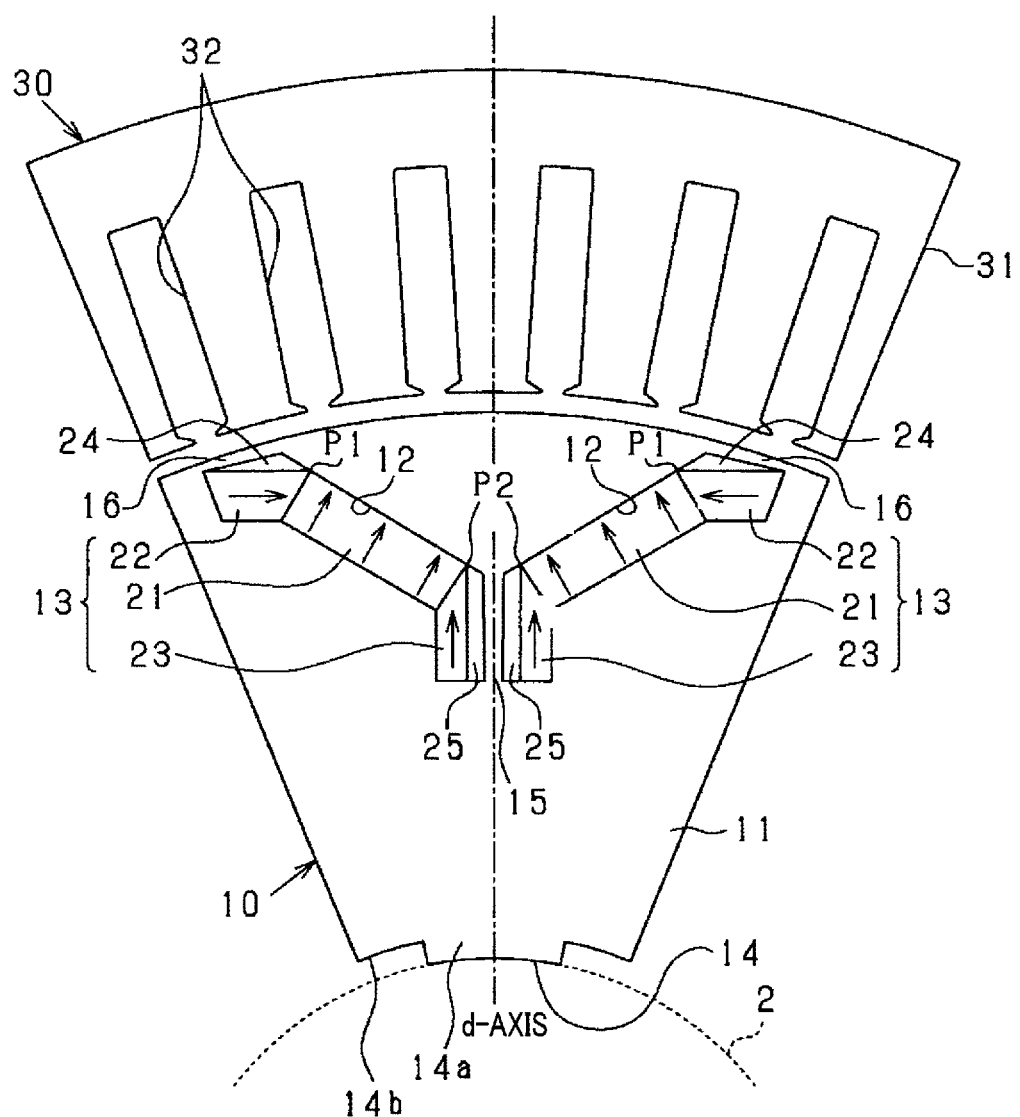
FIG. 3 is a partial plan view of the rotor and the stator of the rotary electric machine.
Figure 4:
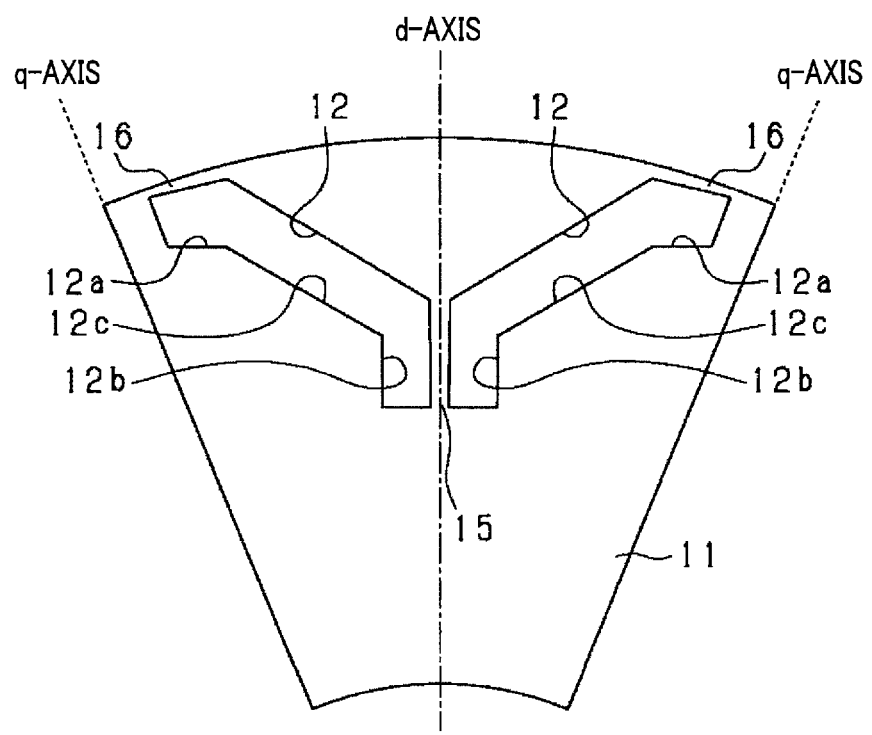
FIG. 4 is a partial plan view of the rotor and the stator of the rotary electric machine.

Next, the following describes the magnet installation holes 12 of the rotor core 11, and the magnets 13 in detail with reference to FIGS. 3 and 4. Note that FIGS. 3 and 4 each illustrate a part of the rotary electric machine 1, which corresponds to one pole in the poles, for example, 8 poles in total, of the rotary electric machine 1.

The rotor core 11 is comprised of many electromagnetic steel sheets stacked to have a substantially cylindrical shape, and has a through hole 14 formed through a center portion of the rotor core 11. Fitting the rotary shaft 2 in the through hole 14 results in the rotor core 11 being mounted to the rotary shaft 2.

Note that the electromagnetic steel sheets constituting the rotor core 11 are fixed to each other in their axial direction using fixture means, such as swages or welds.

As illustrated in FIG. 3, the rotor core 11 has a d-axis and a q-axis, and the fixture means is preferably located at a q-axis magnetic path of the rotor core 11. The rotor core 11 can be fixed to the rotary shaft 2 using adhesive, their concave-convex structures, such as their key and key-groove structures or their spline structures, or press-fitting. Note that the d-axis represents a center axis of magnetomotive force, that is, magnetic flux, and the q-axis represents an axis magnetically perpendicular to the d-axis. In other words, the q-axis usually has no magnetic polarities, i.e. north and south polarities.

The inner circumferential surface of the through hole 14 has formed convex portions 14a each located on the corresponding d-axis; each convex portion 14a projects inwardly in the corresponding radial direction to abut on the outer circumferential surface of the rotary shaft 2. Each convex portion 14a can have any shape, such as a rectangular shape, a trapezoidal shape, or a triangular crest shape. That is, the inner circumferential surface 14b of the through hole 14 has formed the convex portions 14a and concave portions each interposed between a corresponding adjacent pair of the convex portions 14a; the convex portions 14a are configured to abut on the outer circumferential surface of the rotary shaft 2.

Note that, in place of providing the convex portions 14a on the inner circumferential surface of the through hole 14, convex portions can be provided to the outer circumferential surface of the rotary shaft 2.

The magnet installation holes 12, such as sixteen magnet installation holes 12 according to the first embodiment, have been formed through a peripheral portion of the rotor core 11 in the axial direction thereof; the peripheral portion is located to be adjacent to the outer circumferential surface of the rotor core 11, which faces the inner circumferential surface of the stator 30. The magnet installation holes 12 are arranged with regular intervals in the circumferential direction.

The magnet installation holes 12 is comprised of plural pairs of magnet installation holes 12, each pair consists of two magnet installation holes 12. The two magnet installation holes 12 of each pair have a substantially V shape such that a distance between the two magnet installation holes 12 becomes larger toward the radially outside of the rotor core 11. In other words, a distance of each magnet installation hole 12 relative to the stator 30 becomes larger toward the d-axis. The magnet installation holes 12 of each pair have a symmetrical profile with respect to the d-axis, that is, the magnetic pole center axis. The first embodiment provides the total eight pairs of the magnet installation holes 12 in the rotor core 11 so as to be arranged regularly in the circumferential direction.

In the first embodiment, a pair of magnets 13 installed in the respective magnet installation holes 12 constitutes one magnetic pole. That is, the magnets 13 of eight pairs provide plural magnetic poles, i.e. eight poles in the first embodiment, with their polarities being alternately changed in the circumferential direction. The magnets 13 of each pair constituting one magnetic pole are arranged to be symmetrical with respect to the corresponding d-axis.

Next, the following describes the shape of each magnet installation hole 12 in detail. FIG. 4 illustrates the rotor core 11 having each pair of the magnet installation holes 12 in which the corresponding magnet 13 is not installed. In FIG. 4, an axis radially extending between the magnet installation holes 12 of one pair is defined as the d-axis, and axes, which are located on both outer sides of the magnet installation holes 12 to radially extend, and are magnetically perpendicular to the d-axis, are defined as the q-axes.

Referring to FIG. 4, each magnet installation hole 12 is comprised of a q-axis side portion 12a, a d-axis side portion 12b, and an intermediate portion 12c. The q-axis side portion 12a is located to be adjacent to the outer circumferential surface of the rotor core 11 and adjacent to the corresponding q-axis. The d-axis side portion 12b is located to be closer to the inner circumferential surface of the rotor core 11 and the d-axis than the q-axis side portion 12a is. The intermediate portion 12c connect between the q-axis and d-axis side portions 12a and 12b.

The q-axis side portion 12a is arranged to extend along the outer circumferential surface of the rotor core 11, and the d-axis side portion 12b is arranged to extend along the d-axis. The intermediate portion 12c is arranged to linearly join the d-axis and q-axis hole portions 12a and 12b to each other.

The d-axis side portions 12b of one pair of the magnet installation holes 12 are adjacent to each other across the d-axis, an intermediate bridge 15 of the rotor core 11 is located between the d-axis side portions 12b so as to radially extend. The intermediate bridge 15, which has a narrow width, causes magnetic flux saturation on the d-axis to thereby inhibit or block the formation of a magnetic circuit.

In addition, the q-axis side portion 12a of the magnet installation hole 12 has a radially outer wall surface located to be adjacent to the outer circumferential surface of the rotor core 11, resulting in an outer bridge 16 between the q-axis side portion 12a and the outer circumferential surface of the rotor core 11.

As illustrated in FIG. 3, as the magnet 13, a main magnet 21 is arranged in the intermediate portion 12c of each magnet installation hole 12, and auxiliary magnets 22 and 23 are respectively arranged in the d-axis and q-axis hole portions 12a and 12b. That is, the auxiliary magnets 22 and 23 are installed in each magnet installation hole 12 so as to be respectively adjacent to both ends of the main magnet 21.

The main magnet 21 has a rectangular shape in its lateral cross section perpendicular to the axial direction of the rotor core 11.

The main magnet 21 is arranged such that
(1) An orientation of easy axes of magnetization, i.e. easy-magnetization axes, formed therein or magnetization directions, that is, inner magnetic lines constituting magnetic paths, is inclined with respect to the d-axis
(2) The orientation of the easy axes of magnetization intersect with the d-axis at the stator-side portion of the rotor core 11 relative to the magnet installation hole 12

The main magnet 21 serves as a first magnet member.

The auxiliary magnets 22 and 23 are arranged to respectively abut on or be adjacent to the d-axis and q-axis side ends of the main magnet 21. The d-axis and q-axis side ends of the main magnet 21 represent ends of the main magnet 21 in a direction intersecting with the magnetic orientations of the main magnet 21. Each of the auxiliary magnets 22 and 23 has the easy-magnetization axes thereinside; the easy-magnetization axes are defined to have an orientation intersecting with the easy-magnetization axes of the main magnet 21. For example, rare-earth magnets, such as sintered neodymium magnets, can be used for the main and auxiliary magnets 21, 22, and 23.

These magnets 21 to 23 are preferably arranged to abut on the respective inner wall surfaces of the magnet installation hole 12, but these magnets 21 to 23 can be arranged to face the respective inner wall surfaces of the magnet installation hole 12 with predetermined infinitesimal clearances in consideration of the difference in linear expansion coefficient between the magnets 21 to 23 and the rotor core 11. For example, a resin material or an adhesive can be filled in each of the clearances between the magnets 21 to 23 and the respectively corresponding inner wall surfaces of the magnet installation hole 12 to thereby fix the magnets 21 to 23. Fixture of the magnets 21 to 23 using a resin material or an adhesive reduces noise due to vibration, and reduces imbalances between the phases of electrical currents applied to the stator 30 relative to the rotor 10.

The main magnets 21 each have the largest size of all the magnets 21 to 23, and each pair of the main magnets 21 is provided for the polarity of the corresponding pole. Each of the main magnets 21 has a rectangular shape in its lateral cross section.

As described above, the main magnets 21 of one pair constituting a corresponding pole each have the easy axes of magnetization. While the main magnet 21 is installed in the magnet installation hole 12, the easy axes of magnetization are directed toward the d-axis while being inclined with respect to the d-axis. In FIG. 1, N magnetic poles are illustrated, and magnetic orientations in each of the magnets 21 of a pair are directed to be close to the d-axis and directed toward the outer circumferential side of the rotor core 11.

The main magnet 21 has a higher value of the orientation ratio for each of the sides that respectively constitute the long sides of the lateral cross section thereof. The orientation of the main magnet 21 is determined to be perpendicular to the long sides. Note that, if the main magnet 21 has a magnetically aligned component directed to be perpendicular to the long sides, the main magnet 21 can have a function of outputting magnetic flux in the direction perpendicular to the long sides.

The auxiliary magnets 22 and 23 are installed in respective spaces of the magnet installation hole 12, in which the main magnet 21 is not disposed, so as to be respectively adjacent to the end surfaces of the main magnet 21 in its lengthwise direction. The magnetic orientations of each of the auxiliary magnets 22 and 23 are different from those of the main magnet 21. Specifically, the magnetization directions or aligned orientations, of each of the auxiliary magnets 22 and 23 are defined to intersect with the end surfaces of the main magnet 21 in its lengthwise direction.

In the structure illustrated in FIG. 1, the easy axes of magnetization of each of the auxiliary magnets 22 and 23 are defined to be oriented toward the end surfaces of the main magnet 21, so that magnetization orientations are also defined along the respective easy axes of magnetization.

An angle formed between the orientation of the easy axes of magnetization of the main magnet 21 at the q-axis side end and the orientation of the easy axes of magnetization of the auxiliary magnet 22 is set to an acute angle smaller than 90 degrees. In other words, an angle between the travel direction of the magnetic paths of the main magnet 21 and the travel direction of the magnetic paths of the auxiliary magnet 22 is set to an acute angle smaller than 90 degrees.

Similarly, an angle formed between the orientation of the easy axes of magnetization of the main magnet 21 at the d-axis side end and the orientation of the easy axes of magnetization of the auxiliary magnet 23 is set to an acute angle smaller than 90 degrees. In other words, an angle between the travel direction of the magnetic paths of the main magnet 21 and the travel direction of the magnetic paths of the auxiliary magnet 23 is set to an acute angle smaller than 90 degrees.

The first embodiment is configured such that the auxiliary magnets 22 and 23 are provided to be respectively adjacent to the respective ends of the main magnet 21 in its lengthwise direction. This configuration enables the main magnet 21 to be positioned while the main magnet 21 is supported by the auxiliary magnets 22 and 23. This configuration therefore eliminates formation of positioning projections at walls of the rotor core 11 surrounding the magnet installation hole 12 for fixing the main magnet 21. This makes it possible to eliminate the need of designing the rotor core 11 and the main magnet 21 in consideration of the difference in linear expansion coefficient between the positioning projections of the rotor core 11 and the main magnet 21.

As described above, the radially outer wall surface of the q-axis side portion 12a of the magnet installation hole 12 is located to be adjacent to the outer circumferential surface of the rotor core 11, resulting in the outer bridge 16 between the q-axis side portion 12a and the outer circumferential surface of the rotor core 11. The outer bridge 16, which has a narrow width, prevents self-shorting of the magnetic flux of the auxiliary magnet 22 in the vicinity of the outer circumferential surface of the rotor core 11.

The auxiliary magnets 22 and 23 in addition to the main magnet 21, which constitute the magnet 13 arranged in the magnet installation hole 12 results in an improvement of demagnetization-resistance performance at the respective both ends, i.e. the q-axis and q-axis side ends, of the main magnet 21 in its lengthwise direction. That is, the auxiliary magnets 22 and 23 extend the magnetic paths in the magnet installation hole 12 to thereby increase the magnetic permeance of the magnetic assembly 13, making it possible to strengthen the resistance of the magnetic assembly 13 against opposite magnetic field, such as demagnetization field. The following describes it in detail.

Figure 5A:
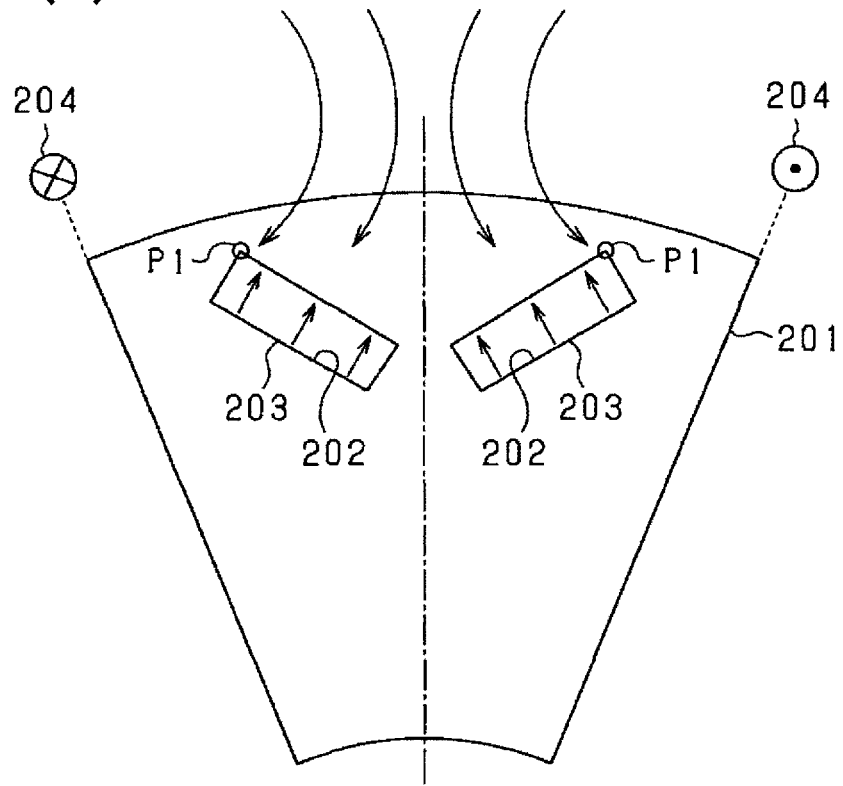
FIGS. 5(a) and 5(b) are views illustrating an influence of a demagnetization field with respect to magnets.
Figure 5B:
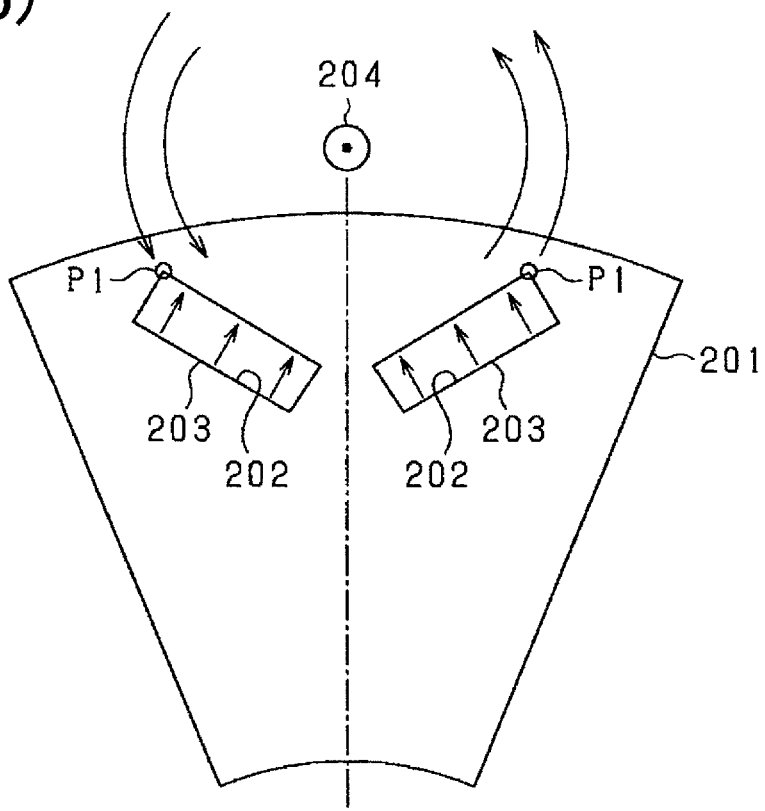
Figure 6:
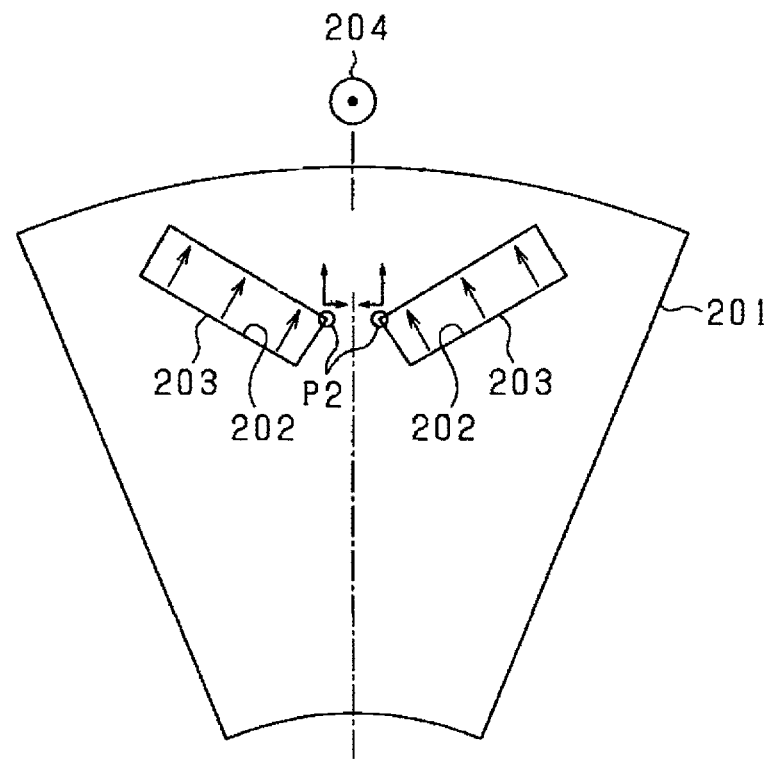
FIG. 6 is a view illustrating a mutual interference among magnetic flux components.

In particular, the following describes features of the rotor 10 while describing a rotor having magnets arranged to have a V shape illustrated in FIGS. 5(a), 5(b), and 6 as a comparative example.

In the rotor illustrated in FIGS. 5(a), 5(b), and 6, rectangular magnet installation holes 202 are formed in a rotor core 201 to be symmetrical with respect to the d-axis; the magnet installation holes 202 are arranged to have a V shape. A pair of permanent magnets 203 are respectively installed in the magnet installation holes 202 while the easy axes of magnetization of each of the permanent magnets 203 are inclined with respect to the d-axis.

Each of FIGS. 5 (a) and 5(b) illustrates that energizing conductors 204 of the stator windings causes the stator to generate a rotating magnetic field serving as a demagnetization field.

Specifically, FIG. 5(a) illustrates a first energization state where the conductor 204 located on the q-axis is energized, and FIG. 5(b) illustrates a second energization state where the conductor 204 located on the d-axis is energized. In each of the first and second energization states, the corresponding rotating magnetic field generated by the stator acts on the rotor as a demagnetization field. In the comparative example, the demagnetization field may demagnetize a corer P1 of a q-axis side end of each permanent magnet 203.

For addressing such an issue, the auxiliary magnet 22 provided to be adjacent to or abut on the q-axis side end of the main magnet 21 has the following functions.

As illustrated in FIG. 3, the auxiliary magnet 22 is configured such that the easy axes of magnetization thereof are oriented to be closer to the right angle to the q-axis than those of the main magnet 21, thus strengthening the magnetic flux of the q-axis side end of the main magnet 21 by the magnetic flux of the auxiliary magnet 22. This therefore causes the magnetic flux to be applied from the auxiliary magnet 22 to the q-axis side end of the main magnet 21; the applied magnetic flux counteracts the demagnetization flux from the stator 30. This results in an improvement of the resistance of the rotor around the q-axis against the demagnetization field.

The auxiliary magnet 22 is provided to face the surface of the q-axis side end of the main magnet 21. This increases the length of a target magnetic path in the auxiliary magnet 22 passing through a near-side corner P1 of the main magnet 21 to the stator 30, which is extracted from magnetic paths in the auxiliary magnet 22 oriented toward the surface of the q-axis side end of the main magnet 21, to be longer than the lengths of the magnetic paths in the auxiliary magnet 22 passing through the other points of the main magnet 21.

This configuration efficiently reduces demagnetization of the corner P1 of the q-axis side end of the main magnet 21; the corner P1 has the highest possibility of demagnetization in all the points of the q-axis side end of the main magnet 21. Note that the length of the magnetic path in the auxiliary magnet 22 passing through any point can be set to a constant length.

Referring to FIG. 6, the easy axes of magnetization of each permanent magnet 203 are inclined with respect to the d-axis, and an extending direction of each easy axis of magnetization intersects with the d-axis. This configuration may cause, for the north pole, the magnetic flux outputted from the right-and-left permanent magnets 203 to be oriented toward the d-axis, so that the magnetic fluxes interfere with each other. This may result in demagnetization of the permanent magnets 203.

Specifically, the magnetic flux outputted from each of the right-and-left permanent magnets 203 include magnetic flux vectors perpendicular to the d-axis, and magnetic flux vectors parallel to the d-axis. The magnetic flux vectors perpendicular to the d-axis interfere with each other. This may result in demagnetization of a d-axis side corner P2 of each permanent magnet 203.

Against these issues, the auxiliary magnet 23 located to be adjacent to the d-axis side end of each main magnet 21 performs the following functions. Specifically, as illustrated in FIG. 3, the auxiliary magnet 23 has the easy axes of magnetization that are parallel to the d-axis, so that the magnetic flux of the auxiliary magnet 23 strengthen the magnetic flux of the d-axis side end of each main magnet 21. That is, the magnetic flux of the auxiliary magnet 23 supplement opposite magnetic flux of the right-and-left main magnets 21 to thereby improve resistance of the rotor around the d-axis against the demagnetization field.

Note that, for designing torque of the rotary electric machine 1, multiplying the effective flux density of a magnet by the surface area of the magnet calculates magnet force of the magnet. Magnet force of the magnet installed in the magnet installation hole 12 depends on an inclination angle of the magnet force of the magnet with respect to the d-axis.

For this reason, the smaller an angle of the V-shaped magnet installation holes 12, i.e. the smaller the inclination angle of the lengthwise direction of the main magnet 21 with respect to the d-axis, the larger the effect of the auxiliary magnet 23.

The auxiliary magnet 23 is arranged to face the surface of the d-axis side end of the main magnet 21. The length of at least one magnetic path passing through the corner P2 closer to the stator 30 in the magnetic paths directed toward the surface of the d-axis side end of the main magnet 21 is longer than the lengths of the other magnetic paths. This efficiently reduces demagnetization of the corner P2 that has the highest possibility of demagnetization in the d-axis side end of the main magnet 21. Note that the length of the magnetic path in the auxiliary magnet 23 passing through any point can be set to a constant length.

Note that, in a conventional technology, each magnet installation hole 12 includes spaces in which no main magnet is installed, or includes a non-magnetic material or a fixing adhesive filled in each of the spaces, so that the spaces serve as dead spaces.

In contrast, the auxiliary magnets 22 and 23 are arranged in the respective dead spaces, making it possible to reinforce the magnetic flux without increasing the size of the magnet 13.

Although illustration is omitted, for the magnet 13 serving as the south pole, the easy axes of magnetization of the main magnet 21 and auxiliary magnets 22 and 23 are oriented in the opposite directions as compared with the easy axes of magnetization of the main magnet 21 and auxiliary magnets 22 and 23 of the magnet 13 serving as the north pole.

A portion in the magnet installation hole 12, in which no magnetic assembly 13 is disposed, serves as a flux barrier that reduces self-shorting of magnet flux in the rotor 10. In the structure illustrated in FIG. 3, an outer flux barrier 24 is provided in an outer peripheral region of the q-axis side portion 12a of the magnet installation hole 12. The outer flux barrier 24 reduces self-shorting of the magnetic flux at an outer peripheral portion of the rotor core 11, which is adjacent to the outer circumferential surface of the rotor core 11 facing the stator 30; the outer peripheral portion is located to be close to the auxiliary magnet 22.

In addition, the outer flux barrier 24 reduces demagnetization of the auxiliary magnet 22 due to the demagnetization field from the stator 30. A space in the outer peripheral region of the q-axis side portion 12a of the magnet installation hole 12, in which no magnetic assembly 13 is disposed, can serve as the outer flux barrier 24, or a non-magnetic material filled in the space can serve as the outer flux barrier 24.

In a region in the d-axis side portion 12b of each magnet installation hole 12, which is adjacent to the auxiliary magnet 23 and to the d-axis, an inner flux barrier 25 is provided. That is, each of the d-axis side portions 12b serves as a d-axis side expanded portion. In each of the second holes 12b, the auxiliary magnet 23 is provided, and the inner flux barrier 25 is provided to be closer to the d-axis than the auxiliary magnet 23 is.

The inner flux barriers 25 reduce magnetic flux components oriented to be perpendicular to the d-axis from the auxiliary magnets 22 and 23 that are arranged on both sides of the d-axis. The inner flux barriers 25 also reduce an inductance in the d-axis to thereby efficiently create reluctance torque. A void or a space in the region in the d-axis side portion 12b of each magnet installation hole 12, which is adjacent to the auxiliary magnet 23 and to the d-axis, can serve as the inner flux barrier 25, or a non-magnetic material filled in the space can serve as the inner flux barrier 25.

Demagnetization of each of the auxiliary magnets 22 and 23 is basically acceptable. This is because a surface of the main magnet 21, which abuts on the rotor core 11, mainly serves to output magnetic flux in the magnet 13, and the auxiliary magnets 22 and 23 serve to improve the magnetic permeance of the magnet 13. For this reason, the first embodiment uses neodymium magnets as the respective auxiliary magnets 22 and 23; the neodymium magnets have a composition with 1. A higher value of the remanent flux density Br than the main magnet 21
2. A smaller value of the coercive force iHc than the main magnet 21

Combination of different types of materials, such as neodymium magnets and ferrite magnets, can be selected as the material of each of the auxiliary magnets 22 and 23.

Magnets, which have a smaller value of the coercive force than neodymium magnets, include samarium magnets, ferrite magnets, FCC magnets, and alnico magnets in order of decreasing coercive force. That is, if a samarium magnet is selected as the main magnet 21, it is possible to select a ferrite magnet as the material of each of the auxiliary magnets 22 and 23, which sufficiently obtains desired effects in the first embodiment.

Note that, for avoiding demagnetization, a conventional technology may use magnets each configured to 1. Have a portion with a larger thickness; this portion is subjected to a large demagnetization field
2. Contain a larger percentage of heavy rare-earth elements, and/or
3. Have a finer design In contrast, the rotary electric machine 1 according to the first embodiment is configured to substantially halve the demagnetization field, making it possible to construct the rotary electric machine 1 using non rare earth magnets. Eliminating the usage of heavy rare earth elements, which are valuable in current vehicular products, enables the percentage of neodymium elements with higher flux density in the magnets to be increased. This results in the rotary electric machine 1 having the output torque more than thirty percent of the output torque of a rotary electric machine of the conventional technology while 1. Maintaining the total amount of magnets used by the machine 1, which is the same as that used by the rotary electric machine of the conventional technology
2. Maintaining or reducing the cost of the rotary electric machine 1 as compared with the cost of the rotary electric machine of the conventional technology The first embodiment described above obtains the following excellent effects.

Each magnet 13 of the rotor 10 includes the auxiliary magnet 22 in addition to the main magnet 21 that generates magnetic flux based on a predetermined polarity. The auxiliary magnet 22 is provided to abut on or be adjacent to the q-axis side end, i.e. a pole-boundary side end, of each main magnet 21 such that the easy axes of magnetization in the auxiliary magnet 22 intersect with the easy axes of magnetization of the corresponding main magnet 21.

This configuration enables the auxiliary magnet 22 to strengthen magnetic flux of the q-axis side end. This results in an improvement of demagnetization-resistance performance at the q-axis side end of the main magnet 21 against the demagnetization field, thus appropriately reducing demagnetization of the main magnet 21 serving as a magnet for generating the corresponding magnetic pole.

The auxiliary magnet 23 is provided to abut on or be adjacent to the d-axis side end of each main magnet 21 such that the easy axes of magnetization in the auxiliary magnet 23 intersect with the easy axes of magnetization of the corresponding main magnet 21.

This configuration enables the auxiliary magnet 23 to strengthen magnetic flux of the d-axis side end. This results in an improvement of demagnetization-resistance performance against mutual flux interferences in the vicinity of the d-axis, thus appropriately reducing demagnetization of the main magnet 21

There may be a high possibility of demagnetization at the corner P1 of the surface of the q-axis side end of the main magnet 21; the surface of the q-axis side end faces the q-axis. The corner P1 is closer to the stator 30 than the opposite corner of the end surface of the q-axis side end. From this viewpoint, the auxiliary magnet 22 is provided to face the surface of the q-axis side end. This increases the length of a target magnetic path in the auxiliary magnet 22 passing through the corner P1 of the main magnet 21 to be longer than the lengths of the magnetic paths in the auxiliary magnet 22 passing through the other points of the main magnet 21. That is, this configuration selects the corner P1 as a magnetic-flux strengthening point, and causes the auxiliary magnet 22 to reinforce the magnetic-flux strengthening point. This configuration efficiently reduces demagnetization of the q-axis side end of the main magnet 21.

There may also be a high possibility of demagnetization at the corner P2 of the surface of the d-axis side end of the main magnet 21; the surface of the d-axis side end faces the d-axis. The corner P2 is closer to the stator 30 than the opposite corner of the end surface of the d-axis side end. From this viewpoint, the auxiliary magnet 23 is provided to face the surface of the d-axis side end. This increases the length of a target magnetic path in the auxiliary magnet 23 passing through the corner P2 of the main magnet 21 to be longer than the lengths of the magnetic paths in the auxiliary magnet 23 passing through the other points of the main magnet 21. That is, this configuration selects the corner P2 as a magnetic-flux strengthening point, and causes the auxiliary magnet 23 to reinforce the magnetic-flux strengthening point. This configuration efficiently reduces demagnetization of the d-axis side end of the main magnet 21.

The auxiliary magnet 23 and the inner flux barrier 25 are provided in the second hole 12b, i.e. the d-axis side expanded portion, in each magnet installation hole 12. This configuration obtains the above desired effects while reducing the amount of magnet material in the auxiliary magnet 23 at the d-axis side end of the main magnet 21, thus resulting in reduction of the cost of the rotor 10.

Each of the auxiliary magnets 22 and 23 can have a smaller value of the coercive force iHc than the main magnet 21. This configuration makes it possible to magnetically strengthen the main magnet 21 while using an affordable magnet as each of the auxiliary magnets 22 and 23.

Note that each main magnet 21 can have a smaller value of the coercive force iHc than each of the auxiliary magnets 22 and 23. This configuration makes it possible to use an affordable magnet as each main magnet 21, thus reducing the cost of the magnets of the rotor 10. This configuration efficiently reduces the cost of the rotor 10, because magnet flux is substantially determined by the total surface area of all the main magnets 21.

The configuration where each of the auxiliary magnets 22 and 23 has a smaller value of the coercive force iHc than the main magnet 21 increases the resistance of the magnetic assembly 13 against demagnetization. The configuration of the rotor 10 therefore can be preferably used when the rotor 10 is subjected to a strong demagnetization field from the stator 30.

The auxiliary magnets 22 and 23 located at both ends of the main magnet 21 respectively can have different values of the coercive force iHc. This makes it possible to, even if the first degree of influence of the d-axis side end of the main magnet 21 from a demagnetization field is different from the second degree of influence of the q-axis side end of the main magnet 21 from the demagnetization field, appropriately set values of the coercive force iHc for the respective auxiliary magnets 22 and 23 in accordance with the first and second degrees of influence of the respective d-axis and q-axis side ends of the main magnet 21 from the demagnetization field.

The inner circumferential surface of the through hole 14 has formed the convex portions 14a each located on the corresponding d-axis; each convex portion 14a projects inwardly in the corresponding radial direction to abut on the outer circumferential surface of the rotary shaft 40.

While the rotor core 11 is assembled to the rotary shaft 40, each magnetic assembly 13 is subjected to corresponding stress from the inner circumferential surface of the through hole 14 of the rotor core 11 toward the radially outside. This reduces the quantity of deviation of each magnetic assembly 13 from its designed position, making it possible to reduce inconvenience, such as unintentional change of the magnetic characteristics of the corresponding magnetic assembly 13.

The following describes modifications of the rotor 10 according to the first embodiment; at least one part of the rotor 10 is modified in each modification. The following describes mainly the different points between the structure of the rotor 10 according to each modification and the structure of the rotor 10 illustrated in FIG. 1. Note that, in the following figures, other components except for the rotors 10 of the respective modifications are omitted from illustration. In each modification, the corresponding rotor 10 is arranged at the radially inner side of the stator 30 to face the stator 30.

First Modification

Figure 7:
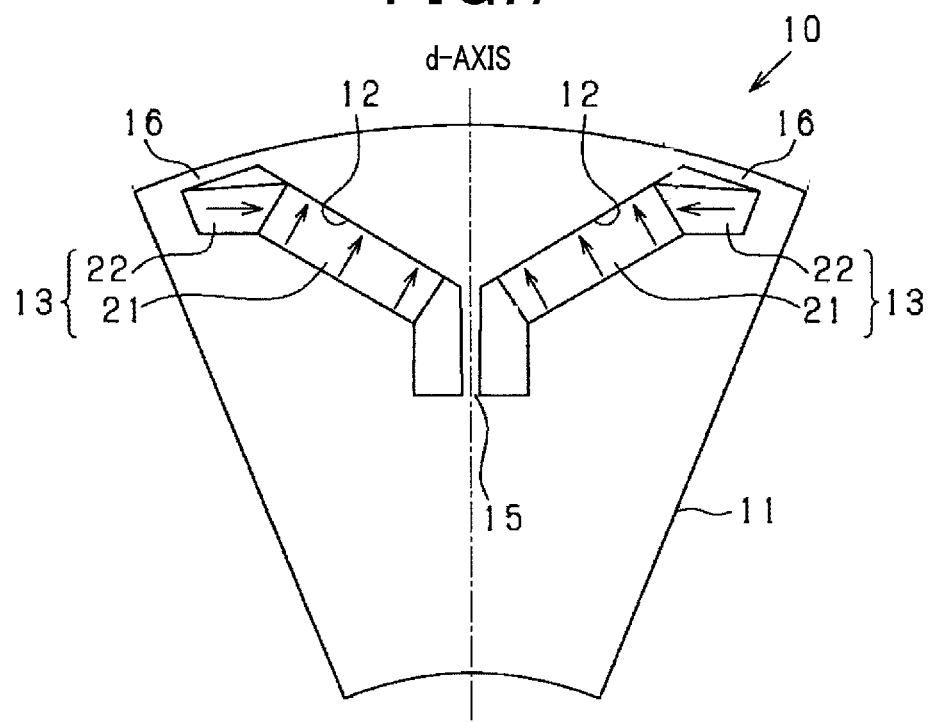
FIG. 7 is a partial plan view of a rotor according to a first modification of the first embodiment.

The rotor 10 according to the first modification illustrated in FIG. 7 includes the auxiliary magnet 22 arranged only at the q-axis side end of each main magnet 21 without using the auxiliary magnet 23. For example, if the main magnets 21 of each pair have relatively small magnetic forces that degauss with each other, it is possible to eliminate the d-axis side auxiliary magnets 23.

Second Modification

Figure 8:
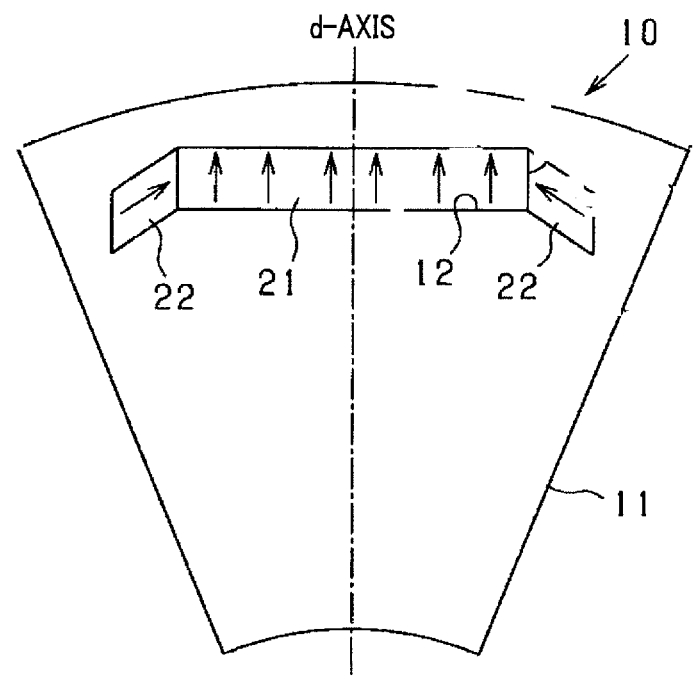
FIG. 8 is a partial plan view of a rotor according to a second modification of the first embodiment.

In the rotor 10 according to the second modification illustrated in FIG. 8, each magnet installation hole 12 is located across the corresponding d-axis that is the center of the corresponding magnetic pole, and is arranged to be perpendicular to the corresponding d-axis.

Each of the main magnets 21, which has a rectangular shape in its lateral cross section, is installed in the corresponding magnet installation hole 12. The magnet installation hole 12 has q-axis side ends, and each of the q-axis side ends is bent to extend toward the center of the rotor core 11. In each of the q-axis side ends, the corresponding auxiliary magnet 22 is installed. That is, as is the case with the rotor 10 illustrated in FIG. 7, the auxiliary magnets 22 are provided to be adjacent to the respective q-axis side ends of the main magnet 21.

Third Modification

Figure 9:
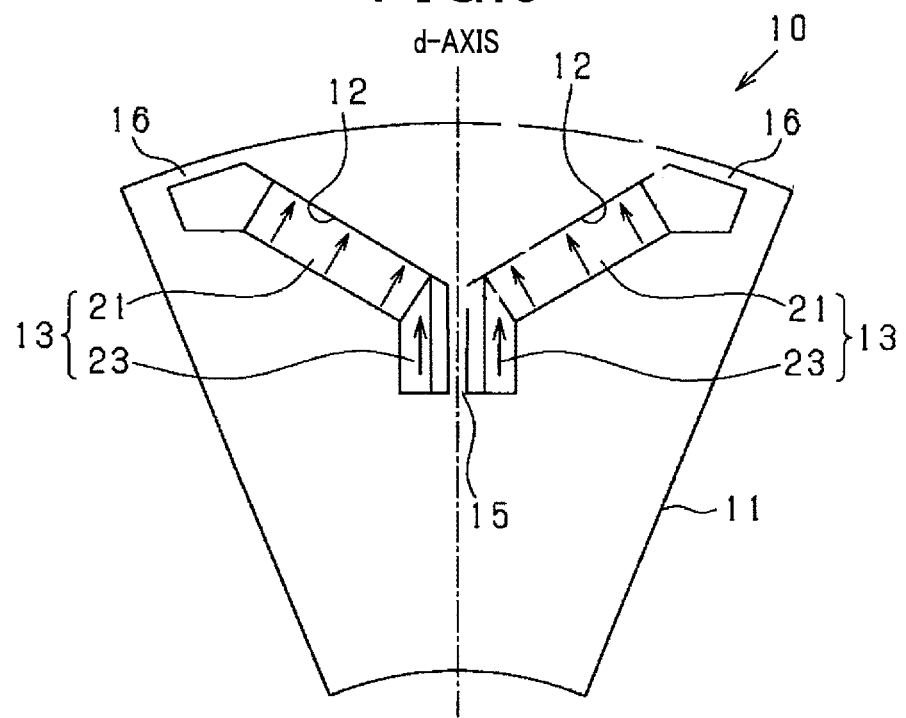
FIG. 9 is a partial plan view of a rotor according to a third modification of the first embodiment.

The rotor 10 according to the third modification illustrated in FIG. 9 includes the auxiliary magnet 23 arranged only at the d-axis side end of each main magnet 21 without using the auxiliary magnet 22. For example, if the demagnetization field from the stator 30 is relatively small, it is possible to eliminate the q-axis side auxiliary magnets 22.

Fourth Modification

Figure 10:
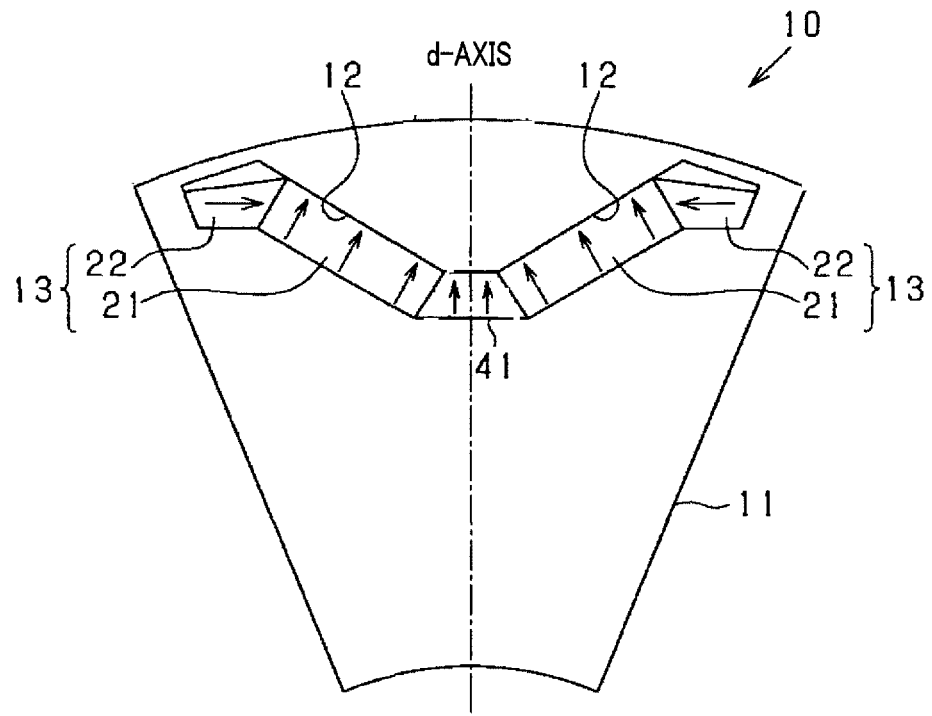
FIG. 10 is a partial plan view of a rotor according to a fourth modification of the first embodiment.

The rotor 10 according to the fourth modification illustrated in FIG. 10 is configured such that the d-axis side portions 12b of the respective magnet installation holes 12 of each pair are joined to each other. This results in the integrated magnet installation holes 12 being continuously arranged on the d-axis in the circumferential direction of the rotor 10.

An auxiliary magnet 41 is provided in the integrated combination of the d-axis side portions 12b of the integrated combination of the magnet installation holes 12. The auxiliary magnet 41 is arranged between the right-and-left pair of main magnets 21 installed in the respective magnet installation holes 12 of the integrated combination.

The auxiliary magnet 41 is located to abut on or be adjacent to the second ends 12b of the respective main magnets 21, and the magnetic orientations of the auxiliary magnet 41 are parallel to the d-axis.

The rotor 10 of the fourth modification reinforces the magnetic flux of the d-axis side end of each of the main magnets 21. That is, like the auxiliary magnet 23 illustrated in, for example, FIG. 1, the magnetic flux of the auxiliary magnet 41 supplements opposite magnetic flux of the right-and-left main magnets 21 to thereby improve resistance of the rotor around the d-axis against the demagnetization field.

Fifth Modification

Figure 11:
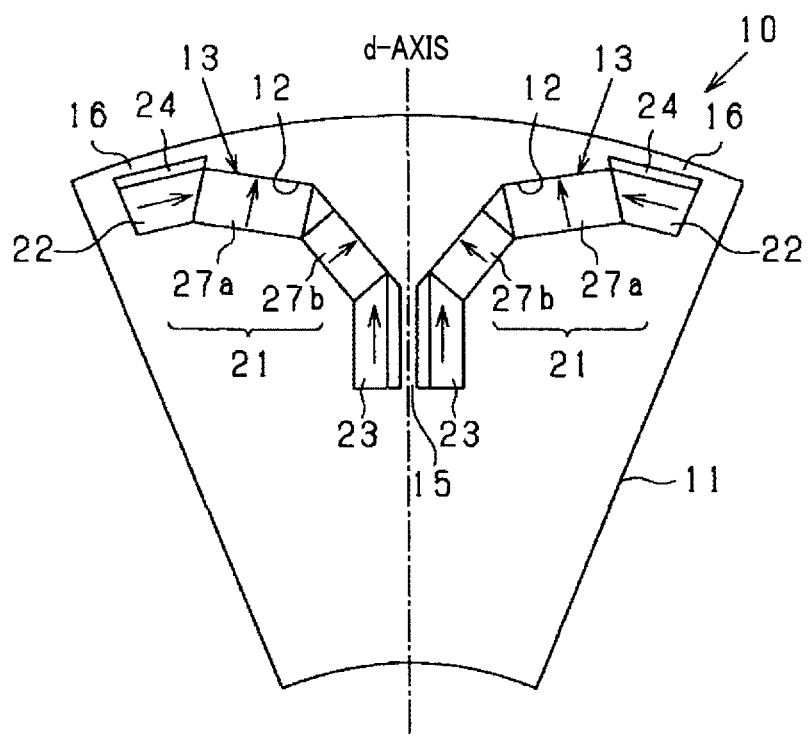
FIG. 11 is a partial plan view of a rotor according to a fifth modification of the first embodiment.

In the rotor 10 according to the fifth modification illustrated in FIG. 11, each main magnet 21 is comprised of magnet segments 27a and 27b, which has been obtained by dividing the corresponding main magnet 21 in the longitudinal direction, i.e. in the direction from the q-axis to the d-axis. The magnetic orientations of the magnet segment 27a are different from the magnetic orientations of the magnet segment 27b.

Each of the magnet segments 27a and 27b is comprised of a permanent magnet having a substantially rectangular shape in its lateral cross section. The magnet segment 27a, which is arranged to be closer to the d-axis than the magnet segment 27b thereto, is configured such that the magnetic orientations of the magnet segment 27a are directed to be closer to a direction parallel to the q-axis than the magnetic orientations of the magnet segment 27b thereto.

According to the configuration of the rotor 10 of the fifth modification, the magnetic orientations of the magnet segment 27a, which are closer to the corresponding q-axis than those of the magnet segment 27b. This results in an improvement of demagnetization-resistance performance at the d-axis side end of the main magnet 21 against the demagnetization field, thus appropriately reducing demagnetization of the main magnet 21 serving as a magnet for generating the corresponding magnetic pole.

The magnet segments 27a and 27b are arranged such that their adjacent corners face each other, and the adjacent corners convexly project toward the stator 30.

That is, the magnet segments 27a and 27b are not arranged in a single line segment, but are disposed to be respectively bent in two-line segments, so that the magnet segments 27a and 27b convexly project toward the stator 30.

This enables the main magnet 21, i.e. the magnet segments 27a and 27b, to be closer to the outer circumferential surface of the rotor core 11. This makes smaller the minimum distance between the stator 30 and the main magnet 21, thus increasing torque of the rotary electric machine 1. Making shorter the minimum distance between the stator 30 and the main magnet 21 may cause a demagnetization field to increase. The auxiliary magnets 22 and 23 of the fifth modification however reduce the influence of the increase in the demagnetization field.

This arrangement of the magnet segments 27a and 27b enables the area of a region of the rotor core 11, which is located to be closer to the stator 30 than each magnet 13, i.e. the magnet installation hole 12, is, to be smaller; the region is subjected to the sum of the magnetic flux of the stator 30 and the magnetic flux of the corresponding magnet 13. This therefore reduces, in the rotor 10, a saturation region in which magnetic saturation may occur based on the magnetic flux of the stator 30 and the magnetic flux of each magnet 13, thus more efficiently obtain the performance from each magnet 13.

Sixth Modification

Figure 12:
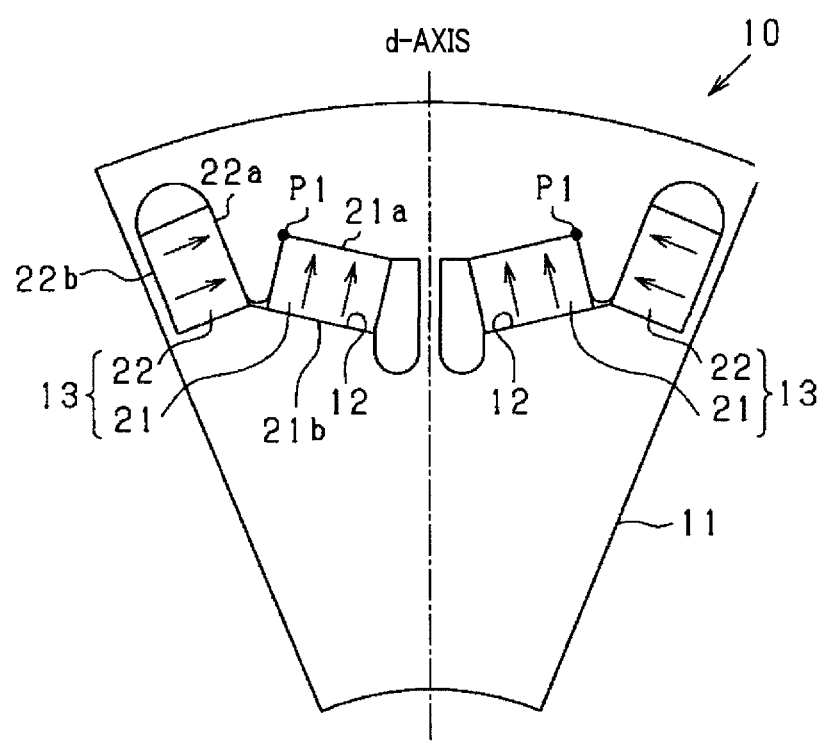
FIG. 12 is a partial plan view of a rotor according to a sixth modification of the first embodiment.

In the rotor 10 according to the sixth modification illustrated in FIG. 12, each magnet 13 includes the main magnet 21, and the auxiliary magnet 22 located to be adjacent to or abut on the q-axis side end of the main magnet 21. Each of the main magnet 21 and auxiliary magnet 22 has a rectangular shape in its lateral cross section.

The easy axes of magnetization of the main magnet 21 are perpendicular to the opposing flux effective surfaces 21a and 21b, and the magnetic orientations of the auxiliary magnet 22 are perpendicular to the opposing flux effective surfaces 22a and 22b. The main magnet 21 and auxiliary magnet 22 are disposed in the magnet installation hole 12 of the rotor core 11 such that an angle of each magnetic orientations of the main magnet 21 with respect to the d-axis or q-axis is different from an angle of each magnetic orientations of the auxiliary magnet 22 with respect to the d-axis or q-axis.

The main magnet 21 and the auxiliary magnet 22 are located to be separated from each other. Specifically, the auxiliary magnet 22 is arranged to face a surface of a q-axis side end of the main magnet 21 across a portion of the rotor core 11. The magnetic orientations of the main magnet 21 are parallel to or inclined with the d-axis, and the angle of each of the magnetic orientations of the auxiliary magnet 22 with respect to the d-axis is closer to 90 degrees than the angle of each of the magnetic orientations of the main magnet 21 with respect to the d-axis is.

The corner P1 of the main magnet 21, which is a flux strengthening point being the closest to the stator 30 in all points of the q-axis side end of the main magnet 21, is located on an extension of a corresponding magnetic orientations of the auxiliary magnet 22. The magnetic flux of the auxiliary magnet 22 strengthen the corner P1 of the main magnet 21.

Magnets, each of which has a rectangular shape in its lateral cross section and has magnetic orientations perpendicular to a pair of opposing flux effective surfaces thereof, are most versatile and superior in terms of manufacturing and cost. The sixth modification uses such magnets as the respective main magnet 21 and auxiliary magnet 22, and is configured such that an angle of each magnetic orientation of the main magnet 21 with respect to the d-axis or q-axis is different from an angle of each magnetic orientation of the auxiliary magnet 22 with respect to the d-axis or q-axis.

This configuration efficiently reinforces the q-axis side end of the main magnet 21 while the rotor 10 has a simpler structure.

Note that, in the above configuration of the sixth modification, magnets, which have the same dimensions and the same performances, such as the same product-number magnets, can be used as the respective main magnet 21 and the auxiliary magnet 22. This enables desired demagnetization-resistance performance to be obtained. Each of the main magnet 21 and the auxiliary magnet 22 however can have different dimensions in the lateral width thereof; the lateral width of each of the main magnet 21 and auxiliary magnet 22 is perpendicular to each magnetic orientation thereof. Each of the main magnet 21 and the auxiliary magnet 22 also can have different dimensions in the longitudinal length thereof; the longitudinal direction of each of the main magnet 21 and auxiliary magnet 22 is parallel to each magnetic orientation thereof.

Seventh Modification

Figure 13A:
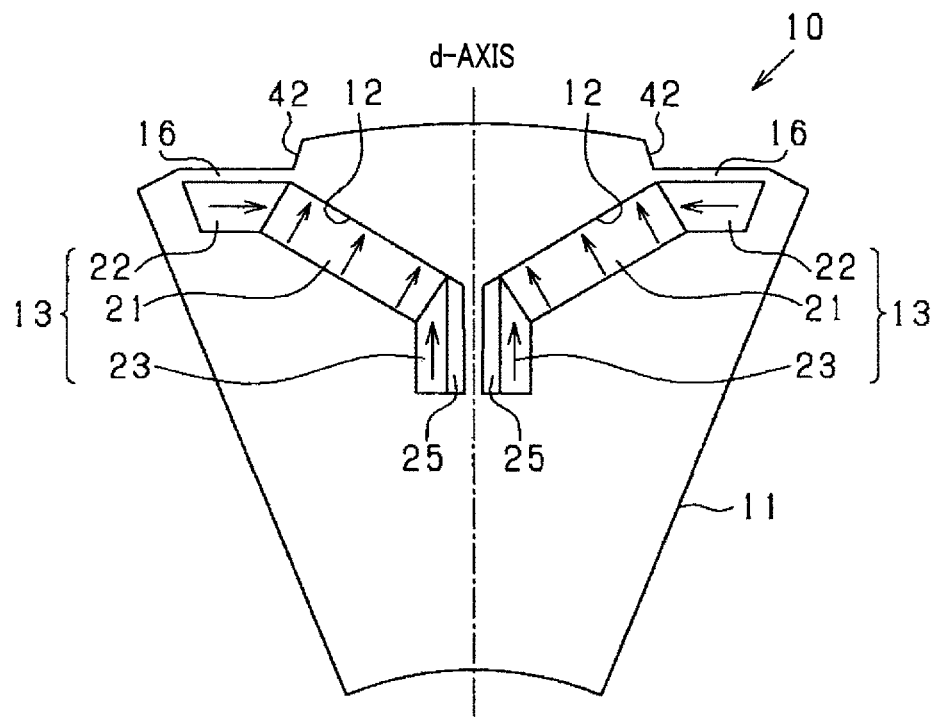
FIGS. 13(a) and 13(b) are partial plan views of a rotor according to a seventh modification of the first embodiment.

The rotor core 11 of the rotor 10 according to the seventh modification illustrated in FIG. 13(a) has formed grooves 42 on the outer circumferential surface thereof, which faces the stator 30; each of the grooves 42 extends in the axial direction of the rotor core 11. Each of the grooves 42 is arranged on the outer circumferential surface of the rotor core 11 to be radially adjacent to the corresponding auxiliary magnet 22. Each of the auxiliary magnets 22 and the corresponding one of the grooves 42 define the corresponding outer bridge 16 therebetween.

Figure 13B:
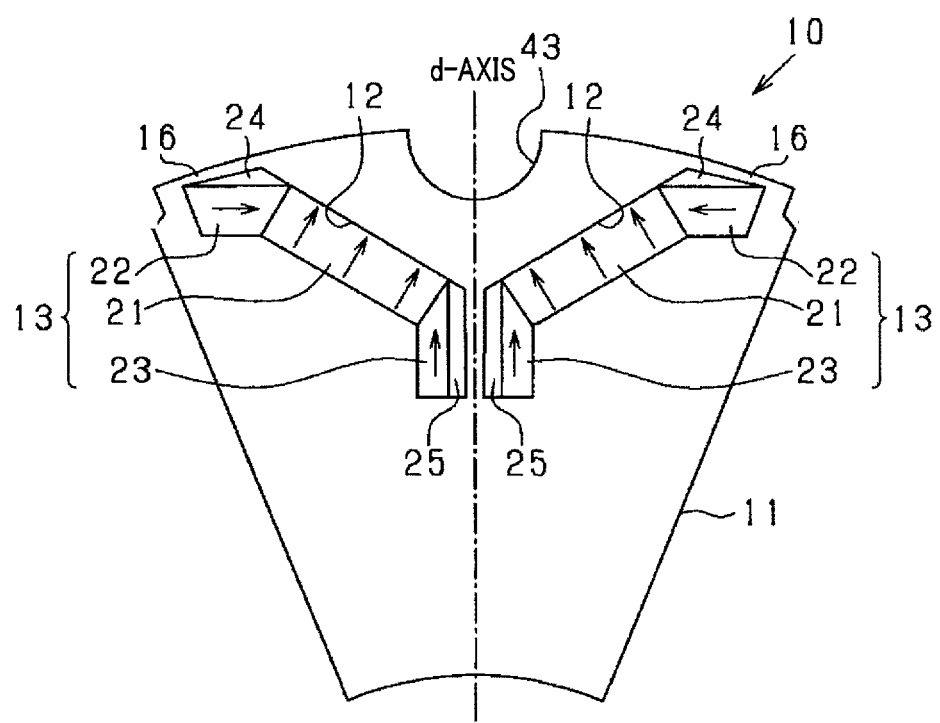

The rotor core 11 of the rotor 10 according to the seventh modification illustrated in FIG. 13(b) has formed grooves 43 on the outer circumferential surface thereof; each of the grooves 43 extends in the axial direction of the rotor core 11. Each of the grooves 43 is arranged on the corresponding d-axis of the outer circumferential surface of the rotor core 11. Grooves 43 can be formed on the outer circumferential surface of the rotor core 11 to be arranged on the respective q-axes.

The outer circumferential surface of the rotor core 11, which faces the stator 30, is likely to be magnetically saturated due to rotating magnetic flux from the stator 30 and the magnetic flux of the rotor 10. From this viewpoint, the grooves 42 and/or 43, which are formed on the outer circumferential surface of the rotor core 11 facing the stator 30 and extend in the axial direction of the rotor core 11, enable adjustment of the orientations of the lines of the magnetic flux in the outer circumferential edge of the rotor core 11 around the stator 30, and also adjustment of the quantity of the magnetic flux in the outer circumferential edge of the rotor core 11 around the stator 30. This therefore makes it possible to efficiently obtain excellent performances from each magnet 13.

Second Embodiment

The following describes the second embodiment while focusing on one or more different points of the second embodiment from the first embodiment. The second embodiment uses magnets each with easy axes of magnetization intersecting with at least one of flux effective surfaces of the corresponding magnet at an angle except for 90 degrees.

In particular, the orientation of each of the easy axes of magnetization of the magnet is changed from a predetermined first orientation through one of the opposing flux effective surfaces to a predetermined second orientation through the other of the opposing flux effective surfaces; the first orientation is different from the second orientation.

Figure 14:
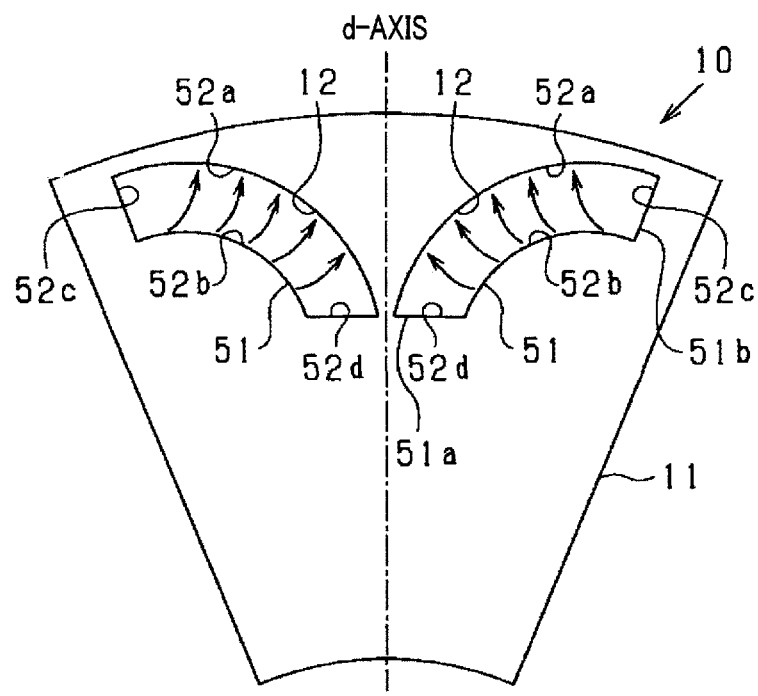
FIG. 14 is a partial plan view of a rotor according to a second embodiment.

FIG. 14 schematically illustrates a rotor 10 of the second embodiment.

Referring to FIG. 14, the rotor core 11 has formed a pair of magnet installation holes 12 for each d-axis; each of the magnet installation holes 12 has a circular-arc shape, i.e., an arched shape. Like the structure illustrated in, for example, FIG. 3, the two magnet installation holes 12 of each pair have a substantially V shape such that a distance between the two magnet installation holes 12 becomes larger toward the radially outside of the rotor core 11. The magnet installation holes 12 of each pair have a symmetrical profile with respect to the d-axis, that is, the magnetic pole center axis. In other words, a distance of each magnet installation hole 12 relative to the stator 30 becomes larger toward the d-axis.

Each magnet installation hole 12 is defined by circular-arc curved surfaces 52a and 52b with a regular interval therebetween, and flat joint surfaces 52c and 52d; the joint surface 52c joins both ends of the circular-arc curved surface 52a, and the joint surface 52d joins both ends of the circular-arc curved surface 52b. That is, each magnet installation hole 12 is surrounded by the circular-arc curved surfaces 52a and 52b and joint surfaces 52c and 52d.

The joint surface 52c, which is closer to the q-axis than the joint surface 52d is, is located to be substantially parallel to the q-axis, and the joint surface 52d, which is closer to the d-axis than the joint surface 52c is, is located to be substantially perpendicular to the d-axis.

In each magnet installation hole 12, a magnet 51, which has a shape conforming with the shape of the corresponding magnet installation hole 12, is installed. That is, the magnets 51 filled in the respective magnet installation holes 12 of each pair constitute one magnetic pole.

As illustrated in FIG. 14, each magnet 51 has opposing ends in its longitudinal direction, and each magnet 51 has magnetic orientations, i.e. orientations of inner magnetic lines, thereinside (see arrows).

Each magnet 51 is arranged such that the magnetic orientations are changed from orientations close to a q-axis side orientation perpendicular to the q-axis to orientations close to a d-axis side orientation parallel to the d-axis from the end closer to the q-axis to the end closer to the d-axis; each magnetic orientation is convexly curved toward an anti-stator direction opposite to the stator 30.

That is, each magnetic path of the magnet 51 has a circular-arc shape that passes through the magnet 51 in its lateral direction, and the orientation of each magnetic path of the magnet 51 is convexly curved toward the center axis of the rotor core 11.

The magnet 51 having the magnetic orientations defined set forth above strengthens demagnetization-resistance performance thereof against a demagnetization field based on the rotating magnetic field of the stator 30, thus appropriately reducing demagnetization of the magnet 51.

Specifically, the magnet 51 is configured such that

1. The magnetic orientations of the end closer to the q-axis oriented to be close to the q-axis side orientation that is perpendicular to the q-axis, and the magnetic orientations of the end closer to the d-axis are oriented to be close to the d-axis side orientation that is parallel to the d-axis 2. Each magnetic orientation is convexly curved toward the anti-stator direction opposite to the stator 30

This configuration makes longer each of the magnetic paths in the magnet 51 to thereby increase the magnetic flux of the magnet 51, and efficiently create magnetic flux that counters the demagnetization field from the stator 30.

In addition, each of the magnetic orientations of the d-axis side end of the magnet 51 is oriented to be closer to the direction parallel to the d-axis. This reduces demagnetization of the magnet 51 due to mutual flux interferences in the vicinity of the d-axis.

The q-axis side end of the magnet 51 is located to be radially closer to the stator 30 than the d-axis side end of the magnet 51 is, and an intermediate portion of the magnet 51 between both ends thereof is arranged to be convex toward the stator 30. That is, the magnets 51 of each pair across the corresponding d-axis have a substantially V shape, and each of the magnets 51 of the corresponding pair has a circular-arc shape that is convex toward the stator 30, i.e., the upper direction in FIG. 14. The magnet installation holes 12 of each pair is shaped to be in conformity with the respective magnets 51 of the corresponding pair.

In other words, the curved surface 52*a*, which is an outflux effective surface closer to the stator 30 than the curved surface 52*b* is, of each magnet 51 is shaped to convexly project toward the stator 30 from a line segment connecting both ends of the curved surface 52*a*.

Each magnet 51 of the above configuration of the rotor 10 is arranged to be close to the outer circumferential surface of the rotor core 11 to make shorter the distance between the stator 30 and the corresponding magnet 51, thus increasing torque of the rotary electric machine 1 of the second embodiment. Although making shorter the distance between the stator 30 and the corresponding magnet 51 may increase demagnetization field as a counter reaction of the shorter distance, the curved magnetic orientations of each magnet 51 reduce negative effects of the increased demagnetization field.

The above configuration of the rotor 10 enables the percentage of a region of the rotor core 11, which is located to be closer to the stator 30 than each magnet 51, i.e. each magnet installation hole 12, is, to be smaller; the region is subjected to the sum of the magnetic flux of the stator 30 and the magnetic flux of the corresponding magnet 51. This therefore reduces, in the rotor 10, a saturation region in which magnetic saturation may occur based on the magnetic flux of the stator 30 and the magnetic flux of each magnet 51, thus more efficiently obtaining the performance from each magnet 51.

Each magnet 51 is configured to be convex toward in a radially outward direction. This configuration enables a region in the rotor core 11, which is located radially outward from the magnet installation holes 12, to be smaller. This configuration reduces the stress concentration factor of the rotor 10 against centrifugal force, thus increasing the mechanical strength of the rotor 10.

Let us compare the structure of the rotor 10 of the second embodiment with the structure of the rotor 10 of the first embodiment illustrated in FIG. 3, which includes the auxiliary magnets 22 and 23 located at the respective ends of the main magnet 21. As a result of the comparison, the magnet 51 of the second embodiment performs both functions of the respective auxiliary magnets 22 and 23.

Note that FIG. 14 illustrates the pair of magnets 51 constituting the d-axis, but, when the pair of magnets 51 constitutes the q-axis, the magnetic orientations of each magnet 51 are oriented to be opposite to the orientations of the respective magnetic orientations illustrated in FIG. 14.

In addition, each magnet 51 illustrated in FIG. 14 can be divided into plural magnet segments. That is, each magnet 51 can be divided into plural magnet segments in the longitudinal direction of the corresponding magnet 51, and the magnet segments can be arranged such that face-to-face end surfaces of magnet segments of each adjacent pair are located to abut on each other. In this modification, the divided magnet segments are preferably arranged in each magnet installation hole 12. This arrangement prevents, for example, overcurrent loss due to change in flux interlinkage with the magnet 51 while the rotary electric machine 1 is operating.

As illustrated in FIGS. 13(*a*) and 13(*b*), the rotor core 11 of the rotor 10 illustrated in FIG. 14 can have formed grooves 42 and/or 43. This modified configuration enables adjustment of the orientations of the lines of the magnetic flux in the region of the rotor core 11 adjacently around the stator 30, and adjustment of the quantity of the magnetic flux in the region of the rotor core 11 adjacently around the stator 30. This therefore makes it possible to efficiently obtain excellent performances from each magnet 51.

Figure 15:
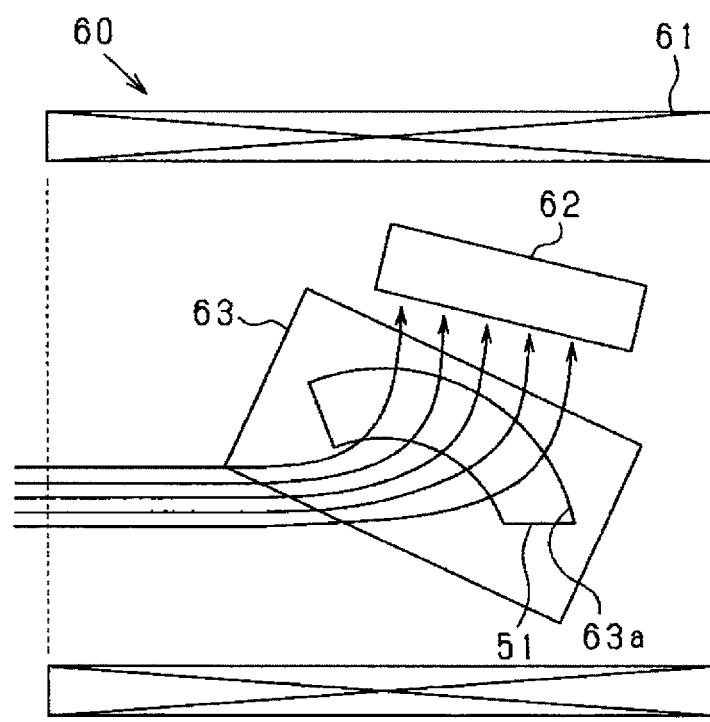
FIG. 15 is an explanation view for explaining how to magnetize a magnet using an oriented magnetic field.

Next, the following describes how to manufacture a magnet 51 used in the second embodiment. FIG. 15 is an explanation view used for explaining how to magnetize the magnet 51 using an oriented magnetic field.

As illustrated in FIG. 15, an orientation apparatus 60 includes a magnetic field coil 61, an orientation core 62, and a mold 63 serving as a magnet production mold. The orientation core 62 and mold 63 are arranged in the magnetic field coil 61.

The magnetic field coil 61 is configured to generate a magnetic field passing through the inside of the coil 61 when energized.

The orientation core 62 serves to curve the magnetic field generated by the magnetic field coil 61 to a predetermined direction. The mold 63 is arranged to enable the curved magnetic field to pass therethrough.

That is, the magnetic field coil 61 generates linear magnetic field lines, and the orientation core 62 enables the linear magnetic field lines to be curved as curved magnetic field lines. The mold 63 is composed of a non-magnetic material, and has formed a mold chamber 63*a* shaped in conformity with the shape of the magnet 51.

The following describes a method of manufacturing the magnet 51.

First, magnet materials are pulverized into magnetic powders or a magnet powdery member, and the magnetic powders are filled in the mold chamber 63*a* of the mold 63.

Next, the magnetic powders are compressed to have the predetermined shape set forth above in the mold 63. Thereafter, the orientation core 62 enables curved magnetic field lines to be generated. The curved magnetic field lines cause magnetic field lines of the compressed magnetic powders in the mold chamber 63*a* to be oriented. That is, during the orientation process, the magnetic powders are aligned such that their magnetic orientations are oriented, and compressed to be fixed as a molded body.

Thereafter, the molded body is sintered, and thereafter, magnetized. The above series of processes result in the magnet 51 being manufactured.

The above series of processes results in the magnetic orientations of the magnet 51 being changed to non-linear, i.e. circular-arc, magnetic orientations thereof.

Then, the magnet 51 is installed in the magnet installation hole 12, so that, as illustrated in FIG. 14, the magnetic orientations are changed from orientations close to the q-axis side orientation perpendicular to the q-axis to orientations close to the d-axis side orientation parallel to the d-axis from the q-axis side end to the d-axis side end; each magnetic orientation is convexly curved toward the anti-stator direction opposite to the stator 30.

The following describes modifications of the rotor 10 according to the second embodiment; at least one part of the rotor 10 is modified in each modification. The following describes mainly the different points between the structure of the rotor 10 according to each modification and the structure of the rotor 10 illustrated in FIG. 15.

First Modification

Figure 16:
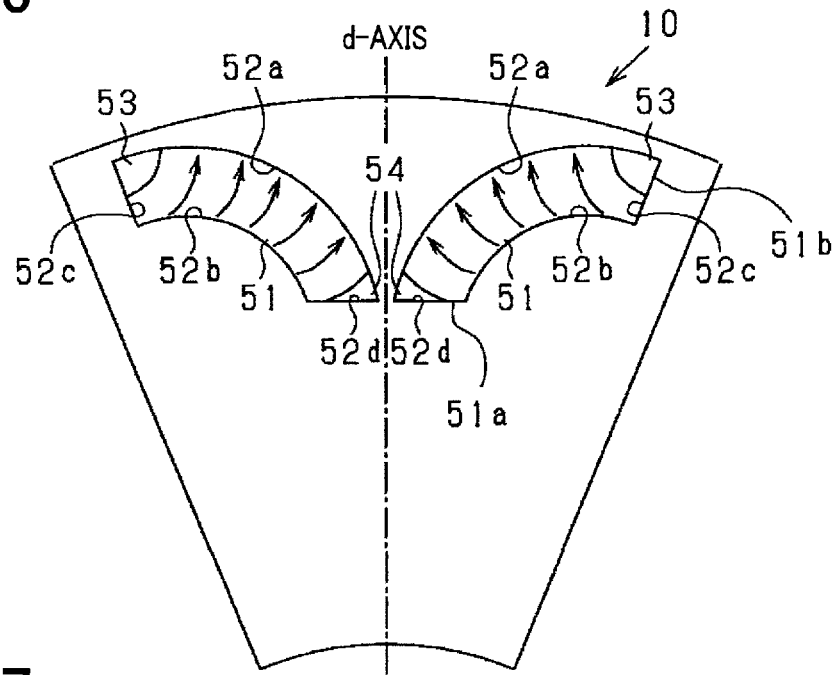
FIG. 16 is a partial plan view of a rotor according to a first modification of the second embodiment.

Each magnet 51 of the rotor 10 according to the first modification illustrated in FIG. 16 has opposing d-axis side end with a first surface and q-axis side end with a second surface, and each of the first and second surfaces of the d- and q-axis side ends is oriented to be in conformity with the magnetic orientations of the magnet 51. In the magnet installation hole 12, a flux barrier 53 is provided to be located at the outer side of the second surface of the q-axis side end, and a flux barrier 54 is provided to be located at the outer side of the first surface of the d-axis side end.

Specifically, cutting a first corner of the q-axis side end of the magnet 51 illustrated in FIG. 14, which is closer to the stator 30 than an opposing second corner is, enables the flux barrier 53 to be formed in the magnet installation hole 12 illustrated in FIG. 16. Similarly, for forming the flux barrier 54, cutting a first corner of the d-axis side end of the magnet 51 illustrated in FIG. 14, which is closer to the d-axis than an opposing second corner is, enables the flux barrier 54 to be formed in the magnet installation hole 12 illustrated in FIG. 16. Note that the surface of each of the d-axis side end and q-axis side end of the magnet 51 can be flat or curved.

Each magnetic orientation of the magnet 51 between the q-axis side end and the d-axis side end according to the second embodiment is configured to be non-linearly. This configuration enables the length of each magnetic path, i.e. the length of a corresponding inner magnetic line, to be longer than the length of each linear magnetic path of a magnet, which is perpendicular to the length direction of the magnet. Relatively shorter magnetic paths are however locally located at each end of the magnet 51. Because the length of each magnetic path at each end of the magnet 51 is proportional to the magnetic permeance at the corresponding end of the magnet 51, it is desired to prevent reduction in the length of each magnetic path at each end of the magnet 51.

From this viewpoint, each of the first and second surfaces, which intersects with the flux effective surfaces, of the d- and q-axis side ends of the magnet 51 is oriented to be in conformity with the magnetic orientations of the magnet 51. This reduces shorter magnetic paths locally present in each end of the magnet 51. In addition, each of the flux barriers 53 and 54 is provided to be located at the outer side of the corresponding one of the second and first surfaces of the q- and d-axis side ends. This reduces demagnetization at both d- and q-axis side ends of the magnet 51.

Note that any one of the first and second surfaces of the d- and q-axis side ends can be oriented to be in conformity with the magnetic orientations of the magnet 51.

Second Modification

Figure 17:
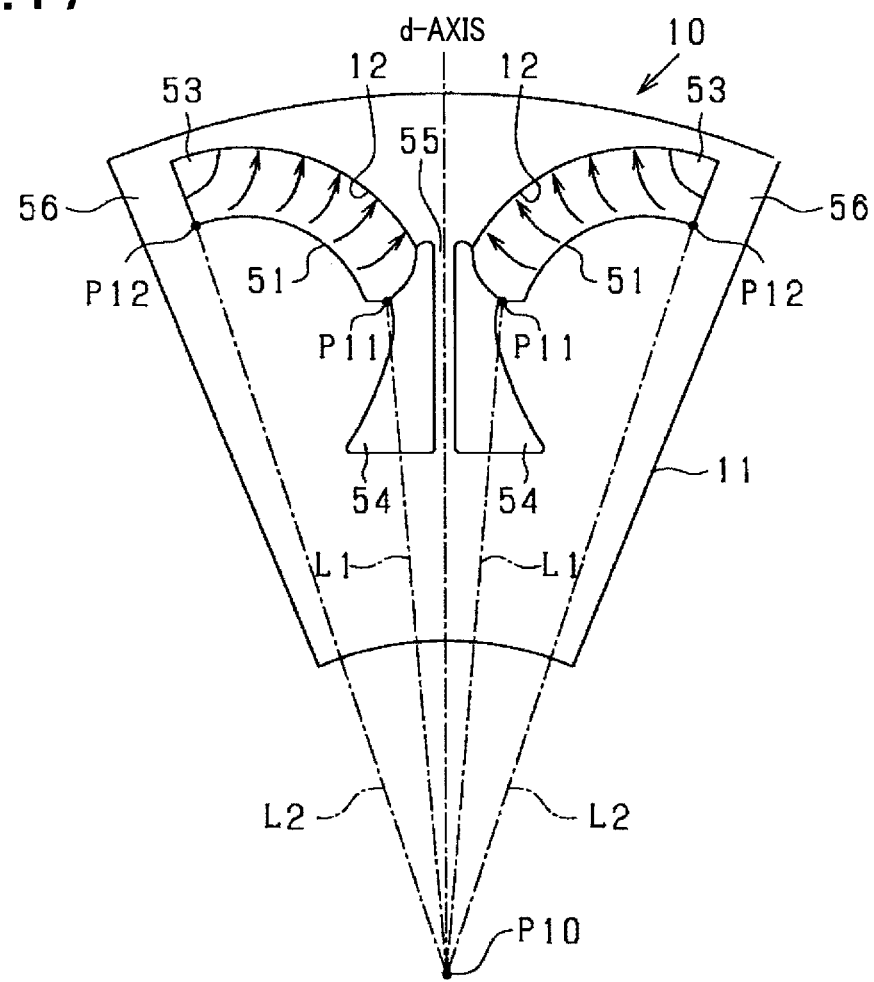
FIG. 17 is a partial plan view of a rotor according to a second modification of the second embodiment.

In the rotor 10 according to the second modification illustrated in FIG. 17, the d-axis flux barriers 54 for each pair of the magnets 51 extend beyond the respective radially inner ends of the respective magnets 51 toward the center of the rotational axis along the d-axis. The flux barriers 54, which are located to face each other across the d-axis, provide a d-axis core portion 55 therebetween. That is, the magnets 51 of each pair are arranged in the rotor core 11 across the corresponding d-axis core portion 55. The flux barriers 54 are provided to be located across the d-axis core portion 55 in the rotor core 11 to extend from the anti-stator side ends of the respective magnets 51 toward the anti-stator direction opposite to the stator 30. Each of the flux barriers 54 is configured as a part of the corresponding magnet installation hole 12. A void or a space in a part of each magnet installation hole 12 can serve as the corresponding flux barrier 54, or a non-magnetic material filled in the void or space in the part each magnet installation hole 12 can serve as the corresponding flux barrier 54. The flux barrier 54 of each magnet installation hole 12 serves as a non-magnetic member.

Each magnet 51 has a radially innermost point P11, and a q-axis core portion located on each q-axis, and a virtual line L1 connecting between the radially innermost point P11 and a rotational center P10 of the rotor core 11 is defined. At that time, the flux barrier 54 for each magnet 51 projects toward the q-axis side over the virtual line L1. The length of each flux barrier 54 in the circumferential direction of the rotor core 11 can be preferably determined in accordance with the quantity of q-axis magnetic flux and the circumferential width of a q-axis core portion 56 located between each pair of magnets 51 in the circumferential direction. That is, the flux barrier 54 can project up to a virtual line L2 connecting between a q-axis side end P12 of the magnet installation hole 12 and the rotational center P10 of the rotor core 11, or can project beyond the virtual line L2 to be closer to the q-axis by a predetermined length.

The above configuration enables the flux barriers 54 of each pair to increase the magnetic resistance of the corresponding d-axis core portion 55. This therefore prevents a short circuit between the pair of magnets 51 to accordingly utilize magnetic force more efficiently.

The d-axis core portion 55 for each pair of magnets 51 constitutes a thin portion of the rotor core 11 located on the corresponding d-axis, which extends along the corresponding d-axis. The d-axis core portion 55 for the magnets 51 of each pair strengthens the corresponding core portion to thereby prevent the magnets 51 from falling off from the rotor core 11 due to centrifugal force.

Note that the d-axis core portion 55 for the magnets 51 of each pair serves as resistance to a magnetic circuit therethrough. That is, an increase in the d-axis core portion 55 in the d-axis enables magnetic resistance of the d-axis core portion 55 to increase. This enables the magnitude of each magnetic flux vector flowing toward the d-axis from each of the magnets 51 to be smaller. That is, the rotor 10 according to the second modification of the second embodiment is configured to resist demagnetization of the magnets 51, and improve torque of the rotary electric machine 1 according to the second modification of the second embodiment.

The flux barriers, non-magnetic members, 54 for each pair of magnet installation holes 12 are provided to extend toward the anti-stator side in the rotor core 11 while the rotor core 11 is partially separated into a q-axis closer portion and a d-axis closer portion. This reduces mutual interferences of both (i) magnetic flux generated from one of the paired magnets 51 and (ii) magnetic flux generated from the other of the paired magnets 51 while properly designing the magnetic flux of each of the paired magnets 51.

Each flux barrier 54 projects toward the q-axis side over the virtual line L1, thus reducing the moment of the inertia of the rotor 10 as small as possible.

Third Modification

Figure 18:
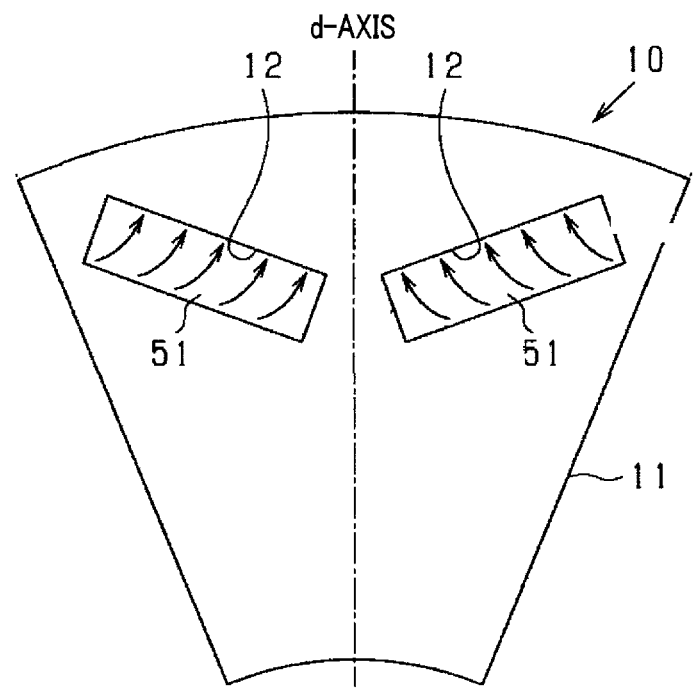
FIG. 18 is a partial plan view of a rotor according to a third modification of the second embodiment.

The rotor 10 according to the third modification illustrated in FIG. 18 has different points, as compared with the rotor 10 illustrated in FIG. 14, where each of the magnet installation holes 12 of each pair has a rectangular shape in its lateral cross section perpendicular to the axial direction of the rotor core 11, and each of the magnets 51 installed in the corresponding one of the magnet installation holes 12 also has a rectangular shape in its lateral cross section. The right and left magnet installation holes 12 of each pair have a substantially V shape across the d-axis, so that the right and left magnets 51 of each pair installed in the respective magnet installation holes 12 also have a substantially V shape across the d-axis.

In particular, each of the magnetic orientations formed in each of the magnets 51 is non-linearly changed from the q-axis side orientation at the q-axis side end to the d-axis side orientation at the d-axis side end.

Fourth Modification

Figure 19:
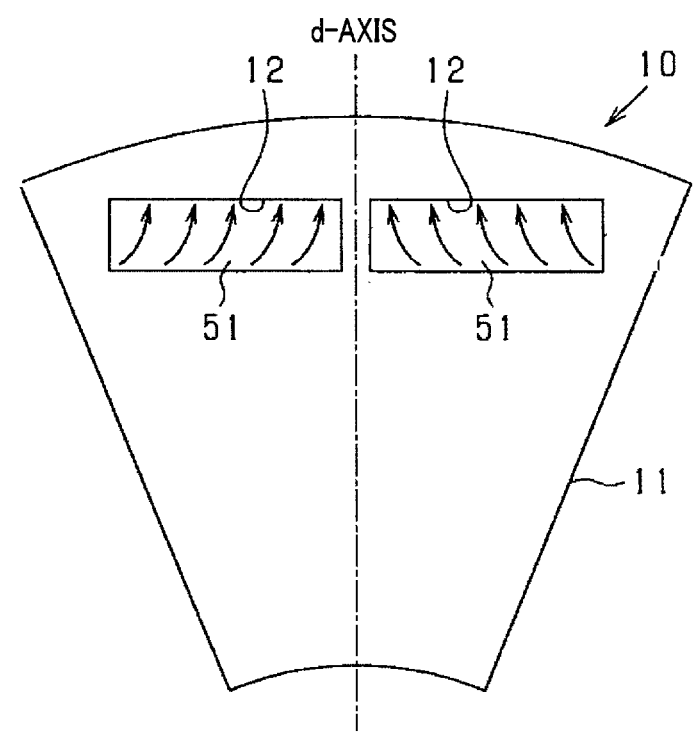
FIG. 19 is a partial plan view of a rotor according to a fourth modification of the second embodiment.

The rotor 10 according to the fourth modification illustrated in FIG. 19 has different points, as compared with the rotor 10 illustrated in FIG. 14, where each of the magnet installation holes 12 of each pair has a rectangular shape in its lateral cross section perpendicular to the axial direction of the rotor core 11, and each of the magnets 51 installed in the corresponding one of the magnet installation holes 12 also has a rectangular shape in its lateral cross section.

The right and left magnet installation holes 12 of each pair are arranged to be aligned in a direction perpendicular to the d-axis across the d-axis, so that the right and left magnets 51 of each pair installed in the respective magnet installation holes 12 are also arranged to be aligned in the direction perpendicular to the d-axis across the d-axis.

In particular, each of the magnetic orientations formed in each of the magnets 51 is changed from the q-axis side orientation at the q-axis side end to the d-axis side orientation at the d-axis side end.

Note that the right and left magnet installation holes 12 of each pair are arranged to be aligned in the direction perpendicular to the d-axis across the d-axis as illustrated in FIG. 19. In other words, a minimum separation distance between the d-axis side corner and the stator 30 is longer than a minimum separation distance between the corresponding q-axis-side corner and the stator 30.

Third Embodiment

The following describes the third embodiment while focusing on one or more different points of the third embodiment from the first embodiment. Like the second embodiment, the third embodiment uses magnets each with magnetic orientations; the orientation of each of the magnetic orientations of the magnet is changed from a predetermined first orientation through one of the opposing flux effective surfaces to a predetermined second orientation through the other of the opposing flux effective surfaces; the first orientation is different from the second orientation.

Figure 20:
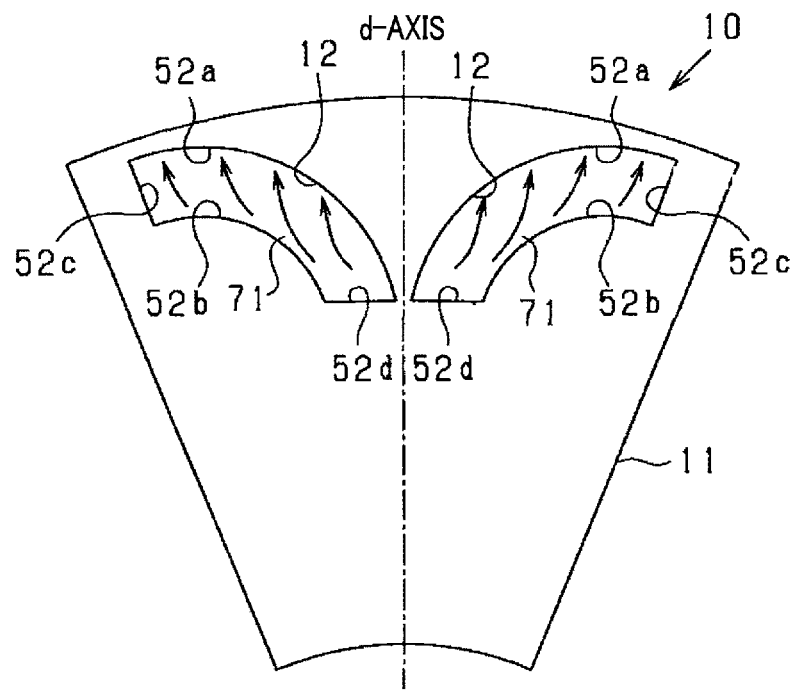
FIG. 20 is a partial plan view of a rotor according to a third embodiment.

FIG. 20 schematically illustrates a rotor 10 of the third embodiment.

Referring to FIG. 20, the rotor core 11 has formed a pair of magnet installation holes 12 for each d-axis; each of the magnet installation holes 12 has a circular-arc shape, i.e., an arched shape. Because the shape of each of the magnet installation holes 12 illustrated in FIG. 20 is substantially identical to the shape of the corresponding one of the magnet installation holes 12 illustrated in FIG. 14, the description of each of the magnet installation holes 12 illustrated in FIG. 20 is omitted.

In each magnet installation hole 12, a magnet 71, which has a shape conforming with the shape of the corresponding magnet installation hole 12, is installed. That is, the magnets 71 filled in the respective magnet installation holes 12 of each pair constitute one magnetic pole.

As illustrated in FIG. 20, each magnet 71 has magnetic orientations, i.e. orientations of magnetic lines, thereinside (see arrows). Each magnet 71 has opposing ends in its longitudinal direction.

Each magnet 71 is arranged such that the magnetic orientations are changed from orientations close to a d-axis side orientation perpendicular to the d-axis to orientations close to a q-axis side orientation parallel to the q-axis from the end closer to the d-axis to the end closer to the q-axis; each magnetic orientation is convexly curved toward an anti-stator direction opposite to the stator 30.

That is, each magnetic path of the magnet 71 is configured such that the orientation of each magnetic path of the magnet 71 is convexly curved toward the center axis of the rotor core 11.

The magnet 71 having the magnetic orientations defined set forth above strengthens demagnetization-resistance performance thereof against a demagnetization field based on the rotating magnetic field of the stator 30, thus appropriately reducing demagnetization of the magnet 71.

Specifically, the magnet 71 is configured such that

1. The magnetic orientations of the end closer to the d-axis are directed to be close to the d-axis side orientation that is perpendicular to the d-axis, and the magnetic orientations of the end closer to the q-axis are directed to be close to the q-axis side orientation that is parallel to the d-axis
2. Each magnetic orientation is convexly curved toward the anti-stator direction opposite to the stator 30

This configuration makes longer each of the magnetic paths in the magnet 71 to thereby increase the magnetic flux of the magnet 71, and efficiently create magnetic flux that counters the demagnetization field from the stator 30.

In addition, each of the magnetic orientations of the d-axis side end of the magnet 71 is oriented to be closer to the direction parallel to the d-axis. This reduces demagnetization of the magnet 71 due to mutual flux interferences in the vicinity of the d-axis.

The q-axis side end of the magnet 71 is located to be radially closer to the stator 30 than the d-axis side end of the magnet 71 is, and an intermediate portion of the magnet 71 between both ends thereof is arranged to be convex toward the stator 30. That is, the magnets 71 of each pair across the corresponding d-axis have a substantially V shape, and each of the magnets 71 of the corresponding pair has a circular-arc shape that is convex toward the stator 30, i.e., the upper direction in FIG. 20. The magnet installation holes 12 of each pair is shaped to be in conformity with the respective magnets 71 of the corresponding pair.

In other words, the curved surface 52a, which is an outflux effective surface closer to the stator 30 than the curved surface 52b is, of each magnet 71 is shaped to convexly project toward the stator 30 from a line segment connecting both ends of the curved surface 52a.

Each magnet 71 of the above configuration of the rotor 10 is arranged to be close to the outer circumferential surface of the rotor core 11 to make shorter the distance between the stator 30 and the corresponding magnet 71, thus increasing torque of the rotary electric machine 1 of the second embodiment. Although making shorter the distance between the stator 30 and each magnet 71 may increase demagnetization field as a counter reaction of the shorter distance, the curved magnetic orientations of each magnet 71 reduce negative effects of the increased demagnetization field.

The above configuration of the rotor 10 enables the percentage of a region of the rotor core 11, which is located to be closer to the stator 30 than each magnet 71, i.e. each magnet installation hole 12, is, to be smaller; the region is subjected to the sum of the magnetic flux of the stator 30 and the magnetic flux of the corresponding magnet 71. This therefore reduces, in the rotor 10, a saturation region in which magnetic saturation may occur based on the magnetic flux of the stator 30 and the magnetic flux of each magnet 71, thus more efficiently obtain the performance from each magnet 71.

Each magnet 71 is configured to be convex toward in a radially outward direction. This configuration enables a region in the rotor core 11, which is located radially outward from the magnet installation holes 12, to be smaller. This configuration reduces the stress concentration factor of the rotor 10 against centrifugal force, thus increasing the mechanical strength of the rotor 10.

Note that FIG. 20 illustrates the pair of magnets 71 constituting the d-axis, but, when the pair of magnets 71 constitutes the q-axis, the magnetic orientations of each magnet 71 are oriented to be opposite to the orientations of the respective magnetic orientations illustrated in FIG. 20.

It is preferable that a magnet installation hole 12 with one or more flux barriers can be provided between the magnets 71 of each pair illustrated in FIG. 20. This reduces lines of the magnetic flux passing through the d-axis.

In addition, each magnet 71 illustrated in FIG. 20 can be divided into plural magnet segments. That is, each magnet 71 can be divided into plural magnet segments in the longitudinal direction of the corresponding magnet 71, and the magnet segments can be arranged such that face-to-face end surfaces of magnet segments of each adjacent pair are located to abut on each other. In this modification, the divided magnet segments are preferably arranged in each magnet installation hole 12. This arrangement prevents, for example, overcurrent loss due to change in flux interlinkage with the magnet 71 while the rotary electric machine 1 is operating.

Figure 21:
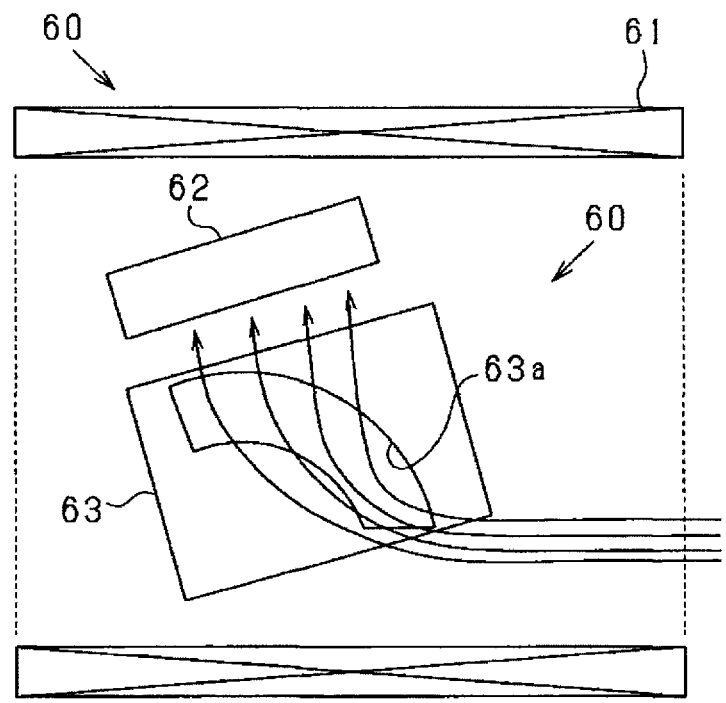
FIG. 21 is an explanation view for explaining how to magnetize a magnet using an oriented magnetic field.

Next, the following describes how to manufacture a magnet 71 used in the second embodiment. FIG. 21 is an explanation view used for explaining how to magnetize the magnet 71 using an oriented magnetic field.

As illustrated in FIG. 21, an orientation apparatus 60 includes a magnetic field coil 61, an orientation core 62, and a mold 63 serving as a magnet production mold. The orientation core 62 and mold 63 are arranged in the magnetic field coil 61. These components 60 to 63 have been described in FIG. 15.

The following describes a method of manufacturing the magnet 71.

First, magnet materials are pulverized into magnetic powders, and the magnetic powders are filled in the mold chamber 63a of the mold 63.

Next, the magnetic powders are compressed to have the predetermined shape set forth above in the mold 63. Thereafter, the orientation core 62 enables curved magnetic field lines to be generated. The curved magnetic field lines cause magnetic field lines of the compressed magnetic powders in the mold chamber 63a to be oriented. That is, during the orientation process, the magnetic powders are aligned such that their magnetic orientations are oriented, and compressed to be fixed as a molded body.

Thereafter, the molded body is sintered, and thereafter, magnetized. The above series of processes result in the magnet 71 being manufactured.

The above series of processes results in the magnetic orientations of the magnet 71 being changed to non-linear, i.e. circular-arc, magnetic orientations thereof.

Then, the magnet 71 is installed in the magnet installation hole 12, so that, as illustrated in FIG. 20, the magnetic orientations are changed from orientations close to the d-axis side orientation perpendicular to the d-axis to orientations close to the q-axis side orientation parallel to the q-axis from the d-axis side end to the q-axis side end; each magnetic orientation is convexly curved toward the anti-stator direction opposite to the stator 30.

Modification of Magnet Manufacturing Method

It is possible to use the following method as a method of manufacturing a magnet in which curved magnetic orientations are defied.

Figure 22A:
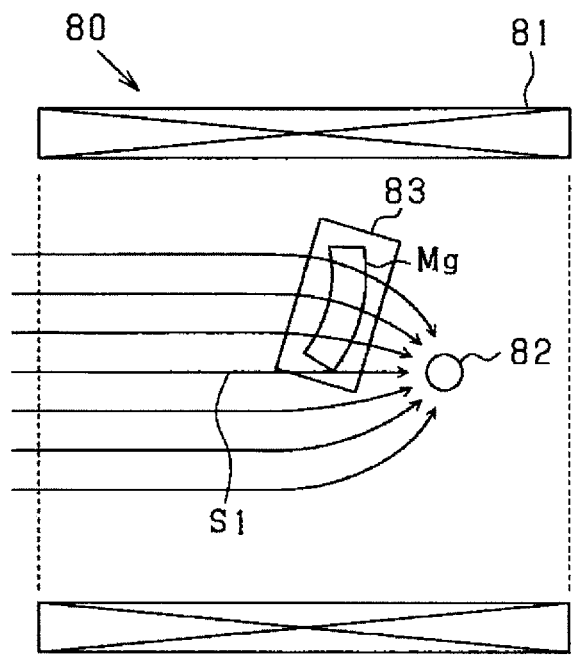
FIGS. 22(a) and 22(b) are explanation views for explaining how to magnetize a magnet using an oriented magnetic field.
Figure 22B:
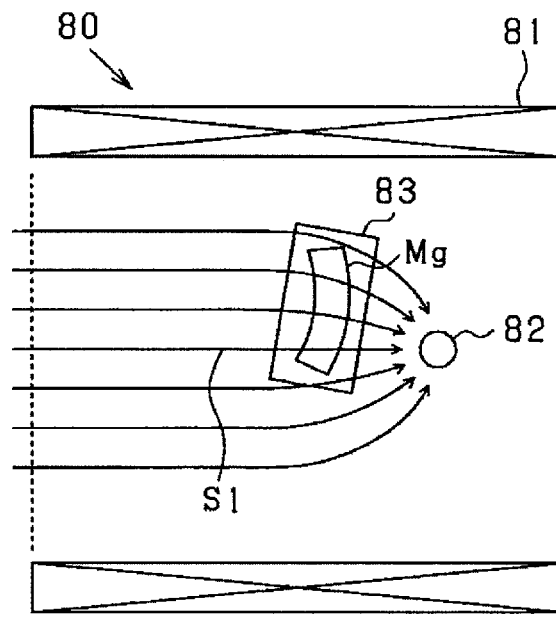

In each of FIGS. 22(a) and 22(b), an orientation apparatus 80 includes a magnetic field coil 81, an orientation core 82, and a mold 83 serving as a magnet production mold. The orientation core 82 and mold 83 are arranged in the magnetic field coil 81. The structure of the orientation apparatus 80 is basically identical to the structure of the orientation apparatus 60 except that the shape of the orientation core 82 is different from the shape of the orientation core 62.

The orientation core 82 is disposed at a radially center position of the magnetic field coil 81. The orientation core 82 of the third embodiment has a circular cross section, so that oriented magnetic field lines are focused onto the center of the orientation core 82. In the oriented magnetic field lines, a line S1, which linearly extends toward the orientation core 82, so that the line S1 is defined as an orientation center.

In FIG. 22(a), a curved magnetic field includes opposing first and second regions partitioned by the orientation center S1. Orientation of a magnet is performed in one of the first and second regions. In FIG. 22(b), orientation of a magnet is performed in both the first and second regions across the orientation center S1.

The following describes a method of manufacturing a magnet Mg.

First, magnetic powders are filled in the mold 83.

Next, the orientation core 82 enables magnetic field lines generated by the magnetic field coil 81 to be curved, and the curved magnetic field lines cause magnetic field lines of the magnetic powders in the mold 83 to be oriented. Thereafter, the molded body is sintered, and thereafter, magnetized.

If polygonal permanent magnets are installed in a rotor, these polygonal permanent magnets are disposed in a linear magnetic field while having respectively different angles with respect to the linear magnetic field lines, so that orientation of each of the polygonal permanent magnets is performed.

Fourth Embodiment

The following describes the fourth embodiment while focusing on one or more different points of the fourth embodiment from the first embodiment. The fourth embodiment uses magnets each with magnetic orientations intersecting with at least one of flux effective surfaces of the corresponding magnet at an angle except for 90 degrees.

In particular, the orientation of each of the magnetic orientations of each magnet is inclined with respect to the corresponding d-axis at an angle except for 90 degrees, and each of the magnetic orientations intersects with the flux effective surfaces at an angle except for 90 degrees.

Figure 23:
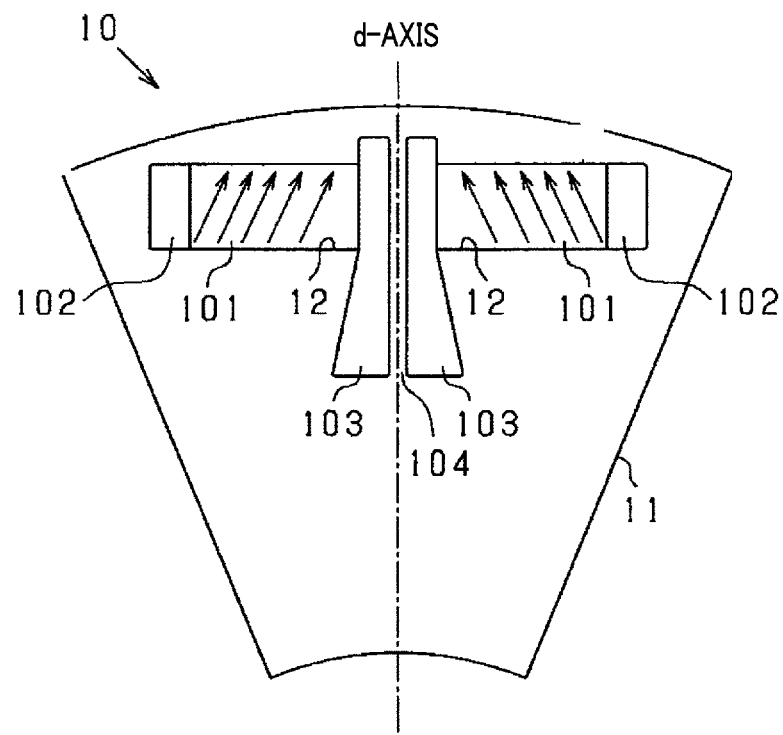
FIG. 23 is a partial plan view of a rotor according to a fourth embodiment.

FIG. 23 schematically illustrates a rotor 10 of the fourth embodiment.

Referring to FIG. 23, the rotor core 11 has formed a pair of magnet installation holes 12 for each d-axis; each of the magnet installation holes 12 extends in perpendicular to the corresponding d-axis. In other words, a distance between each of the magnet installation holes 12 and the stator 30 becomes larger toward the radially outside of the rotor core 11. The magnet installation holes 12 of each pair have a symmetrical profile with respect to the d-axis, that is, the magnetic pole center axis. Eight pairs of the magnet installation holes 12 are arranged with regular intervals in the circumferential direction.

A pair of magnets 101 installed in each pair of magnet installation holes 21 constitutes one magnetic pole. That is, the magnets 101 of eight pairs provide plural magnetic poles, i.e. eight poles in the first embodiment, with their polarities being alternately changed in the circumferential direction. The magnets 101 of each pair constituting one magnetic pole are arranged to be symmetrical with respect to the corresponding d-axis.

Each magnet 101 has a rectangular shape in its lateral cross section. Each magnet 101 has magnetic orientations, i.e. orientations of magnetic field lines, which are magnetic paths, of the magnet 101, and the magnetic orientations are oriented to be inclined with respect to the d-axis, and each of the magnetic orientations intersects with the flux effective surfaces 101a and 101b at an angle except for 90 degrees.

In particular, each of the magnetic orientations of each magnet 101 is oriented to intersect with two side surface, i.e. a stator-closer side surface and an anti-stator side surface, which respectively serve as magnet effective surfaces, at an angle except for 90 degrees.

In addition, the magnetic orientations of each magnet 101 are inclined with respect to each of the flux effective surfaces 101a and 101b, and intersect with each other at a region of the rotor core 11 closer to the stator 30 than the corresponding magnet installation hole 12. For example, rare-earth magnets, such as sintered neodymium magnets, can be used for the magnets 101.

The orientations of the magnetic orientations of one of the magnets 101 arranged across the d-axis are different from the orientations of the magnetic orientations of the other of the magnets 101 arranged across the d-axis. The magnetic orientations of each of the magnets 101 linearly extend and are parallel to each other.

Because the magnetic orientations of the magnet 101 intersect with the flux effective surfaces 101a and 101b at an angle except for 90 degrees, the length of each magnetic path, i.e. the length of each magnetic line, formed in the magnet 101 becomes longer than the length of each magnetic line formed in a magnet whose magnetic orientations are perpendicular to the flux effective surfaces of the magnet. This longer length of each magnetic path, i.e. the length of each internal magnetic line, strengthens the magnetic flux of the magnet 101, thus improving demagnetization-resistance performance of the magnet 101 against the demagnetization field due to the rotating magnetic flux of the stator 30.

Note that, in FIG. 23, the magnets 101 serving as the north pole are illustrated. If the magnets 101 serve as the south pole, the magnetic orientations of each of the magnets 101 are oriented in the opposite directions as compared with the magnetic orientations of the corresponding one of the magnets 101 serving as the north pole.

Portions in the magnet installation hole 12, in which no magnets 101 are disposed, serve as flux barriers 102 and 103, each of which reduces self-shorting of magnet flux in the rotor 10. Specifically, the magnet installation hole 12 has a first end closer to the q-axis in the lengthwise direction of its lateral cross section, and a second end closer to the d-axis in the lengthwise direction of its lateral cross section. The first and second ends of the magnet installation hole 12 respectively serve as the flux barriers 102 and 103. The flux barrier 102 provided at the q-axis side end of the magnet installation hole 12, which will be referred to as an outer flux barrier 102, reduces self-shorting of the magnetic flux around the q-axis side end.

In particular, the second end of the magnet installation hole 12 closer to the d-axis extends along the d-axis toward both the stator 30 and the rotary shaft 2, resulting in the flux barrier 103, which will be referred to as an inner flux barrier 103, provided at the d-axis side end also extending along the d-axis.

The inner flux barriers 103 of each pair of the magnet installation holes 12 reduce the lines of magnetic flux oriented to be perpendicular to the d-axis from the magnets 101 that are arranged on both sides of the d-axis. The inner flux barriers 103 also reduce an inductance in the d-axis to thereby efficiently create reluctance torque. A void or a space in the region at each of the first and second ends of the magnet installation hole 12 serves as the corresponding one of the flux barriers 102 and 103, or a non-magnetic material filled in the space can serve as the corresponding one of the flux barriers 102 and 103. A portion of the core 11 located between the flux barriers 102 and 103 serves as a center bridge 104 extending along the d-axis.

The fourth embodiment described above obtains the following excellent effects.

In the rotor 10 of the interior permanent magnet rotary electric machine, the rotating magnetic field from the stator 30 may act as a demagnetization field on the rotor 10, so that the demagnetization field may demagnetize a region of each magnet 101, which is close to the outer circumferential surface of the rotor core 11 facing the stator 30.

From this viewpoint, each magnet 101 of the fourth embodiment is configured such that the magnetic orientations of the corresponding magnet 101 are inclined with respect to the d-axis and each intersect with the flux effective surfaces, each of which generates magnetic flux, of the corresponding magnet 101 at an angle except for 90 degrees.

This configuration enables the length of each magnetic path, i.e. the length of each magnetic line, formed in the corresponding magnet 101 to become longer than the length of each magnetic line formed in a magnet whose magnetic orientations are perpendicular to the flux effective surfaces of the magnet. This longer length of each magnetic line strengthens the magnetic flux of the magnet 101, thus improving demagnetization-resistance performance of the magnet 101 against the demagnetization field due to the rotating magnetic flux of the stator 30. This therefore properly reduces demagnetization of each magnet 101.

The magnets 101 are respective located across the d-axis in both first and second regions partitioned by the d-axis. The magnetic orientations of each of the magnets 101 are inclined with respect to the flux effective surfaces of the corresponding one of the magnets 101, and the magnetic orientations of one of the magnets 101 cross with the magnetic orientations of the other of the magnets 101 at a region in the rotor core 11, which is closer to the stator 30 than the corresponding magnet installation hole 12 is. This efficiently strengthens magnetic flux on the d-axis while improving demagnetization-resistance performance of the corresponding one of the magnets 101 against the demagnetization field.

When the magnet 101 has a rectangular shape in its lateral cross section, the magnetic orientations of the magnet 101 are oriented to intersect with the opposing side surfaces of the magnet 101 at a non-right angle. This configuration enables the length of each magnetic path, i.e. the length of each magnetic line, formed in the corresponding magnet 101 to become longer than the minimum distance between the opposite side surfaces. This longer length of each magnetic path strengthens the magnetic flux of the magnet 101, thus improving demagnetization-resistance performance of the magnet 101 against the demagnetization field.

Note that, for avoiding demagnetization, a conventional technology may use magnets each configured to
1. Have a portion with a larger thickness; this portion is subjected to a large demagnetization field
2. Contain a larger percentage of heavy rare-earth elements, and/or
3. Have a finer design In contrast, the rotary electric machine 1 according to the fourth embodiment is configured to devise the magnetic orientations in each magnet 101 to thereby reduce demagnetization of the corresponding magnet 101 due to a demagnetization field. This makes it possible to construct the rotary electric machine 1 using non heavy rare earth magnets without the need of increasing the size of each magnet 101.

Eliminating the usage of heavy rare earth elements, which are valuable in current vehicular products, enables the percentage of neodymium elements with higher flux density in the magnets to be increased. This results in the rotary electric machine 1 increasing the output torque while
1. Maintaining the total amount of magnets used by the machine 1, which is the same as that used by the rotary electric machine of the conventional technology
2. Maintaining or reducing the cost of the rotary electric machine 1 as compared with the cost of the rotary electric machine of the conventional technology Usually, a magnet material is cut into magnets such that magnetic orientations in each magnet are parallel to a cut surface. This is because parallelizing an orientation magnetic field for producing magnets using a cut surface enables the number of magnets for one magnetization of the magnets using an orientation magnetic field to be maximized.

From this viewpoint, each magnet 101 according to the fourth embodiment, which has a rectangular cross section, has oblique magnetic orientations. That is, each magnet 101 has been magnetically oriented such that the length of a magnetic path, which passes through a selected corner of the corresponding magnet 101 in the rectangular cross section, is longer than the length of a lateral side of the corresponding magnet 101; the selected corner is most likely demagnetized.

Additionally, each magnet 101 has been magnetically oriented such that the magnetic path passing through the selected corner is obliquely inclined with respect to the orthogonal direction orthogonal to each of the flux effective surfaces 101a and 101b.

This improves demagnetization resistance of the selected corner of each magnet 101. This reduces, although the number of magnets 101 for one magnetization of the magnets 101 using an orientation magnetic field is reduced, the weight of each magnet 101. This results in many magnets 101 being obtained for one magnetic orientation in the magnets 101, and makes it possible to reduce the quantity of a magnet material, such as a neodymium material, for each magnet 101, thus reducing the manufacturing cost of the magnets 101.

According to the discloser's estimate, it is possible to reduce the weight of the magnet 101 by an approximately 30 percent as compared with a magnet having magnetic force that is the same as magnetic force of the magnet 101. This therefore results in the rotary electric machine 1 having a smaller amount of rare earth elements, a smaller weight, and/or a smaller moment of the inertia thereof. These features enable the rotary electric machine 1 to have an improved tracking performance and an improved mechanical reliability, thus contributing to reduction in energy consumption of the rotary electric machine 1 and/or improvement of the safety of the rotary electric machine 1.

The following describes modifications of the rotor 10 according to the fourth embodiment; at least one part of the rotor 10 is modified in each modification. The following describes mainly the different points between the structure of the rotor 10 according to each modification and the structure of the rotor 10 illustrated in FIG. 23. Note that, in the following figures, other components except for the rotors 10 of the respective modifications are omitted from illustration. In each modification, we describe the structure of the rotor 10 using a partial plan view illustrating one pole portion of the corresponding rotor 10 having the d-axis located as the center of the one pole portion thereof.

First Modification

Figure 24:
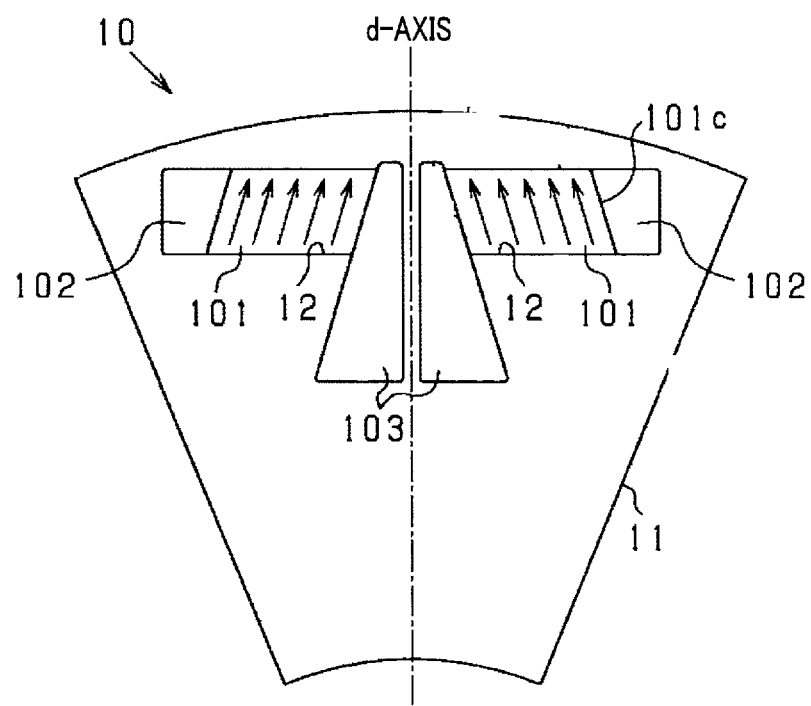
FIG. 24 is a partial plan view of a rotor according to a first modification of the fourth embodiment.

Each of the magnets 101 of the rotor 10 according to the first modification illustrated in FIG. 24 is configured such that a surface of the q-axis side end is oriented to be in conformity with an angle of each magnetic orientation with respect to the flux effective surfaces, and a surface of the d-axis side end is oriented to be in conformity with an angle of each magnetic orientation with respect to the effective surfaces.

That is, the orientation of the surface of each of the q- and d-axis side ends is defined to be in conformity with each axis of magnetization. In other words, the orientation of the surface of each of the q- and d-axis side ends is identical to the orientation of each axis of magnetization in planer view as seen in planar view. The flux barrier 102 is arranged at the outer side of the q-axis side end, and the flux barrier 103 is arranged at the outer side of the d-axis side end.

Note that, in FIG. 24, each magnet 101 is configured such that the
1. The surface of the q-axis side end is oriented to be in conformity with the angle of each magnetic orientation with respect to the flux effective surfaces 2. The surface of the d-axis side end is oriented to be in conformity with the angle of each magnetic orientation with respect to the flux effective surfaces In place of this configuration, each magnet 101 can be configured such that only the surface of the q-axis side end is oriented to be in conformity with the angle of each magnetic orientation with respect to the flux effective surfaces. The surface of the d-axis side end can be oriented to be parallel to the d-axis. That is, the magnet 101 can have a parallelogram shape in its lateral cross section illustrated in FIG. 24, or a trapezoidal shape in its lateral cross section in place of the rectangular shape in its lateral cross section.

As described above, each magnetic orientation in the magnet 101 is oriented to intersect with the flux effective surfaces at a non-orthogonal angle. This configuration enables the length of each magnetic path in the magnet 101 to be longer than the length of each magnetic path in another configuration of the magnet 101 in which each magnetic orientation in the magnet 101 is directed to perpendicularly intersect with the flux effective surfaces. However, the lengths of partial magnetic paths in each end of the magnet 101 may be smaller.

From this viewpoint, the surface of the q-axis side end 101c is oriented to be in conformity with the angle of each magnetic orientation with respect to the flux effective surfaces, thus reducing partial magnetic paths with smaller lengths in each end of the magnet 101.

Note that the magnet 101 illustrated in FIG. 24 is configured such that each end of the magnet 101, which does not contribute to an increase in magnetic flux, has been obliquely eliminated, resulting in the amount of magnet in the rotor 10 illustrated in FIG. 24 being smaller than the amount of magnet in the rotor 10 illustrated in FIG. 23. This results in the number of cavities in the mold being larger and the quantity of magnetic materials putted into the mold being smaller.

Second Modification

Figure 25:
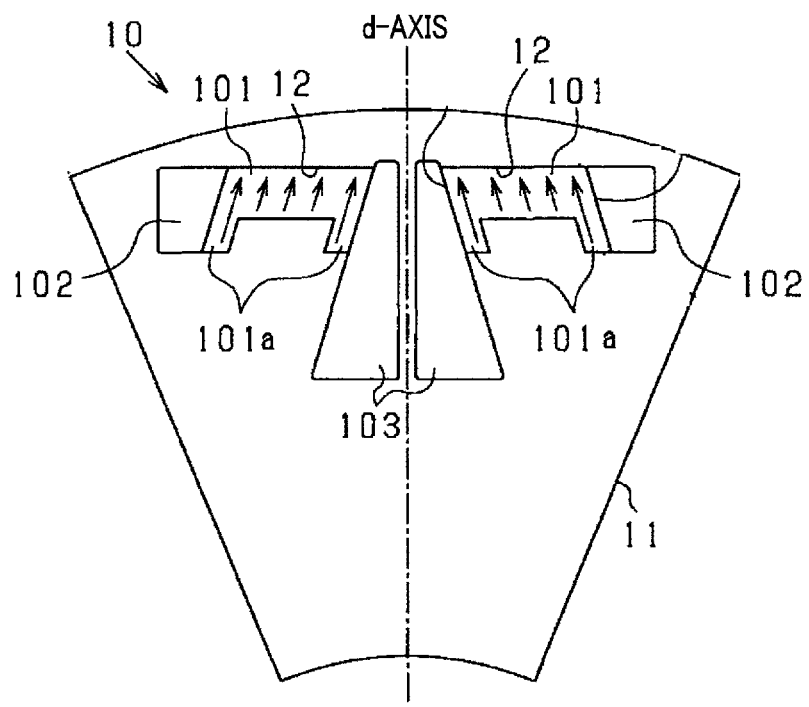
FIG. 25 is a partial plan view of a rotor according to a second modification of the fourth embodiment.

Each of the magnets 101 of the rotor 10 according to the second modification illustrated in FIG. 25 is configured such that the length of each of the q- and d-axis side ends of the corresponding one of the magnets 101, which has one or more magnetic orientations, is longer than the lengths of the respective other portions in the corresponding one of the magnets 101.

That is, each of the q- and d-axis side ends of the magnet 101 has an extension portion 101a, so that the extension portions 101a of the respective q- and d-axis side ends of the magnet 101 define a concave groove formed on the second flux effective surface therebetween.

The extension portion 101a of each of the q- and d-axis side ends results in the corresponding one or more lines of the magnetic flux based on the magnet 101 partially extending. That is, the extension portion 101a serves as a flux extension member. The extension portions 101a are provided to the second flux effective surface that is closer to the rotary shaft 2 than the first flux effective surface thereto.

Note that each of the q- and d-axis side ends of the magnet 101 has the extension portion 101a illustrated in FIG. 25, but only the q-axis side end can have the extension portion 101a.

The magnet 101 of the second modification is configured such that

1. Each magnetic orientation in the magnet 101 is oriented to intersect with the flux effective surfaces at a non-orthogonal angle 2. Each of the q- and d-axis side ends has a partially extended magnetic path This results in a further improvement of demagnetization-resistance performance of the magnet 101.

Third Modification

Figure 26A:
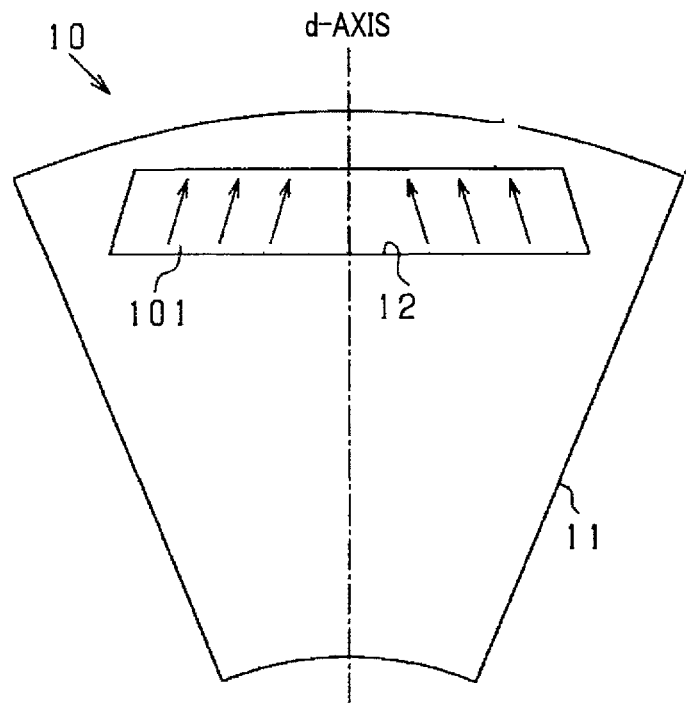
FIGS. 26(a) and 26(b) are partial plan views of a rotor according to a third modification of the fourth embodiment.
Figure 26B:
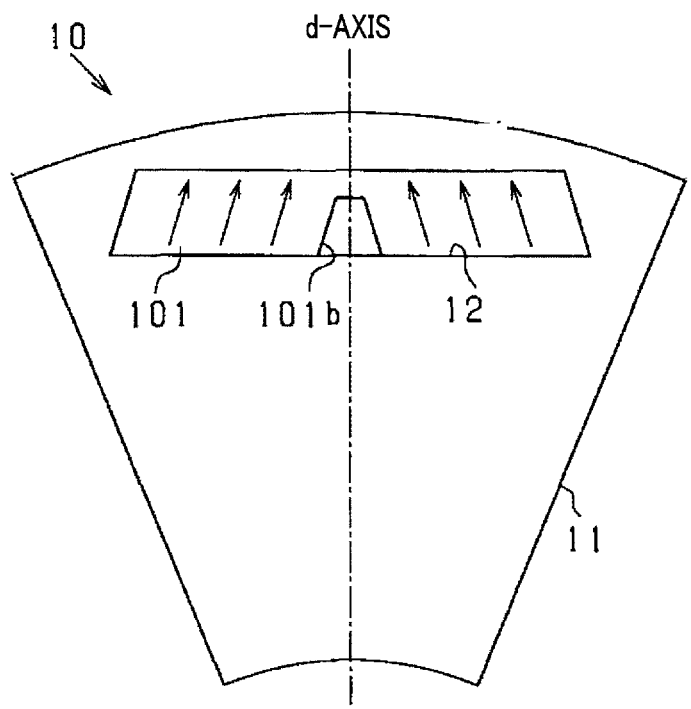

In the rotor core 11, a magnet 101 can be arranged in FIG. 26(a) or FIG. 26(b).

In the rotor 10 illustrated in FIG. 26(a), each of the magnet installation holes 12 is located across the corresponding d-axis to be perpendicular to the corresponding d-axis.

The magnet 101 is installed in each of the magnet installation holes 12 has a left half part and a right half part in FIG. 26(a). The left half part includes magnetic orientations are directed obliquely right upward, and the right half part includes magnetic orientations are directed obliquely left upward.

That is, the magnetic orientations of each of the left and right half parts of the magnet 101, which are arranged across the d-axis, are directed to pass through a region of the rotor core 11 arranged on the d-axis and located to be closer to the stator 30 than the magnet 11, i.e. the magnet installation hole 12, thereto. Specifically, the magnetic orientations of each of the left and right half parts of the magnet 101, which are arranged across the d-axis, are oriented to focus on the region of the rotor core 11 arranged on the d-axis and located to be closer to the stator 30 than the magnet 11, i.e. the magnet installation hole 12, thereto. That is, the region is located to face a middle portion of the magnet 101 except for its both ends.

In the rotor 10 illustrated in FIG. 26(a), the lines of magnetic flux flowing from the magnet 101 may mutually interfere with each other. This may result in demagnetization of the magnet 101.

From this viewpoint, as illustrated in FIG. 26(b), each magnet 101 includes a concave groove located on the corresponding d-axis. This structure illustrated in FIG. 26(b) makes it possible to reduce the cost of the rotor 10 by the smaller amount of magnet in the rotor 10.

Fourth Modification

Figure 27:
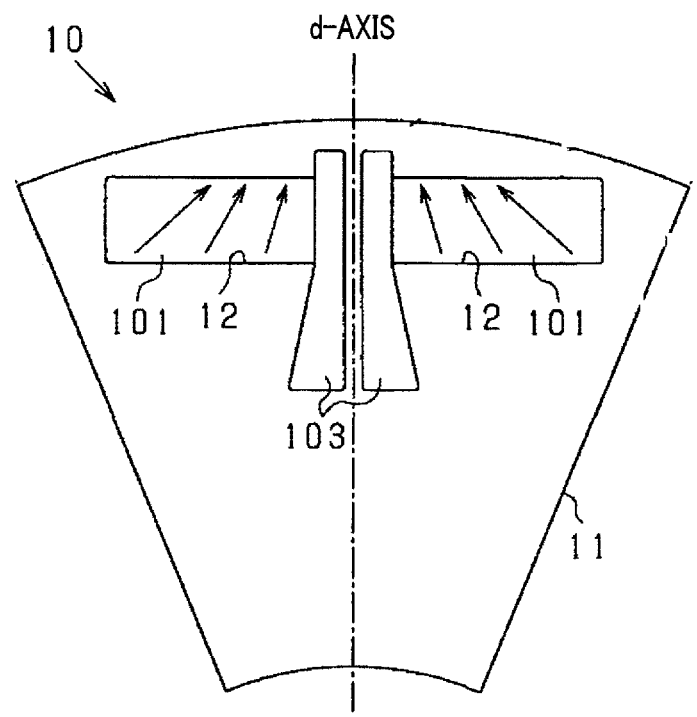
FIG. 27 is a partial plan view of a rotor according to a fourth modification of the fourth embodiment.

Each of the magnets 101 of the rotor 10 according to the fourth modification illustrated in FIG. 27 is configured such that the orientations of one or more magnetic orientations located to be closer to one of the q- and d-axis side ends are different from the orientations of one or more magnetic orientations located to be closer to the other thereof.

In particular, one or more magnetic orientations located to be closer to the d-axis side end are directed to be close to the parallel direction parallel to the d-axis. Inclined angles of magnetic orientations with respect to the parallel direction parallel to the d-axis sequentially increase from the d-axis side end to the q-axis side end, in other words, degrees of non-parallelism of magnetic orientations with respect to the d-axis sequentially increase from the d-axis side end to the q-axis side end.

Figure 28:
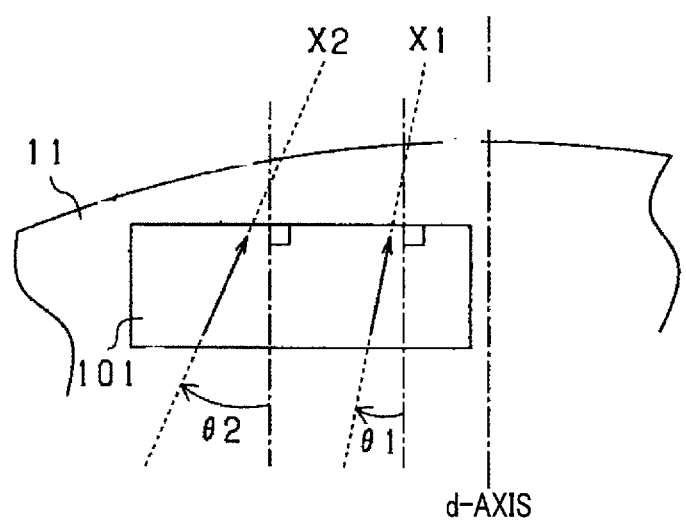
FIG. 28 is a view illustrating, in detail, magnetic orientations of a magnet.

In particular, as illustrated in FIG. 28, at least one magnetic orientation located at a predetermined position of the magnet 101 to be closer to the d-axis side end than to the q-axis side end 101c will be referred to as at least one magnetic orientation X1, and at least one magnetic orientation located at a predetermined position of the magnet 101 to be closer to the q-axis side end than to the d-axis side end will be referred to as at least one magnetic orientation X2.

At that time, the at least one magnetic orientation X1 is more nearly parallel to the d-axis than the at least one magnetic orientation X2 is.

In addition, in the magnet 101, an inclination angle θ2 of the at least one magnetic orientation X2 with respect to the d-axis, i.e. the orthogonal direction orthogonal to the flux effective surfaces, is larger than an inclination angle θ1 of the at least one magnetic orientation X1 with respect to the d-axis, i.e. the orthogonal direction orthogonal to the flux effective surfaces.

Specifically, in the magnet 101, lengths of respective magnetic orientations, i.e. lengths of magnetic paths respectively corresponding to the magnetic orientations sequentially decrease from the q-axis side end to the d-axis side end; each magnetic path can be defined from a start point to an end point of the corresponding magnetic orientation. Each magnet 101 can include at least one magnetic orientation oriented to be perpendicular to the flux effective surfaces for generating magnetic flux in addition to the magnetic orientations each oriented to intersect with the flux effective surfaces at a non-orthogonal angle.

Note that, as illustrated in FIG. 28, the magnet 101 is arranged such that the flux effective surfaces are perpendicular to the d-axis, so that the orthogonal direction orthogonal to the flux effective surfaces is in agreement with the direction of the d-axis.

In contrast, if the flux effective surfaces are not perpendicular to the d-axis, the orthogonal direction orthogonal to the flux effective surfaces is not in agreement with the direction of the d-axis. Even if the orthogonal direction orthogonal to the flux effective surfaces is not in agreement with the direction of the d-axis, the inclination angle θ2 of the at least one magnetic orientation X2 with respect to the orthogonal direction orthogonal to the flux effective surfaces is larger than the inclination angle θ1 of the at least one magnetic orientation X1 with respect to the orthogonal direction orthogonal to the flux effective surfaces.

The orientations of one or more magnetic orientations located to be closer to the d-axis side end are different from the orientations of one or more magnetic orientations located to be closer to the q-axis side end. That is, the inclinations of one or more magnetic orientations, which are located to be closer to the d-axis side end, with respect to the d-axis are different from the inclinations of one or more magnetic orientations, which are located to be closer to the q-axis side end, with respect to the d-axis.

This configuration enables the magnetic flux components to be collected to a region in the rotor core 11 between the d-axis and the q-axis; the region is located to be closer to the stator 30 than the magnet 101 is. This strengthens the magnetic flux based on the magnet 101.

One or more magnetic orientations located to be closer to the d-axis are oriented to be more nearly parallel to the d-axis than one or more axes of magnetization located to be closer to the q-axis are. This results in the magnetic paths at the portion of the magnet 101 closer to the q-axis side end being longer than the magnetic paths at the portion of the magnet 101 closer to the d-axis side end.

This configuration strengthens magnet flux on the q-axis of the rotor 10 to thereby properly address a counter-measure to demagnetization of the q-axis side end of the magnet 101 due to a demagnetization field. When one or more magnetic orientations in the d-axis side end of one of the pair of magnets 101 located across the d-axis and one or more magnetic orientations in the d-axis side end of the other of the pair of magnets 101 are inclined to face each other, this configuration reduces mutual interferences between magnetic flux of one of the pair of magnets 101 and magnetic flux of the other of the pair of magnets 101. This therefore reduces demagnetization on the d-axis.

In the magnet 101, the inclination, i.e. the inclination angle θ2, of at least one magnetic orientation closer to the q-axis side end with respect to the orthogonal direction orthogonal to the flux effective surfaces is larger than the inclination, i.e. the inclination angle θ1, of at least one magnetic orientation closer to the d-axis with respect to the orthogonal direction orthogonal to the flux effective surfaces.

This configuration enables the length of a magnetic path in the q-axis side end to become longest, making it possible to strength the demagnetization resistance of the q-axis side end against a demagnetization field, thus achieving both a decrease in demagnetization of the q-axis side end of the magnet 101 and an increase in the torque of the magnet 101.

Note that, as illustrated in FIG. 27, each magnet installation hole 12 is formed in the rotor core 11 to linearly extend in a direction perpendicular to the corresponding d-axis. In addition, one or more magnetic orientations in the magnet 101 closer to the d-axis side end is oriented to more nearly parallel to the d-axis than one or more magnetic orientations in the magnet 101 closer to the q-axis side end. This configuration enables the inclination, i.e. the inclination angle θ2, of at least one magnetic orientation closer to the q-axis side end with respect to the orthogonal direction orthogonal to the flux effective surfaces to be larger than the inclination, i.e. the inclination angle θ1, of at least one magnetic orientation closer to the d-axis with respect to the orthogonal direction orthogonal to the flux effective surfaces.

Fifth Modification

Figure 29:
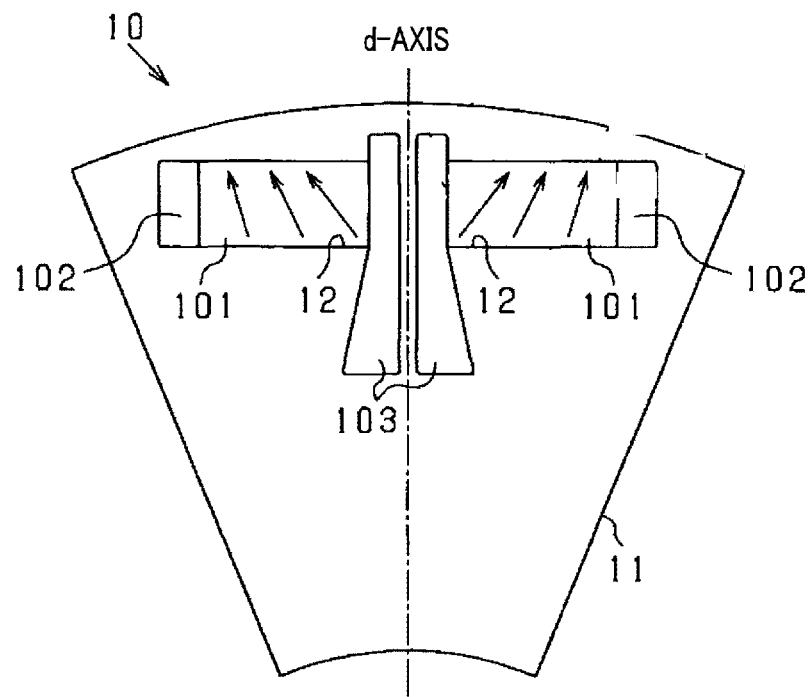
FIG. 29 is a partial plan view of a rotor according to a fifth modification of the fourth embodiment.

Each of the magnets 101 of the rotor 10 according to the fifth modification illustrated in FIG. 29 is configured such that, like the fourth modification, the orientations of one or more magnetic orientations located to be closer to one of the q- and d-axis side ends are different from the orientations of one or more magnetic orientations located to be closer to the other thereof. In particular, the orientations of magnetic orientations in the magnet 101 according to the fifth modification are different from the orientations of magnetic orientations in the magnet 101 according to the fourth modification.

Specifically, one or more magnetic orientations located to be closer to the q-axis side end are more nearly parallel to the q-axis than one or more magnetic orientations located to be closer to the d-axis side end.

In the magnet 101, the lengths of respective magnetic orientations, i.e. lengths of magnetic paths respectively corresponding to the magnetic orientations, gradually decrease from the d-axis side end to the q-axis side end; each magnetic path can be defined from a start point to an end point of the corresponding magnetic orientation.

Because one or more magnetic orientations in the q-axis side end of the magnet 101 are oriented to be parallel to the q-axis, it is possible to strengthen magnetic flux components based on the magnet 101 on the q-axis, which are oriented to be perpendicular to the outer circumferential surface of the rotor core 11 facing the stator 30, i.e. magnet flux components oriented to be against a demagnetization field. This results in properly providing a counter-measure to demagnetization of the q-axis side end of the magnet 101 due to a demagnetization field.

Sixth Modification

Figure 30:
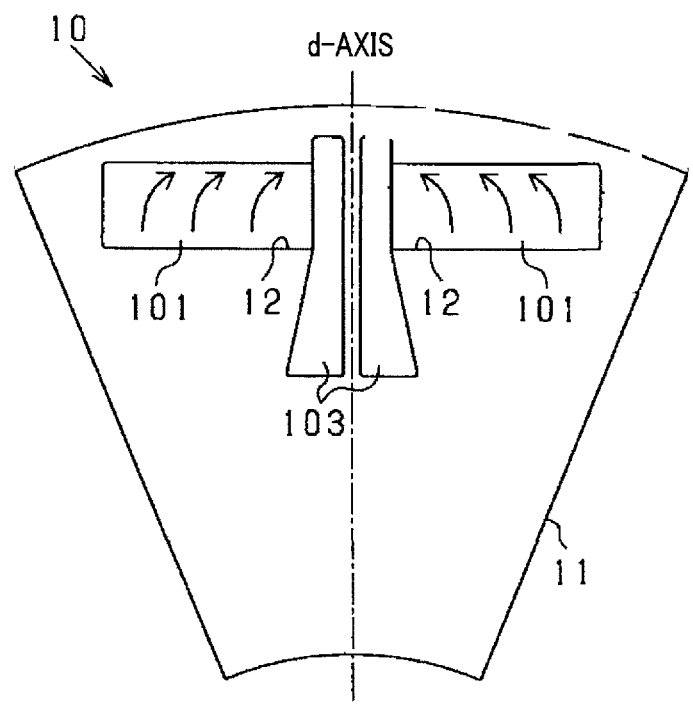
FIG. 30 is a partial plan view of a rotor according to a sixth modification of the fourth embodiment.

Each of the magnets 101 of the rotor 10 according to the sixth modification illustrated in FIG. 30 is configured such that each of magnetic orientations in the magnet 101 has a circular-arc shape, i.e. a non-linear shape. This enables the lengths of the respective magnetic orientations in the magnet 101 to further increase, making it possible to further strengthen magnetic flux of the magnet 101.

Seventh Modification

Figure 31A:
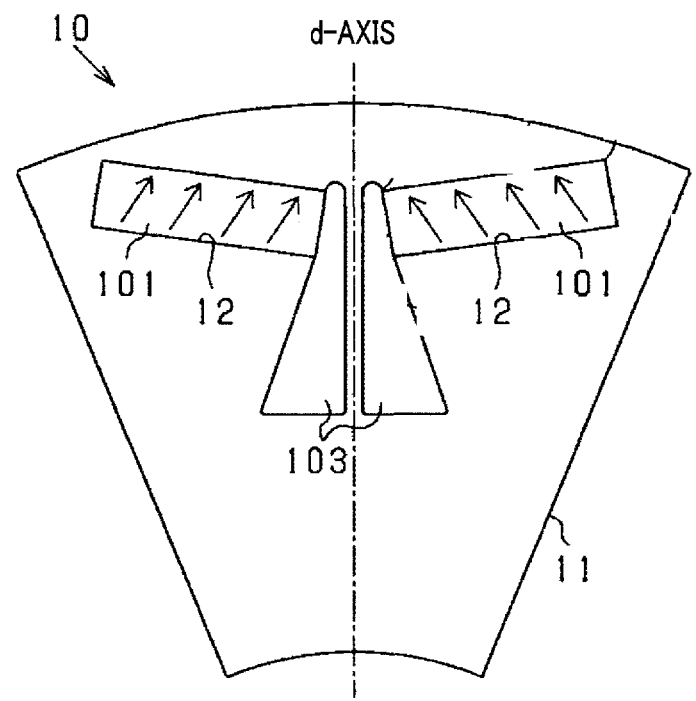
FIGS. 31(a) and 31(b) are partial plan views of a rotor according to a seventh modification of the fourth embodiment.
Figure 31B:
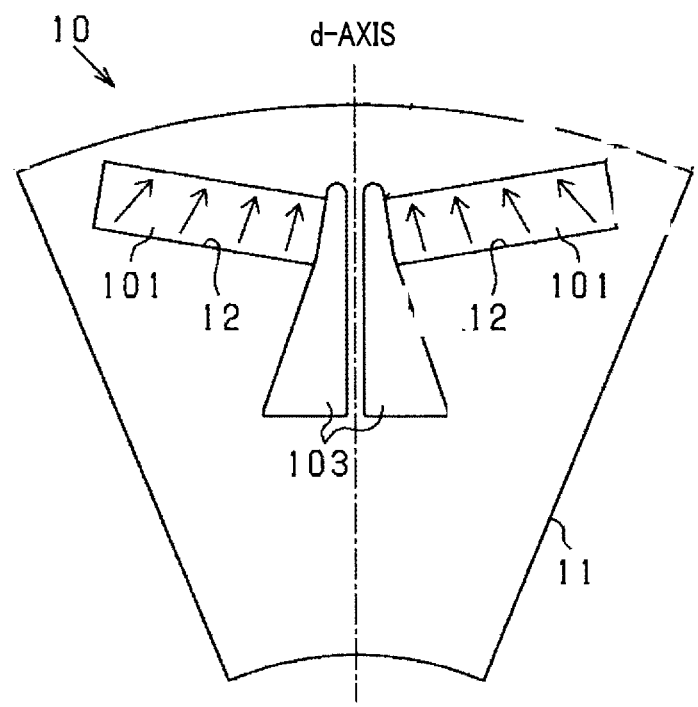

Referring to FIGS. 31(a) and 31(b), the rotor core 11 has formed a pair of two magnet installation holes 12 for each d-axis; the two magnet installation holes 12 of each pair have a substantially V shape such that a distance between the two magnet installation holes 12 becomes larger toward the radially outside of the rotor core 11.

In FIG. 31(a), like FIG. 23, each of magnetic orientations in the magnet 101 is inclined with respect to the d-axis while intersecting with the opposing side surfaces, which generate magnetic flux, of the magnet 101 at a non-right angle.

In FIG. 31(b), like FIG. 27, the orientations of one or more magnetic orientations located to be closer to the q-axis side end are different from the orientations of one or more magnetic orientations located to be closer to the d-axis side end. In particular, the one or more magnetic orientations located to be closer to the d-axis side end are more nearly parallel to the d-axis than one or more magnetic orientations located to be closer to the q-axis side end.

Note that, as described in FIG. 29, the one or more magnetic orientations located to be closer to the q-axis side end can be more nearly parallel to the q-axis than one or more magnetic orientations located to be closer to the d-axis side end.

Eighth Modification

Figure 32:
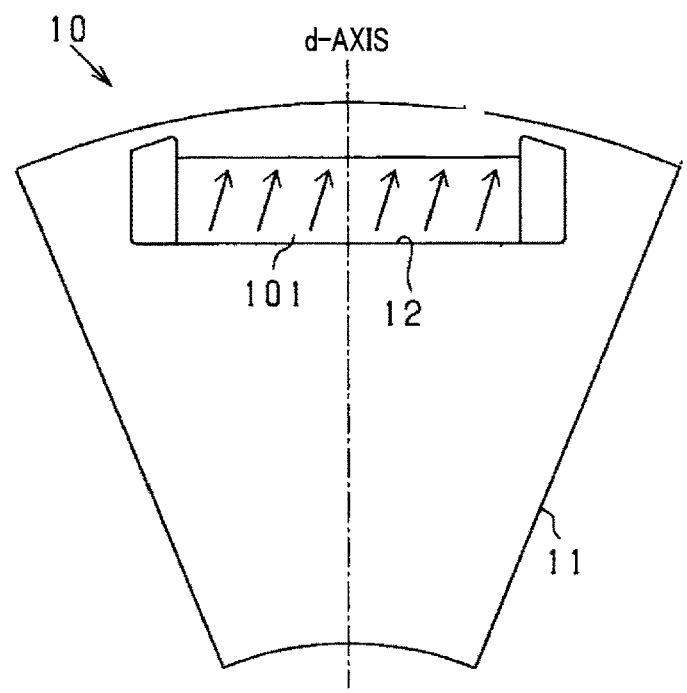
FIG. 32 is a partial plan view of a rotor according to an eighth modification of the fourth embodiment.

FIG. 32 illustrates the eighth modification. As illustrated in FIG. 32, the magnet 101 is installed in each of the magnet installation holes 12 located across the corresponding d-axis while magnetic orientations are asymmetric about the corresponding d-axis.

That is, the magnetic orientations in the magnet 101 are inclined with respect to the d-axis while each intersecting with the flux effective surfaces at a non-right angle; the orientations of the respective magnetic orientations located in one side of the d-axis are identical to the orientations of the respective magnetic orientations located in the other side of the d-axis. The rotor 10 illustrated in FIG. 32 increases the length of each magnetic path in the magnet 101 to thereby strengthen magnetic flux of the magnet 101 against a demagnetization field.

Ninth Modification

Figure 33:
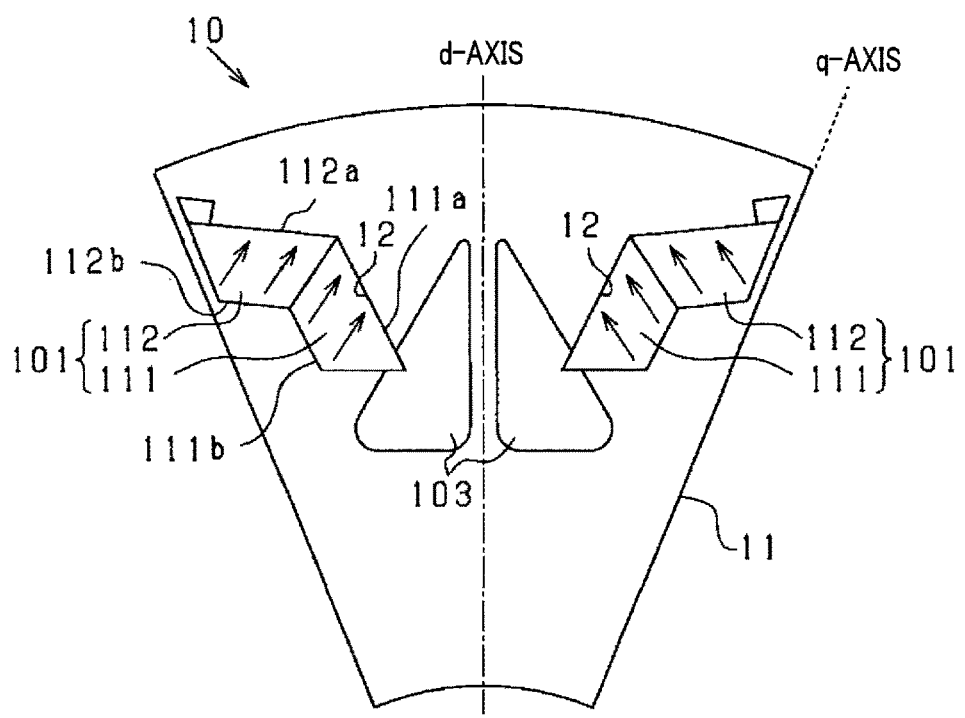
FIG. 33 is a partial plan view of a rotor according to a ninth modification of the fourth embodiment.

Referring to FIG. 33, the magnets 101 of each pair located across the corresponding d-axis, i.e. located at both sides across the corresponding d-axis, is comprised of two magnets 111 and 112, each of which has a trapezoidal shape in its lateral cross section. That is, the magnets 111 and 112 of each pair constitute a magnet. Each of the magnets 111 and 112 has an isosceles trapezoidal shape. In each magnetic assembly, one of legs of the magnet 111 abuts on one of legs of the magnet 112 such that the magnets 111 and 112 are arranged to be convex toward the stator 30 while their legs abut on each other.

In each of the magnets 111 and 112, magnetic orientations, which respectively correspond to orientations of magnetic paths in the corresponding magnet, are defined to be parallel to one of the legs of the corresponding magnet. Each of the magnets 111 and 112 has opposing bases, i.e. upper and lower bases, each of which serves as a flux effective surface. That is, each of the magnets 111 and 112 is configured such that each of the corresponding magnetic orientations intersects with the flux effective surfaces at a non-right angle. One of the legs of the magnet 111, which are parallel to its magnetic orientations, abuts on one of the legs of the magnet 112, which are parallel to its magnetic orientations. This results in the orientations of the respective magnetic orientations of the magnet located in each side of the d-axis being identical to one another.

The magnets 111 and 112 have the same product-number magnets, so that they have the same configurations, the same dimensions, and the same magnetic orientations. For example, as illustrated in FIG. 34(a), the magnets 111 and 112 respectively having the same produce numbers are prepared, and as illustrated in FIGS. 34(b) and 34(c), the magnet 112, which has been reversed, is joined to the magnet 111. Note that magnets having different base lengths can be used as the respective magnets 111 and 112.

Tenth Modification

Referring to FIG. 35, each magnet 101 is comprised of two magnets 111 and 112, which constitute a magnet. The magnets 101 of each pair are located across the corresponding d-axis, i.e. located at both sides across the corresponding d-axis. Each of the magnets 101 is comprised of two magnets 111 and 112, each of which has a trapezoidal shape in its lateral cross section.

Each of the trapezoidal magnets 111 and 112 has different first and second base angles. The first base angle is set to the right angle, and the second base angle is set to an acute angle. The magnets 111 and 112 are arranged while their right-angle side legs abut on each other.

Each of the magnets 111 and 112 has defined therein magnetic orientations defined to be in parallel to the acute-angle side leg. This configuration of each of the magnets 111 and 112 causes each the magnetic orientations to intersect with flux effective surfaces as its upper and lower bases at a non-right angle. The magnetic orientations of the magnet 112, which is located to be closer to the q-axis, have the right angle or an angle close to the right angle with respect to the q-axis, and the magnetic orientations have an angle parallel to the d-axis or an angle close to the angle parallel to the d-axis.

Figure 36:
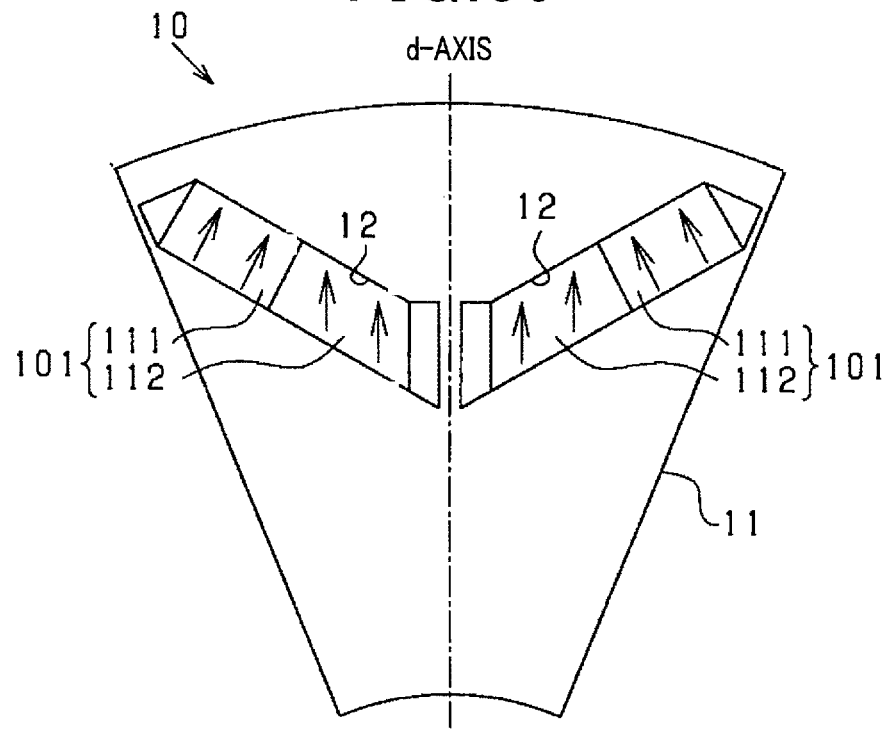
FIG. 36 is a partial plan view of a rotor according to the tenth modification of the fourth embodiment.
Figure 37:
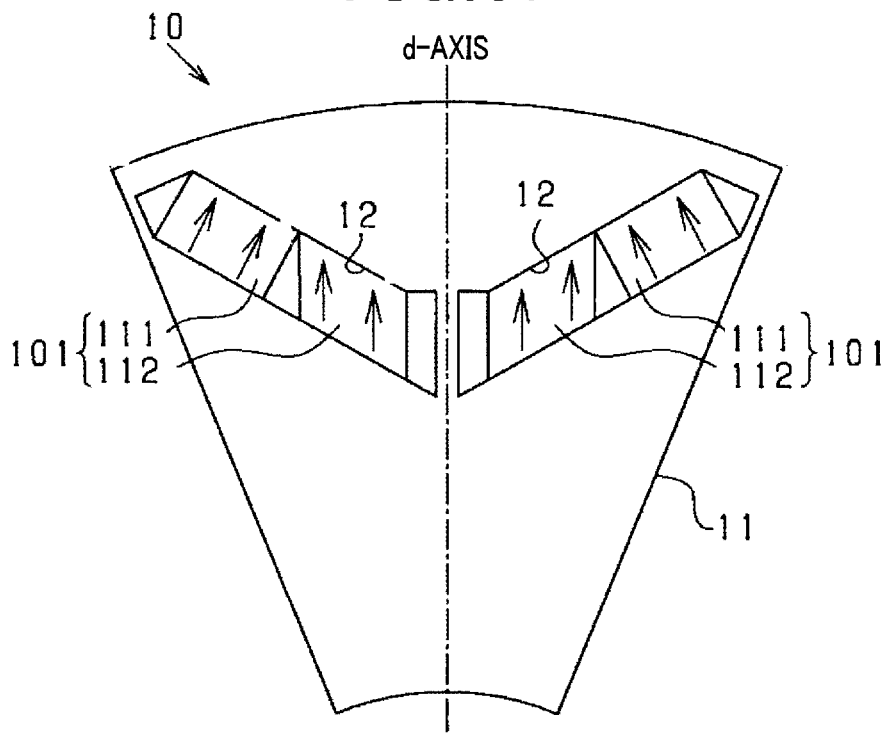
FIG. 37 is a partial plan view of a rotor according to the tenth modification of the fourth embodiment.

Each of FIGS. 36 and 37 illustrates a modification of the rotor 10, a part of which has been modified. Specifically, the modified configuration illustrated in each of FIGS. 36 and 37 includes, as the magnet 112, a magnet having magnetic orientations that are oriented to be perpendicular to the flux effective surfaces of the magnet. In particular, the modified configuration illustrated in FIG. 37 includes the magnet 111 having a parallelogram shape with magnetic orientations that are parallel to right and left sides thereof. The modified configuration illustrated in FIG. 37 also includes a flux barrier located between the magnets 111 and 112. The modified configuration illustrated in FIG. 37 can include no flux barrier located between the magnets 111 and 112, so that a corresponding part of the rotor core 11 can be located between the magnets 111 and 112.

Fifth Embodiment

The following describes the fifth embodiment while focusing on one or more different points of the fifth embodiment from the first embodiment.

Figure 38:
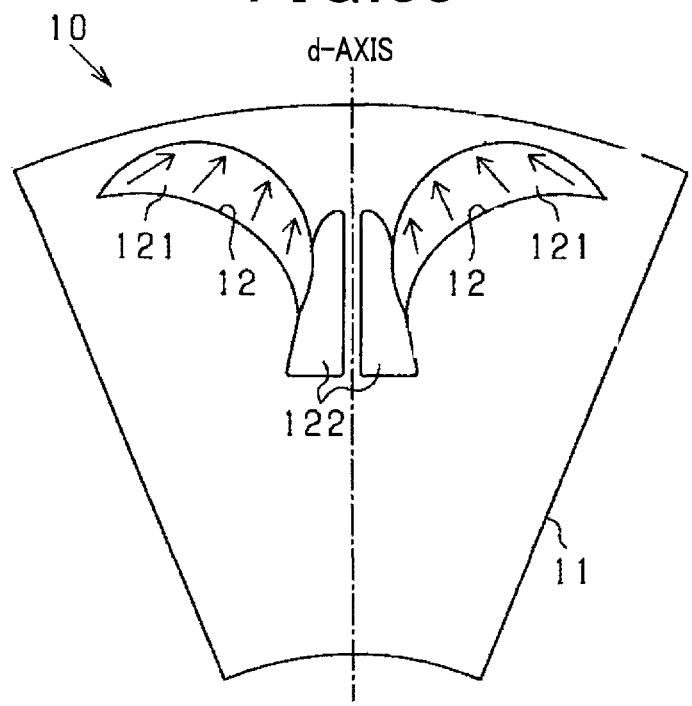
FIG. 38 is a partial plan view of a rotor according to a fifth embodiment.

FIG. 38 schematically illustrates a rotor 10 of the fifth embodiment.

Referring to FIG. 38, a magnet 121 installed in each magnet installation hole 12 is configured such that the q-axis side end is located to be closer to the stator 30 in a corresponding radial direction of the rotor core 11 than the d-axis side end is. In addition, each magnet 121 has a middle portion between the q- and d-axis side ends, and the middle portion is shaped to convexly project toward the stator 30.

Specifically, each magnet 121 has a circular-arc shape in its lateral cross section; the circular-arc shape is convex toward the stator 30. In particular, each magnet 121 has a crescent-shaped circular-arc shape in its lateral cross section. Each magnet 121 is however not limited to the circular-arc shape that is convex toward the stator 30. For example, each magnet 121 can be configured such that liner surfaces of the magnet 121 are bent at one or more portions thereof to thereby convexly project toward the stator 30.

The magnet 121 has magnetic orientations defined therein; the magnetic orientations are inclined with respect to the d-axis, and each intersect with the flux effective surfaces at a non-orthogonal angle. The magnetic orientations can however include at least one magnetic orientation that is directed to be perpendicular to the flux effective surfaces. Each of the magnetic orientations defined in the magnet 121 can have a linear shape or a non-linear shape, such as a circular-arc shape.

In addition, each magnet 121 has a d-axis close portion closer to the d-axis side end than to the q-axis side end, and a q-axis close portion closer to the q-axis side end than to the d-axis side end, and magnetic orientations included in the d-axis close portion are different from magnetic orientations included in the q-axis close portion. In particular, the magnetic orientations included in the d-axis close portion are directed to be closer to the direction parallel to the d-axis than the magnetic orientations included in the q-axis close portion are. This results in the length of each of the magnetic paths defined in the magnet 121 being longer.

Note that, in each magnet 121, inclinations of the respective magnetic orientations included in the q-axis close portion with respect to the perpendicular direction perpendicular to the flux effective surfaces can be larger than inclinations of the respective magnetic orientations included in the d-axis close portion with respect to the perpendicular direction perpendicular to the flux effective surfaces.

This configuration of the rotor 10 according to the fifth embodiment enables each magnet 121 to be closer to the outer circumferential surface of the rotor core 11, i.e. the surface of the rotor core 11 facing the stator. This closer arrangement of each magnet 121 makes it possible to reduce the magnetic resistance of the d-axis portion of the rotor core 11, thus increasing torque of the rotary electric machine 1. Although making shorter the distance between the stator 30 and each magnet 121 may increase demagnetization field as a counter reaction of the shorter distance, the longer magnetic orientations of each magnet 121 reduce negative effects of the increased demagnetization field.

The above configuration of the rotor 10 enables the percentage of a region of the rotor core 11, which is located to be closer to the stator 30 than each magnet 121, i.e. each magnet installation hole 12, is, to be smaller; the region is subjected to the sum of the magnetic flux of the stator 30 and the magnetic flux of the corresponding magnet 121. This therefore reduces, in the rotor 10, a saturation region in which magnetic saturation may occur based on the magnetic flux of the stator 30 and the magnetic flux of each magnet 121, thus more efficiently obtain the performance from each magnet 121.

Figure 39:
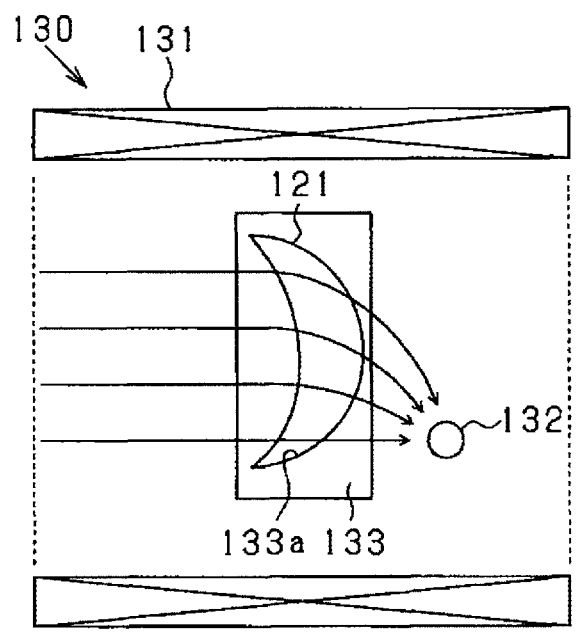
FIG. 39 is an explanation view for explaining how to magnetize a magnet using an oriented magnetic field.

Next, the following describes how to manufacture a magnet 121 used in the fifth embodiment. FIG. 39 is an explanation view used for explaining how to magnetize the magnet 121 using an oriented magnetic field. For example, FIG. 39 illustrates how to magnetize the left-side magnet 121 located in FIG. 38.

As illustrated in FIG. 39, an orientation apparatus 130 includes a magnetic field coil 131, an orientation core 132, and a mold 133. The orientation core 132 and mold 133 are arranged in the magnetic field coil 131.

The magnetic field coil 131 is configured to generate a magnetic field passing through the inside of the coil when energized.

The orientation core 132 serves to curve the magnetic field generated by the magnetic field coil 131 to a predetermined direction. The mold 133 is arranged to enable the curved magnetic field to pass therethrough.

That is, the magnetic field coil 131 generates linear magnetic field lines, and the orientation core 132 enables the linear magnetic field lines to be curved as curved magnetic field lines. The mold 133 is composed of a non-magnetic material, and has formed a mold chamber 133a shaped in conformity with the shape of the magnet 121.

The following describes a method of manufacturing the magnet 121.

First, magnet materials are pulverized into magnetic powders, and the magnetic powders are filled in the mold chamber 133a of the mold 133.

Next, the magnetic powders are compressed to have the predetermined shape set forth above in the mold 133. Thereafter, the orientation core 132 enables curved magnetic field lines to be generated. The curved magnetic field lines cause magnetic field lines of the compressed magnetic powders in the mold chamber 133a to be oriented. That is, during the orientation process, the magnetic powders are aligned such that their magnetic orientations are oriented, and compressed to be fixed as a molded body. In particular, the orientation core 132 is preferably located to be offset to one side in the longitudinal direction of the magnet 121.

Thereafter, the molded body is sintered, and thereafter, magnetized. The above series of processes result in the magnet 121 being manufactured.

Note that, for manufacturing the right-side magnet 121 illustrated in FIG. 38, the location of the orientation core 132 is changed.

The above series of processes results in the magnet 121 being produced.

Figure 40:
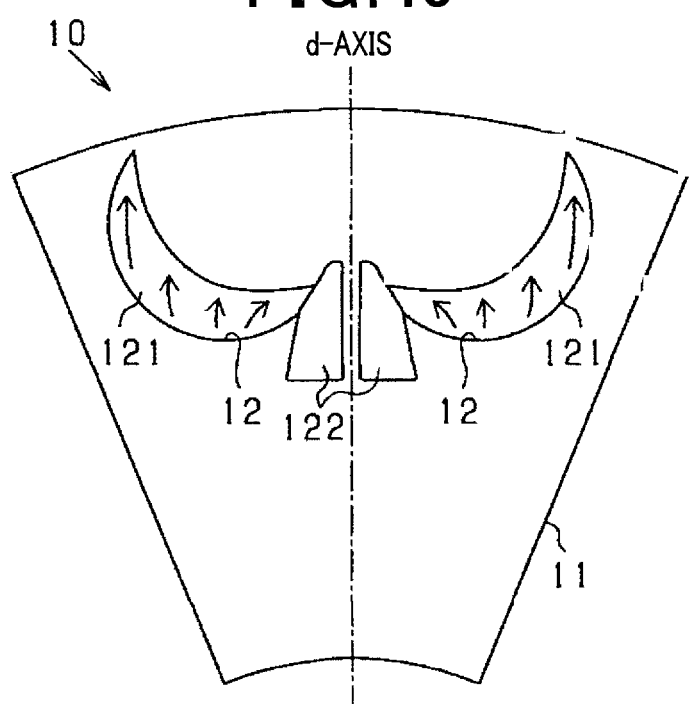
FIG. 40 is a partial plan view of a rotor according to a modification of the fifth embodiment.

Each magnet 121 illustrated in FIG. 40 is configured such that the q-axis side end is located to be closer to the stator 30 in a corresponding radial direction of the rotor core 11 than the d-axis side end is. In addition, each magnet 121 has a middle portion between the q- and d-axis side ends, and the middle portion is shaped to convexly project toward the anti-stator direction.

Specifically, each magnet 121 has a circular-arc shape in its lateral cross section; the circular-arc shape is convex toward the anti-stator direction, i.e. the rotor direction. In particular, each magnet 121 has a crescent-shaped circular-arc shape in its lateral cross section toward the anti-stator direction. Each magnet 121 is however not limited to the circular-arc shape that is convex toward the anti-stator direction. For example, each magnet 121 can be configured such that the liner surfaces of the corresponding magnet 121 are bent at one or more portions thereof to thereby convexly project toward the anti-stator direction.

The magnet 121 has magnetic orientations defined therein; the magnetic orientations are inclined with respect to the d-axis, and each intersect with the flux effective surfaces at a non-orthogonal angle. The magnetic orientations can however include at least one magnetic orientation that is oriented to be perpendicular to the flux effective surfaces. Each of the magnetic orientations defined in the magnet 121 can have a linear shape or a non-linear shape, such as a circular-arc shape.

This configuration enables, in the rotor core 11, a region closer to the stator 30 than each magnet 121 is to be wider, making it possible to increase, in the region, magnet force of the magnets arranged in the rotor core 11.

Other Embodiments

A rotor having one of the configurations illustrated in respective FIGS. 41 to 44 can be used as the rotor 10.

Figure 41:
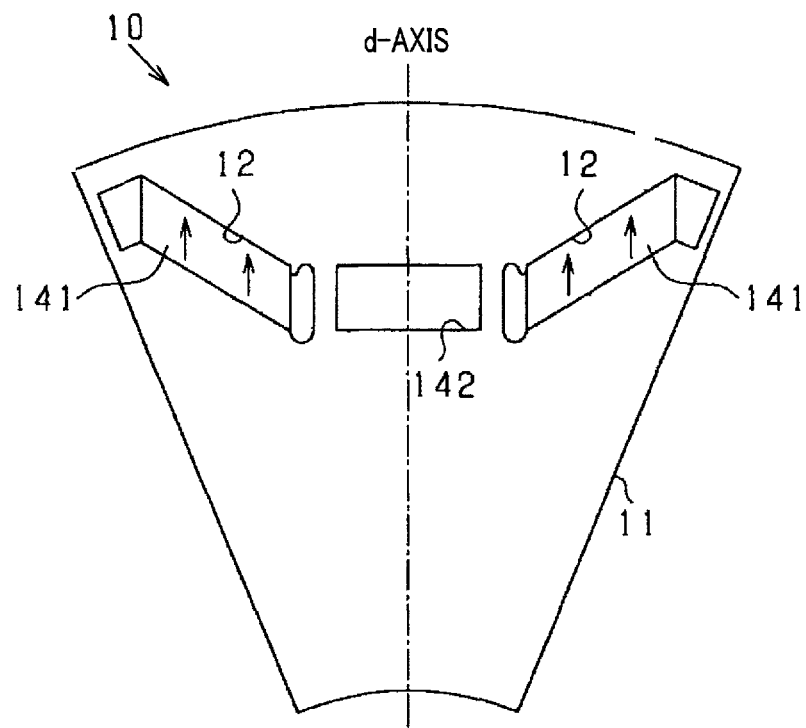
FIG. 41 is a partial plan view of a rotor according to another embodiment.

The rotor 10 illustrated in FIG. 41 has formed a pair of magnet installation holes 12 for each d-axis; the magnet installation holes 12 of each pair have a substantially V shape. The rotor 10 also includes plural pairs of magnets 141, and the magnets 141 of each pair are installed in the respective magnet installation holes 12 of the corresponding pair, so that the magnets 141 of each pair are arranged to have a V shape. Each of the magnets 141 is inclined with respect to the d-axis, and has magnetic orientations oriented to be parallel to the d-axis or close to the direction parallel to the d-axis. Each of the magnetic orientations intersects with flux effective surfaces 141a and 141b of the magnet 141 at a non-right angle.

Center openings 142 have been formed through the rotor core 11 of the rotor 10; each of the center openings 142 is located on the corresponding d-axis between the magnet installation holes 12 of the corresponding pair.

The above configuration of the rotor 10 includes the magnetic orientations oriented to be parallel to the d-axis or close to the direction parallel to the d-axis. This configuration therefore reduces components of magnetic flux obtained from the rotor 10; the components of the magnetic flux face the d-axis, thus reducing demagnetization of the d-axis. Each center opening 142 can be comprised of a space itself, or a non-magnetic material can be filled in each center opening 142.

Figure 42:
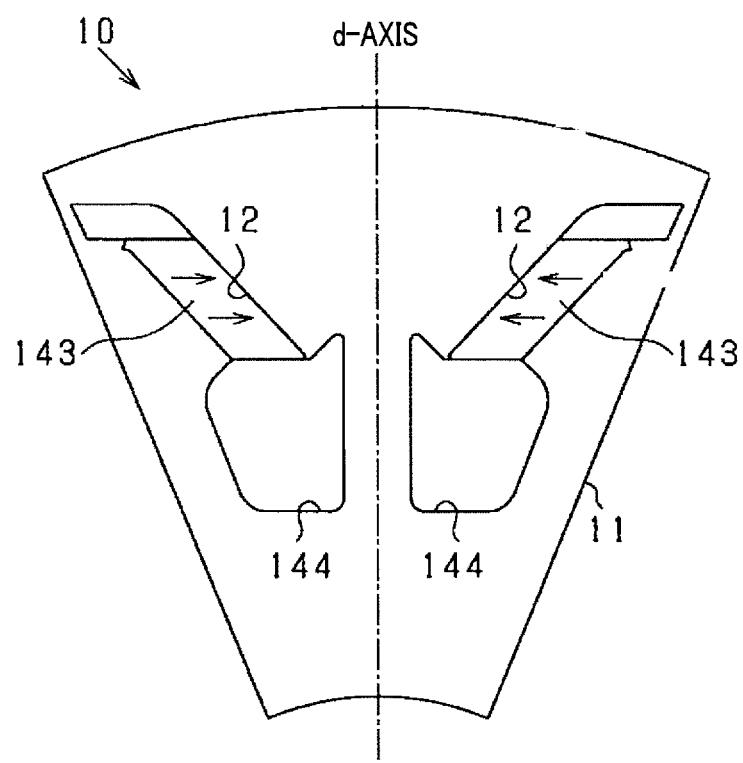
FIG. 42 is a partial plan view of a rotor according to a further embodiment.

The rotor 10 illustrated in FIG. 42 has formed a pair of magnet installation holes 12 for each d-axis; the magnet installation holes 12 of each pair have a substantially V shape. The rotor 10 also includes plural pairs of magnets 143, and the magnets 143 of each pair are installed in the respective magnet installation holes 12 of the corresponding pair, so that the magnets 143 of each pair are arranged to have a V shape. Each of the magnets 143 is inclined with respect to the d-axis, and has magnetic orientations oriented to be perpendicular to the q-axis or close to the direction perpendicular to the q-axis. Each of the magnetic orientations intersects with flux effective surfaces 143a and 143b of the magnet 143 at a non-right angle.

The rotor core 11 also has formed plural pairs of flux barriers 144; the flux barriers 144 of each pair are located to be adjacent to d-axis side ends of the respective magnets 141 of the corresponding pair; the flux barriers 144 of each pair extend along the corresponding d-axis.

This configuration illustrated in FIG. 42 strengthens magnet flux on each q-axis. Orienting magnetic field lines toward each q-axis core portion of the rotor core 11 enables each q-axis core portion of the rotor core 11 to be magnetically saturated, making it possible to enhance field weakening effects of the rotor 10. In the rotor 10 illustrated in FIG. 42, increasing a same-pole distance across each d-axis, which is defined as a minimum distance between the adjacent magnets 143 across the corresponding d-axis, makes it possible to reduce d-axis demagnetization, i.e. self-demagnetization, of the rotor 10 based on magnetic flux generated by the respective adjacent magnets 143.

Figure 43:
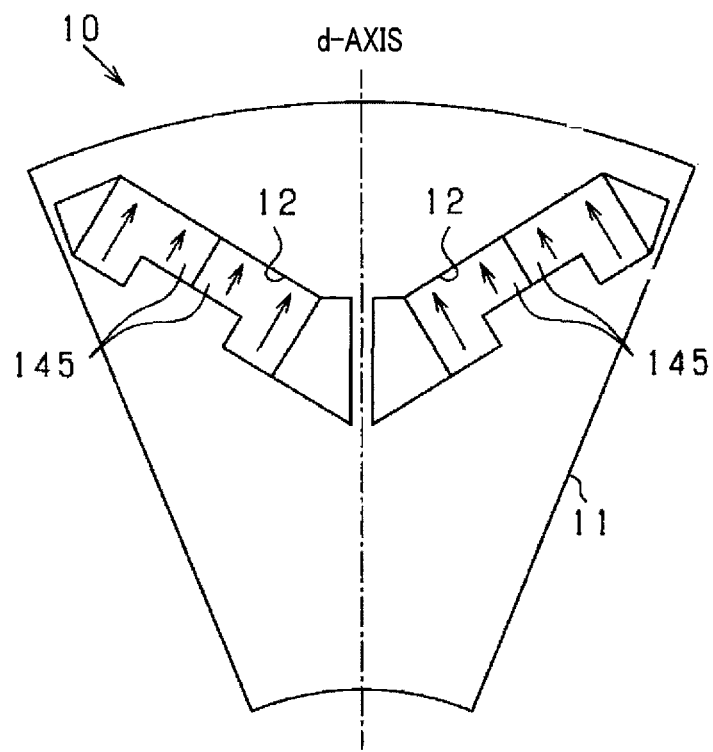
FIG. 43 is an explanation view for explaining how to magnetize a magnet using an oriented magnetic field according to a still further embodiment.

The rotor 10 illustrated in FIG. 43 has formed a pair of magnet installation holes 12 for each d-axis; the magnet installation holes 12 of each pair have a substantially V shape. The rotor 10 also includes plural pairs of magnets 145, and the magnets 145 of each pair are installed in the corresponding one of the magnet installation holes 12, so that the assembly of the magnets 145 of a first pair installed in a first magnet installation hole 12 and the assembly of the magnets 145 of a second pair installed in a second magnet installation hole 12 adjacent to the first magnet installation hole 12 are arranged to have a V shape.

Each of the magnets 145 has opposing d- and q-axis side ends in its lengthwise direction; the d-axis side end corresponds to one longitudinal end surface of the corresponding one of the magnets 145, and the q-axis side end corresponds to the other longitudinal end surface of the corresponding one of the magnets 145.

Each of the magnets 145 is configured such that the length of each of the q- and d-axis side ends of the corresponding one of the magnets 145, which has one or more magnetic orientations, is longer than the lengths of the respective other portions in the corresponding one of the magnets 145.

That is, each magnet 145 has a stator-side flux effective surface that is flat and perpendicular to the magnetic orientations defined in the corresponding magnet 145. Each magnet 145 also has an anti-stator side flux effective surface that is a stepped surface. While the magnets 145 of each pair are installed in the corresponding respective magnet installation holes 12, the stator-side flux effective surface of one of the magnets 145 abuts on the stator-side flux effective surface of the other thereof.

Figure 44:
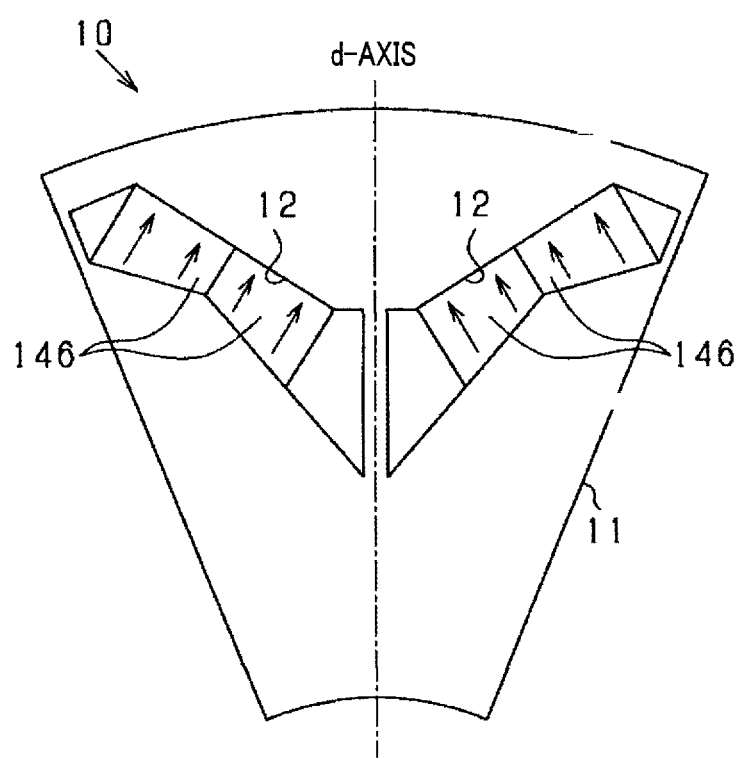
FIG. 44 is a partial plan view of a rotor according to a still further embodiment.

The rotor 10 illustrated in FIG. 44 includes plural pairs of magnets 146, and the magnets 146 of each pair are installed in the corresponding one of the magnet installation holes 12, so that the assembly of the magnets 146 of a first pair installed in a first magnet installation hole 12 and the assembly of the magnets 146 of a second pair installed in a second magnet installation hole 12 adjacent to the first magnet installation hole 12 are arranged to have a V shape.

Specifically, each of the magnets 146 has d-axis and q-axis side ends, which correspond to respective end surfaces thereof. Each of the magnets 146 installed in the corresponding one of the magnet installation hole 12, so that the assembly of the pair of magnets 146 is configured such that 1. The length of one or more magnetic orientations defined in the q-axis side end of the assembly is shorter than the length of one or more magnetic orientations defined in a middle portion thereof
2. The length of one or more magnetic orientations defined in the d-axis side end of the assembly is shorter than the length of one or more magnetic orientations defined in the middle portion thereof The assembly of the pair of magnets 146 has a stator-side flux effective surface configured as a flat surface perpendicular to the magnetic orientations defined in the assembly, and also has an anti-stator side flux effective surface.

Each of the magnets 146 of the pair has an inclined surface as its anti-stator side surface. While the magnets 146 of each pair are installed in the corresponding respective magnet installation holes 12, the stator-side flux effective surface of one of the magnets 146 abuts on the stator-side flux effective surface of the other of the magnets 146.

Each of the magnets including the magnets 13 set forth above can be comprised of a plurality of divided magnet segments. In this modification, the divided magnet segments are preferably arranged along the d-axis for each of both sides relative to the d-axis. This arrangement of the magnets reduces eddy loss of each magnet 13, which serves as a conductive member. For example, a plurality of magnets, each of which has, for example, a substantially square cross section, i.e. divided magnets, having different magnetic orientations, are aligned to each other to constitute each magnet 13 that has an elongated cross section. This results in the magnet 13 with a higher value of the orientation ratio as compared with a magnet, having an elongated cross section, in which magnetic orientations has been defined using variable magnetic orientations.

Each of the rotors 10 of the above respective configurations can have freely formed therethrough any flux barrier at each of the d- and q-axis ends of a magnet of the corresponding one of the rotors 10.

Each of the rotors 10 set forth above can be comprised of divided core segments in its axial cross section such that the divided core segments are combined with each other while they are circumferentially shifted at predetermined respective angles, resulting each of the rotors 10 having a skewed structure. The skewed structure of each rotor 10 reduces torque ripples of the corresponding rotary electric machine.

In place of the rotary electric machines, each of which is comprised of the rotor 10 including the magnets, such as magnets 13, and the stator 30 including the stator windings 33, rotary electric machines, in each of which the stator windings 33 can be mounted to the rotor 10, can be used. In this modification, magnet installation holes having one of the various types of shapes set forth above have been formed in a stator core configured as a soft magnetic core, and magnets each having one of the various types of shapes set forth above have been installed in the respective magnet installation holes.

The present invention can be applied to other motors or electromagnetic machines in place of rotary electric machines. For example, the present invention can be applied to a linear motor capable of linearly moving a movable member. That is, the present invention can be applied to motors or electromagnetic machines as long as each of the motors or electromagnetic machines includes magnets each located to face a winding, the magnets being 1. Each configured to perform a relative operation with respect to the corresponding winding when the corresponding winding is energized
2. Arranged such that their polarities are alternately changed in a direction of the relative operations While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those having ordinary skill in the art based on the present disclosure. The present disclosure can be carried out various combinations, and can include one or more additional elements to each of the embodiments. The present disclosure can include a structure of each embodiment from which one or more part and/or one or more components have been eliminated. The limitations in the claims are to be interpreted broadly based on the language employed in the claims and not limited to examples described in the present specification or during the prosecution of the application, which examples are to be construed as non-exclusive. The disclosed technical range can include various modifications of the limitations in the claims within the scope or its equivalent region of the present disclosure.

What is claimed is:

1. A magnetic generator for a motor comprising:
a plurality of magnets that are arranged to face a winding and that are movable relative to the winding upon the winding being energized, the magnets being arranged in a relative movement direction while magnetic polarities based on the magnets are alternately changed,
each of the magnets comprising:
a first magnet member having a q-axis side end located closer to a pole boundary and configured to generate magnet flux in accordance with a corresponding one of the polarities, the first magnet member having first magnetic orientations defined therein; and
a second magnet member provided at the q-axis side end of the first magnet member, the second magnet member having second magnetic orientations defined therein, the second magnetic orientations intersecting with the first magnetic orientations, and being directed toward the q-axis side end of the first magnet member, wherein:
the motor is designed as a rotary electric machine that is comprised of:
a winding member in which the winding is wound; and
a magnet hold member including the magnets and radially arranged to face the winding member, the magnetic generator being used as the magnet member,
the first magnet member comprises a plurality of first magnet members arranged in the magnet member in a circumferential direction of the magnet member with predetermined pitches;
the second magnet member comprises a plurality of second magnet members, each of the second magnet members being provided for a q-axis side end of the corresponding one of the first magnet members;
the magnet hold member includes a soft magnetic core having magnet installation holes located across a d-axis for each pole at both sides of the d-axis; and
the first and second magnet members are installed in each of the magnet installation holes.

2. The magnetic generator according to claim 1, wherein:
each of the first and second magnet members has a substantially rectangular shape in a lateral cross section thereof, and a pair of opposing flux effective surfaces;
the first magnetic orientations and the second magnetic orientations of the respective first and second magnet members are perpendicular to the opposing flux effective surfaces of the corresponding one of the first and second magnet members; and
the first and second magnet members are arranged in the soft magnetic core such that a first angle of at least one of the first magnetic orientations of each of the first magnet members with respect to the d-axis or q-axis is different from a second angle of at least one of the second magnetic orientations of the corresponding one of the second magnet members with respect to the d-axis or q-axis.

3. The magnetic generator according to claim 1, wherein:
an angle formed between at least one of the first magnetic orientations of each of the first magnet members and at least one of the second magnetic orientations of the corresponding one of the second magnet members is set to be an acute angle.

4. A magnetic generator for a motor comprising:
a plurality of magnets that are arranged to face a winding and that are movable relative to the winding upon the winding being energized, the magnets being arranged in a relative movement direction while magnetic polarities based on the magnets are alternately changed, each of the magnets comprising:
  a first magnet member configured to generate magnet flux in accordance with a corresponding one of the polarities, the first magnet member having first magnetic orientations defined therein; and
  a second magnet member provided at a q-axis side end of the corresponding magnet located closer to a pole boundary, the second magnet member having second magnetic orientations defined therein, the second magnetic orientations intersecting with the first magnetic orientations, wherein:
the motor is designed as a rotary electric machine that is comprised of:
  a winding member in which the winding is wound; and
  a magnet hold member including the magnets and radially arranged to face the winding member, the magnetic generator being used as the magnet member,
the first magnet member comprises a plurality of first magnet members arranged in the magnet member in a circumferential direction of the magnet member with predetermined pitches;
the second magnet member comprises a plurality of second magnet members, each of the second magnet members being provided for a q-axis side end of the corresponding one of the first magnet members;
the magnet hold member includes a soft magnetic core having magnet installation holes located across a d-axis for each pole at both sides of the d-axis;
the first and second magnet members are installed in each of the magnet installation holes;
the first magnet members are located across the d-axis for each pole to be separated from each other as a pair of main magnets; and
the first magnetic orientations of each first magnet member are inclined with respect to the d-axis and intersects with the d-axis at a portion of the core, the portion of the core being located to be closer to the armature winding than to an anti-armature winding side,
the magnetic generator further comprising:
  a plurality of third magnet members each having third magnetic orientations, each of the third magnet members being provided at a d-axis side end of the corresponding one of the first magnet members such that the third magnetic orientations intersect with the first magnetic orientations of the corresponding one of the first magnet members.

5. The magnetic generator according to claim 1 or 4, wherein:
the q-axis side end of each of the first magnet members has a first flux reinforcement point that is the closest to the winding member; and
each of the second magnet members is configured to strength magnetic flux at the first flux reinforcement point of the q-axis side end of the corresponding one of the first magnet members.

6. The magnetic generator according to claim 5, wherein:
each of the first and second magnet members has a substantially rectangular shape in a lateral cross section thereof, and a pair of opposing flux effective surfaces;
the first magnetic orientations and the second magnetic orientations of the respective first and second magnet members are perpendicular to the opposing flux effective surfaces of the corresponding one of the first and second magnet members; and
the first and second magnet members are arranged in the soft magnetic core such that a first angle of at least one of the first magnetic orientations of each of the first magnet members with respect to the d-axis or q-axis is different from a second angle of at least one of the second magnetic orientations of the corresponding one of the second magnet members with respect to the d-axis or q-axis.

7. The magnetic generator according to claim 5, wherein:
an angle formed between at least one of the first magnetic orientations of each of the first magnet members and at least one of the second magnetic orientations of the corresponding one of the second magnet members is set to be an acute angle.

8. The magnetic generator according to claim 4, wherein:
the d-axis side end of each of the main magnets of the pair located across the d-axis has a second flux reinforcement point that is closest to the d-axis side end of the other of the main magnets of the pair; and
each of the third magnet members is configured to strength the second flux reinforcement point of each of the main magnets of the pair.

9. The magnetic generator according to claim 4, wherein:
an angle formed between at least one of the first magnetic orientations of each of the first magnet members and at least one of the third magnetic orientations of the corresponding one of the third magnet members is set to be an acute angle.

10. The magnetic generator according to claim 4, wherein:
each of the magnet installation holes includes a d-axis side extending portion that is located between the corresponding pair of the magnets and that extends along the d-axis;
each of the third magnet members is arranged in the d-axis side extending portion of the corresponding one of the magnet installation holes; and
each of the magnet installation holes includes a flux barrier located to be closer to the d-axis than the corresponding one of the third magnet members.

11. The magnetic generator according to any one of claims 1 and 8 to 10, wherein:
the magnet installation holes are located across the d-axis for each pole at both sides of the d-axis to be symmetrical about the d-axis; and
the magnets are arranged across the d-axis for each pole to be symmetrical about the d-axis.

12. The magnetic generator according to any one of claims 1 and 8 to 10, wherein:
each of the first and second magnet members has a value of coercive force, the value of the coercive force of the second magnet member being smaller than the value of the coercive force of the first magnet member.

13. The magnetic generator according to any one of claims 1 and 8 to 10, wherein:
each of the first and second magnet members has a value of coercive force, the value of the coercive force of the first magnet member being smaller than the value of the coercive force of the second magnet member.

14. The magnetic generator according to claim 4, wherein:
each of the second and third magnet members has a value of coercive force, the value of the coercive force of the second magnet member being different from the value of the coercive force of the third magnet member.

15. The magnetic generator according to the any one of claims 1, 8 to 10, and 14, wherein:
the soft magnetic core has an outer surface facing the winding member, and includes a groove formed in the outer surface to extend along an axial direction of the soft magnetic core.

16. The magnetic generator according to the any one of claims 1, 8 to 10, and 14 wherein:
the soft magnetic core is a rotor core that has:
a through hole formed through a center portion thereof, a rotary shaft is rotatably disposed in the through hole, the through hole having an inner circumferential surface thereof; and
a projection formed on the inner circumferential surface of the through hole and located on the d-axis for each pole, the projection extending to abut on an outer circumferential surface of the rotary shaft.

17. A magnetic generator for a motor comprising:
a plurality of magnets that are arranged to face a winding and that are movable relative to the winding upon the winding being energized, the magnets being arranged in a relative movement direction while magnetic polarities based on the magnets are alternately changed,
each of the magnets comprising:
a first magnet member having a q-axis side end located closer to a pole boundary and configured to generate magnet flux in accordance with a corresponding one of the polarities, the first magnet member having first magnetic orientations defined therein; and
a second magnet member provided at the q-axis side end of the first magnet member, the second magnet member having second magnetic orientations defined therein, the second magnetic orientations intersecting with the first magnetic orientations, and being directed toward the q-axis side end of the first magnet member, wherein:
the motor is designed as a rotary electric machine that is comprised of:
a winding member in which the winding is wound; and
a magnet hold member including the magnets and radially arranged to face the winding member, the magnetic generator being used as the magnet member,
the first magnet member comprises a plurality of first magnet members arranged in the magnet member in a circumferential direction of the magnet member with predetermined pitches;
the second magnet member comprises a plurality of second magnet members, each of the second magnet members being provided for a q-axis side end of the corresponding one of the first magnet members;
the magnet hold member includes a soft magnetic core having magnet installation holes located across a d-axis for each pole at both sides of the d-axis;
the first and second magnet members are installed in each of the magnet installation holes;
each of the first magnet members comprises divided magnet segments in a direction from the q-axis to the d-axis, each of the magnet segments having at least one of the first magnetic orientations, the at least one of the first magnetic orientations of one of the magnet segments being different from the at least one of the first magnetic orientations of another of the magnet segments;
the magnet segments include at least a q-axis side segment and a d-axis segment, the q-axis side segment being located to be closer to the q-axis than the d-axis segment is, the d-axis side segment being located to be closer to the d-axis than the q-axis segment is; and
the at least one of the first magnetic orientations of the q-axis side segment are closer to a direction parallel to the q-axis than the at least one of the first magnetic orientations of the d-axis side segment is.

18. The magnetic generator according to claim 17, wherein:
the magnet segments of each first magnet member have respective ends facing each other; and
the magnet segments of each first magnet member are arranged such that the ends of the respective magnet segments have a convex shape toward the winding.

* * * * *